US00RE45642E

(19) United States
(12) Reissued Patent
Takada

(10) Patent Number: US RE45,642 E
(45) Date of Reissued Patent: Aug. 4, 2015

(54) POLARIZING ELEMENT AND LIQUID CRYSTAL PROJECTOR

(71) Applicant: Sony Corporation, Tokyo (JP)

(72) Inventor: Akio Takada, Miyagi (JP)

(73) Assignee: Sony Corporation, Tokyo (JP)

(21) Appl. No.: 13/912,572

(22) Filed: Jun. 7, 2013

Related U.S. Patent Documents

Reissue of:
(64) Patent No.: 7,957,062
Issued: Jun. 7, 2011
Appl. No.: 12/026,434
Filed: Feb. 5, 2008

(30) Foreign Application Priority Data

Feb. 6, 2007 (JP) ..... 2007-026348
Jun. 28, 2007 (JP) ..... 2007-170585

(51) Int. Cl.
*G02B 5/30* (2006.01)
*G03B 21/00* (2006.01)
*H04N 5/74* (2006.01)

(52) U.S. Cl.
CPC ..... *G02B 5/3058* (2013.01); *G03B 21/005* (2013.01); *G03B 21/006* (2013.01); *G03B 21/008* (2013.01); *H04N 5/74* (2013.01)

(58) Field of Classification Search
CPC .. G02B 5/0358; G03B 21/005; G03B 21/006; G03B 21/008; H04N 5/74
USPC ..... 359/485.05, 487.03; 349/96, 106; 353/20
See application file for complete search history.

(56) References Cited

U.S. PATENT DOCUMENTS 4,318,978 A * 3/1982 Borrelli et al. ..... 430/346
5,999,315 A * 12/1999 Fukano et al. ..... 359/492
6,122,103 A 9/2000 Perkins et al.
6,765,721 B2 7/2004 Kawazu et al.
6,772,608 B1 8/2004 Drost et al.
6,813,077 B2 11/2004 Borrelli et al.
6,912,087 B1 6/2005 Borrelli et al.
7,026,046 B2 * 4/2006 Edlinger et al. ..... 428/310.5
7,046,442 B2 * 5/2006 Suganuma ..... 359/485.03

(Continued)

FOREIGN PATENT DOCUMENTS

JP 06-273621 9/1994
JP 10-073722 3/1998

(Continued)

OTHER PUBLICATIONS

Japanese Office Action issued Apr. 16, 2013 for corresponding Japanese Appln. No. JP2012-017006.

(Continued)

*Primary Examiner* — Frank Font
(74) *Attorney, Agent, or Firm* — K&L Gates LLP

(57) ABSTRACT

A polarizing plate having a desired extinction ratio in a visible light region and light resistance against intense light, and a liquid crystal projector using the above polarizing plate are provided. A polarizing element includes a substrate transparent to visible light, and inorganic particle layers in each of which inorganic particles are linearly disposed, the inorganic particle layers being disposed on the substrate at predetermined intervals to form a wire grid structure, the inorganic particles each have an elliptical shape having a major axis of the inorganic particles in the disposed direction and minor axis in a direction perpendicular thereto.

26 Claims, 43 Drawing Sheets

(56) References Cited

U.S. PATENT DOCUMENTS

| | | | | |
|---|---|---|---|---|
| 7,113,335 | B2 | 9/2006 | Sales | 359/485.03 |
| 7,233,563 | B2 | 6/2007 | Ueki et al. | |
| 7,813,039 | B2 * | 10/2010 | Perkins et al. | 359/485.05 |
| 8,125,592 | B2 * | 2/2012 | Takada | 349/96 |
| 2007/0285779 | A1 * | 12/2007 | Walker et al. | 359/494 |
| 2008/0129931 | A1 * | 6/2008 | Takahashi et al. | 349/96 |
| 2009/0021671 | A1 * | 1/2009 | Fukagawa et al. | 349/96 |
| 2013/0221466 | A1 * | 8/2013 | Ooka | 257/432 |

FOREIGN PATENT DOCUMENTS

| | | | |
|---|---|---|---|
| JP | 2783491 | | 5/1998 |
| JP | 2000147253 | | 5/2000 |
| JP | 2001074935 | A * | 3/2001 |
| JP | 2001-330728 | | 11/2001 |
| JP | 2002372620 | | 12/2002 |
| JP | 3486355 | | 10/2003 |
| JP | 2005-084634 | | 3/2005 |
| JP | 3654553 | | 3/2005 |
| JP | 2005-106940 | | 4/2005 |
| JP | 2005-195824 | | 7/2005 |
| JP | 3722603 | | 9/2005 |
| JP | 2005-331666 | | 12/2005 |
| JP | 2006-047829 | | 2/2006 |
| JP | 2006-139283 | | 6/2006 |
| JP | 2006323119 | | 11/2006 |
| JP | 2006330108 | | 12/2006 |
| JP | 2007058106 | | 8/2007 |
| JP | 2008-083656 | | 4/2008 |
| JP | 2008-216957 | | 9/2008 |
| JP | 2010-044416 | | 2/2010 |
| JP | 2012-103728 | | 5/2012 |

OTHER PUBLICATIONS

Office Action issued in connection with Japanese Patent Application No. 2013-126430, dated Jun. 3, 2014. (7 pages).

Office Action issued Feb. 17, 2015, for corresponding Japanese Appln. No. 2013-126430 (2 pages).

* cited by examiner

OBLIQUE SPUTTERING DEPOSITION

SPUTTERING DEPOSITION IN DIRECTION PERPENDICULAR TO SUBSTRATE SURFACE

FIG. 33

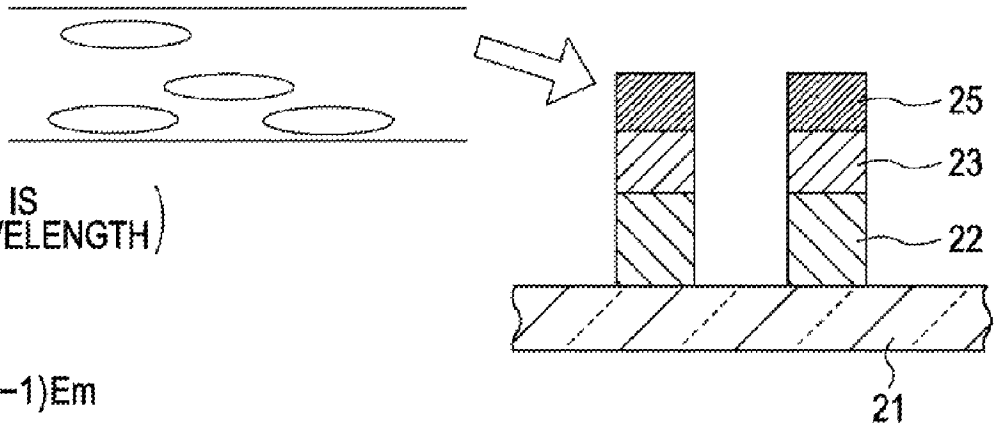

(ASSUMING THAT Ge PARTICLE SIZE IS SUFFICIENTLY SMALLER THAN WAVELENGTH)

$E_{av} = fE_i + (1-f)E_m$

AVERAGE POLARIZATION =

$(\varepsilon_{av}-1)E_{av} = f(\varepsilon-1)E_i + (1-f)(\varepsilon_m-1)E_m$ $\varepsilon_{av}$: DIELECTRIC RESPONSE FUNCTION OF SYSTEM $f$ : VOLUME FRACTION OF Ge PARTICLE $\varepsilon$ : RELATIVE DIELECTRIC CONSTANT OF Ge PARTICLE $\varepsilon_m$ : RELATIVE DIELECTRIC CONSTANT OF DIELECTRIC LAYER

POLARIZING ELEMENT AND LIQUID CRYSTAL PROJECTOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCES TO RELATED APPLICATIONS

The present application claims priority to Japanese Patent Application JP 2007-026348 and JP 2007-170585 filed in the Japanese Patent Office on Feb. 6, 2007 and Jun. 28, 2007, respectively, the entire contents of which are incorporated herein by reference.

BACKGROUND

The present application relates to a polarizing element having durability against intense light and a liquid crystal projector using the polarizing element.

In a liquid crystal display device, it is necessary to dispose at least one polarizing plate at a liquid crystal panel surface based on an image forming principle. The function of the polarizing plate is to absorb one of two polarized components (so-called P polarized wave and S polarized wave) perpendicular to each other and to transmit the other component. As the polarizing plate described above, a dichroic polarizing plate in the form of a film containing an iodine-based or a dye-based high molecular weight organic material has been frequently used in the past.

As a general method for manufacturing a dichroic polarizing plate, a method has been used having the steps of dyeing a polyvinyl alcohol-based film with a dichroic material, such as iodine, and then performing crosslinking using a crosslinking agent, followed by performing uniaxial drawing. Since being formed by the drawing as described above, this type of polarizing plate is liable to shrink. In addition, since a polyvinyl alcohol-based film is formed of a hydrophilic polymer, particularly under humidified conditions, the film is very liable to deform. In addition, since the film is used, the mechanical strength thereof is inevitably insufficient to be used as an element. In order to avoid the above problem, a method for using a transparent protective film may be used in some cases.

In recent years, liquid crystal display devices have been increasingly used in various applications, and the performances of the devices have also been improved. Concomitant with the trend described above, individual elements forming the liquid crystal display devices are requested to have high reliability and durability. For example, in a liquid crystal display device, such as a transmission type liquid crystal projector, using a light source having a large quantity of light, a polarizing plate receives intense radiation. Hence, the polarizing plate used in the above device as described above is requested to have superior heat resistance. However, since the film-based polarizing plate described above is formed of an organic material, improvement in properties thereof has been naturally limited to a certain level.

In order to solve the problem described above, an inorganic polarizing plate having superior heat resistance has been sold under the trade name "Polarcor" by Corning Inc., USA. This polarizing plate is formed of silver particles dispersed in glass and does not use an organic material such as a film, and the principle of this polarizing plate is to use plasma resonance of island-shaped particles. That is, light absorption caused by surface plasma resonance which occurs when light is incident on island-shaped particles of a noble metal or a transition metal is used, and an absorption wavelength is influenced by the particle shape and the dielectric constant of the surrounding material. When the island-shaped particle has an ellipsoid shape, since resonance wavelengths in the long-axis and the short-axis directions are different from each other, polarization properties are obtained thereby; in particular, a polarized component parallel with the long axis at a long wavelength side is absorbed, and a polarized component parallel with the short axis is transmitted. However, in the case of Polarcor, a wavelength region in which the polarization properties are obtained is a region in the vicinity of an infrared region, and a visible light region requested for liquid crystal display devices is not included. This is because of the physical properties of silver used for the island-shaped particles.

In U.S. Pat. No. 6,772,608, a UV polarizing plate formed by precipitating particles in glass by thermal reduction using the above principle has been disclosed, and as a particular example, silver used as metal particles has also been disclosed. In this case, it is believed that absorption in the short axis direction is used, which is different from the case of Polarcor described above. Although the polarizing plate functions at around 400 nm as shown in FIG. 1, since the extinction ratio is small and an absorption band is very narrow, a polarizing plate capable of covering the entire visible light region may not be obtained even if Polarcor and the technique of U.S. Pat. No. 6,772,608 are used in combination.

In addition, in J. Opt. Soc. Am. A Vol. 8, No. 4, pp. 619 to 624, a theoretical analysis of an inorganic polarizing plate using plasma resonance of metal island-shaped particles has been disclosed. According to this document, it has been described that a resonance wavelength of aluminum particles is shorter than that of silver particles by approximately 200 nm, and hence when aluminum particles are used, a polarizing plate, which can be used in a visible light region, is probably manufactured.

In addition, in Japanese Unexamined Patent Application Publication No. 2000-147253, various methods for forming a polarizing plate using aluminum particles have been disclosed. Among the above methods, it has been disclosed that glass primarily formed of silicate is not preferable as a substrate since reaction occurs between the glass and aluminum, and calcium aluminoborate glass is suitably used (in paragraphs 0018 and 0019). However, glass formed of silicate has been widely commercially used as an optical glass, and highly reliable products thereof are available at a reasonable price; hence, when the glass formed of silicate is not suitably used, it is disadvantageous from an economical point of view. In addition, a method for forming island-shaped particles by etching using a resist pattern has also been disclosed (paragraphs 0037 and 0038). A polarizing plate used in a projector is generally requested to have a size of approximately several centimeters and a high extinction ratio. Accordingly, in order to form a visible-light polarizing plate, a resist pattern size is requested to be sufficiently smaller than a visible light wavelength, that is, to be several tens of nanometers, and in addition, in order to obtain a high extinction ratio, a pattern is preferably formed to have a high density. In addition, in order to use a polarizing plate for a projector purpose, a polarizing plate having a large area is desirably formed. However, as a method for forming a high density fine pattern by lithography, disclosed in this patent document, electron beam lithography is to be desirably used in order to obtain the pattern as described above. However, since the electron beam lithography is a method for drawing each pattern using electron beams, the productivity is inferior, and hence this technique is not practical.

In addition, in Japanese Unexamined Patent Application Publication No. 2001-147253, it has been disclosed that aluminum is removed by chlorine plasma; however, in general, when etching is performed as described above, chlorides adhere to sidewalls of an aluminum pattern. The chlorides may be removed by a commercially available wet etching liquid (such as SST-A2 by Tokyo Ohka Kogyo Co., Ltd.); however, since this type of chemical liquid, which reacts with aluminum chloride compounds, also reacts with aluminum although the etching rate is slow, it is difficult to realize a desired pattern shape by the method described above.

Furthermore, in Japanese Unexamined Patent Application Publication No. 2000-147253, as another method, a method has been disclosed in which aluminum is deposited on a patterned photoresist by oblique deposition, followed by removing the photoresist (paragraphs 0045 and 0047). However, it is believed that in order to ensure adhesion between a substrate and aluminum, aluminum is also preferably deposited on the substrate to a certain extent. However, it means that the shape of the aluminum film thus deposited is different from a prolate spheroid, such as a prolate ellipsoid, which is a suitable shape disclosed in paragraph 0015. In addition, in paragraph 0047, it has been disclosed that by anisotropic etching performed perpendicular to the surface, an excess deposit is removed. In order to obtain the function as the polarizing plate, shape anisotropic properties of aluminum are significantly important. Hence, it is believed important to adjust the amount of aluminum deposited on the resist portion and that on the substrate surface by etching to obtain a desired shape; however, it may be very difficult to control the amount of aluminum having a size of submicron or less, such as 0.05 μm, as disclosed in paragraph 0047, and hence it is questionable whether the method described above is a highly productive manufacturing method. In addition, as properties of the polarizing plate, a high transmittance is desirable in the transmission axis direction; however, when glass is used as the substrate, in general, several percentage of light is inevitably reflected on the glass interface, and since countermeasures have not been taken therefor, a high transmittance is difficult to obtain.

In addition, according to Japanese Unexamined Patent Application Publication No. 2002-372620, a polarizing plate formed by oblique deposition has been disclosed. This method is to obtain polarization properties by forming fine columnar structures by oblique deposition using a transparent and an opaque substance with respect to wavelengths in a service bandwidth, and since a fine pattern can be easily obtained by this method unlike the method disclosed in U.S. Pat. No. 6,772,608, it is believed that the method has a high productivity; however, problems still exist. That is, the aspect ratio of a fine columnar structure which is first formed from the substance opaque to the wavelengths in the service bandwidth, the distance between the fine columnar structures, and the linearity thereof are important factors to obtain superior polarization properties and are to be intentionally controlled in view of reproducibility of the properties. However, in this method, since the columnar structures are formed by a phenomenon in which initial deposited layers made of deposition particles form shadow areas, and following flying particles are not deposited on the shadow areas, it has been difficult to intentionally control the factors described above. As a method for improving the above situation, a method for forming polishing marks in the substrate by rubbing performed before deposition has been described; however, the particle diameter of the deposition film is approximately at most several tens of nanometers, and in order to control the anisotropic properties of this type of particles, it might be desired to intentionally form pitches on the order of submicron or less. However, by general polishing sheets or the like, pitches on the order of approximately submicron are the limit, and hence fine polishing marks as described above are difficult to form by rubbing. In addition, since the resonance wavelength of Al particles largely depends on the refractive index of the surrounding material, as described above, in this case, combination between the transparent and the opaque substances is important; however, in Japanese Unexamined Patent Application Publication No. 2002-372620, the combination to obtain superior polarization properties in a visible light region has not been described. In addition, as is the case disclosed in U.S. Pat. No. 6,772,608, when glass is generally used as the substrate, several percentage of light is inevitably reflected on the glass interface, and countermeasures have not been taken therefor.

In addition, in Applied Optics Vol. 25, No. 2, 1986, pp. 311 to 314, a polarizing plate for infrared communication, which is called Lamipol, has been described. This polarizing plate has a laminate structure of Al and $SiO_2$, and according to this document, a very high extinction ratio is obtained. In addition, in J. Lightwave Tec. Vol. 15, No. 6, 1997, pp. 1042 to 1050, it has been disclosed that when Ge is used instead of Al which is responsible for the light absorption of Lamipol, a high extinction ratio can be realized at a wavelength of 1 μm or less. In addition, from FIG. 3 of the above document, it may be expected to obtain a high extinction ratio when Te (tellurium) is used. Although Lamipol is an absorption type polarizing plate having a high extinction ratio, as described above, since a laminate thickness of an absorption substance and a transmission substance determines the size of a light receiving surface, it is not preferably used for a projector polarizing plate which is requested to have a large size of several centimeters square.

In U.S. Pat. No. 6,122,103, a wire grid type polarizing plate has been disclosed. This polarizing plate is formed from fine metal wires disposed on a substrate at a pitch smaller than the wavelength of light in a service bandwidth, and predetermined polarization properties are obtained by reflecting a polarized light component parallel with the fine metal wires and by transmitting a polarized light component perpendicular thereto.

In addition, in U.S. Pat. No. 6,813,077, a method has been disclosed in which a wire grid type polarizing element having a three-layered structure is formed by forming dielectric layers and metal layers on a metal lattice so as to cancels light reflected from the metal lattice by an interference effect, and in which a wire grid, which is generally a reflection type, is used as an absorption type. It is believed that when an absorption type polarizing plate is used by utilizing the optical properties obtained from a multilayer structure, as described above, the thickness and the optical properties of the metal layer formed on the dielectric layer are important; however, in this patent document, these important properties are not taken into consideration. That is, in this patent document, the above important properties have not been described, and hence the details have not been known; however, in order to obtain the interference effect as described above, light is necessary to pass through the metal layer. When light passes, it means that in this step, part of the light is absorbed in the metal film located at an upper side. By the absorption, the transmittance in the transmission axis direction is decreased, and this decrease is not preferable as the properties of the polarization transmission axis; in particular, it is not preferable for a liquid crystal display device which is requested to have a high transmittance in a visible light region. That is, a polarizing plate having an absorption effect does not function when the optical anisotropic properties of an absorption layer are not essentially controlled and is difficult to be used as a practical polarizing plate.

In addition, in Japanese Unexamined Patent Application Publication No. 2006-323119, an inorganic polarizing plate in which semiconductor nanorods are dispersed in glass has been disclosed. It has also been disclosed that superior polarization properties are obtained in a visible light region; however, since this polarizing plate is formed by a method similar to that for Polarcor of Corning Inc., a drawing step is inevitably performed, and as a result, a large size plate is difficult to obtain.

SUMMARY

It is desirable to provide a polarizing plate, which has a desired extinction ratio in a visible light region and light resistance against intense light, and a liquid crystal display device using the above polarizing plate.

According to a first embodiment, there is provided a polarizing element comprising: a substrate transparent to visible light; and first inorganic particle layers in each of which first inorganic particles are linearly disposed on the substrate, the first inorganic particle layers being disposed on the substrate at predetermined intervals to form a wire grid structure, wherein the first inorganic particles each have an elliptical shape having a major axis in a disposed direction and a minor axis in a direction perpendicular thereto.

According to a second embodiment, as an optical constant of the first inorganic particle layers, an optical constant of the first inorganic particles in the disposed direction is preferably larger than that of the first inorganic particles in the direction perpendicular to the disposed direction.

In addition, according to a third embodiment, as the optical properties of the first inorganic particle layers, the refractive index of the first inorganic particles in the disposed direction is preferably larger than that of the first inorganic particles in the direction perpendicular thereto, and an extinction coefficient of the first inorganic particles in the disposed direction is preferably larger than that of the first inorganic particles in the direction perpendicular thereto.

In addition, according to a fourth embodiment, the first inorganic particle layers are preferably formed by an oblique sputtering method.

According to a fifth embodiment, the first inorganic particles preferably include a single element selected from Al, Ag, Cu, Au, Mo, Cr, Ti, W, Ni, Fe, Si, Ge, Te, and Sn, an alloy thereof, or a silicide semiconductor material.

Alternatively, according to a sixth embodiment, the first inorganic particles preferably include a semiconductor material having a bandgap energy of 3.1 eV or less.

According to a seventh embodiment, the first inorganic particle layers preferably have a thickness of 200 nm or less.

In addition, according to an eighth embodiment, the polarizing element of the first embodiment may further comprise convex portions, which are made of a material transparent to visible light and which extend in one direction, provided on the substrate, and the first inorganic particle layers are each preferably provided on a top part or at least one of sidewall parts of each of the convex portions.

In addition, according to a ninth embodiment, the polarizing element of the first embodiment may further comprise reflection layers of strip-shaped thin films, which are made of a metal and which extend in one direction, provided on the substrate at predetermined intervals, and first dielectric layers provided on the reflection layers, and the first inorganic particle layers are preferably provided on the first dielectric layers at positions corresponding to those of the strip-shaped thin films.

According to a tenth embodiment, in the above ninth embodiment, the substrate is preferably processed by a rubbing treatment so that the direction of the rubbing treatment corresponds to the disposed direction of the first inorganic particles, and the polarizing element may further comprise antireflection layers of inorganic particles having shape anisotropic properties, the antireflection layers being provided on the surface of the substrate so that the direction of the inorganic particles corresponds to the disposed direction of the first inorganic particles.

According to an eleventh embodiment, the polarizing element according to the ninth embodiment may further comprise second inorganic particle layers in each of which second inorganic particles are linearly disposed; and second dielectric layers, the second inorganic particle layers and the second dielectric layers forming laminates, wherein at least one of the laminates is provided on each of the first inorganic particle layers.

According to a twelfth embodiment, there is provided a polarizing element comprising: the polarizing element according to the eighth embodiment; and the polarizing element according to the ninth embodiment, wherein the substrates thereof are adhered to each other at the rear surfaces thereof.

According to a thirteenth embodiment, the polarizing element described above may further comprise a polarizing element protective layer transparent to light in a service bandwidth as an outermost surface.

According to a fourteenth embodiment, there is provided a liquid crystal projector comprising: a lamp; a liquid crystal panel; and the polarizing element according to one of the first to the thirteenth embodiments.

The polarizing elements of the embodiments each have a desired extinction ratio in a visible light region and superior durability to that of a related polarizing element.

In addition, since the liquid crystal projector of the embodiment includes a polarizing element having superior light resistance against intense light, a highly reliable liquid crystal projector can be realized.

Additional features and advantages are described herein, and will be apparent from, the following Detailed Description and the figures.

BRIEF DESCRIPTION OF THE FIGURES

FIG. 33 is a view showing preconditions of a polarizing element in an optical property simulation;

DETAILED DESCRIPTION

The present application will be described below in greater detail with reference to the drawings according to an embodiment.

A polarizing element of an embodiment according comprises: a substrate transparent to visible light; and linear inorganic particle layers in which inorganic particles are continuously disposed on the substrate, the inorganic particle layers being disposed on the substrate at predetermined intervals to form a one-dimensional lattice wire grid structure, wherein the inorganic particles each have an elliptical shape having a major axis in the disposed direction and a minor axis in a direction perpendicular thereto. In addition, as an optical constant of the inorganic particle layers, an optical constant of the inorganic particles in the disposed direction is larger than that of the inorganic particles in the direction perpendicular thereto. In particular, the refractive index of the inorganic particles in the disposed direction is larger than that of the inorganic particles in the direction perpendicular thereto, and the extinction coefficient of the inorganic particles in the disposed direction is larger than that of the inorganic particles in the direction perpendicular thereto.

In the polarizing element of this embodiment, convex portions, which are formed of a material transparent to visible light and which extend in one direction parallel with a primary surface of the substrate, are provided on the substrate at predetermined intervals, and the inorganic particle layers are each formed on a top part or at least one of sidewall parts of each of the convex portions.

Figure 1A:
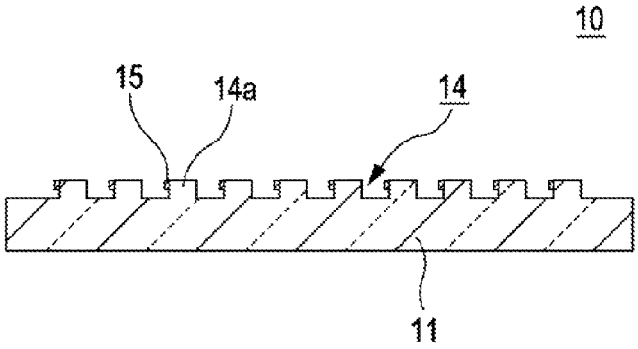
FIGS. 1A and 1B are schematic views each showing the structure of a polarizing element of a first embodiment.
Figure 1B:
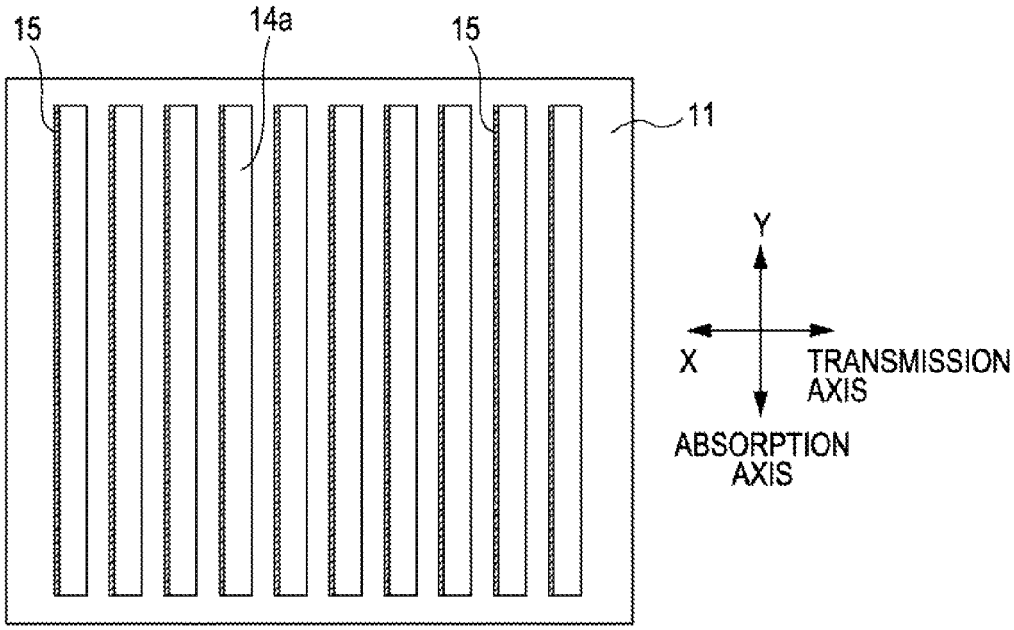

FIGS. 1A and 1B each show a structural example of the polarizing element of the first embodiment. FIG. 1A is a cross-sectional view of a polarizing element 10, and FIG. 1B is a plan view of the polarizing element 10.

As shown in FIGS. 1A and 1B, in the polarizing element 10, inorganic particle layers 15 are selectively formed on one-side surface parts of convex portions 14a provided on the surface of a substrate 11 which is transparent to visible light, so that a wire grid structure is formed of the inorganic particle layers 15 which are disposed on the substrate 11 at predetermined intervals.

The substrate 11 is formed of a material, such as glass, sapphire, or quartz, having a refractive index of 1.1 to 2.2 and being transparent to light (visible light region in this embodiment) in a service bandwidth. In this embodiment, glass, in particular, quartz (refractive index: 1.46) or soda-lime glass (refractive index: 1.51), is preferably used. A component composition of the glass material is not particularly limited, and for example, an inexpensive glass material, such as silicate glass which is widely used as an optical glass, may be used, so that manufacturing cost can be reduced. In addition, as the substrate 11, a quartz substrate or a sapphire substrate, having high thermal conductivity, is advantageously used in a polarizing element for an optical engine of a projector generating a large amount of heat.

Figure 2:
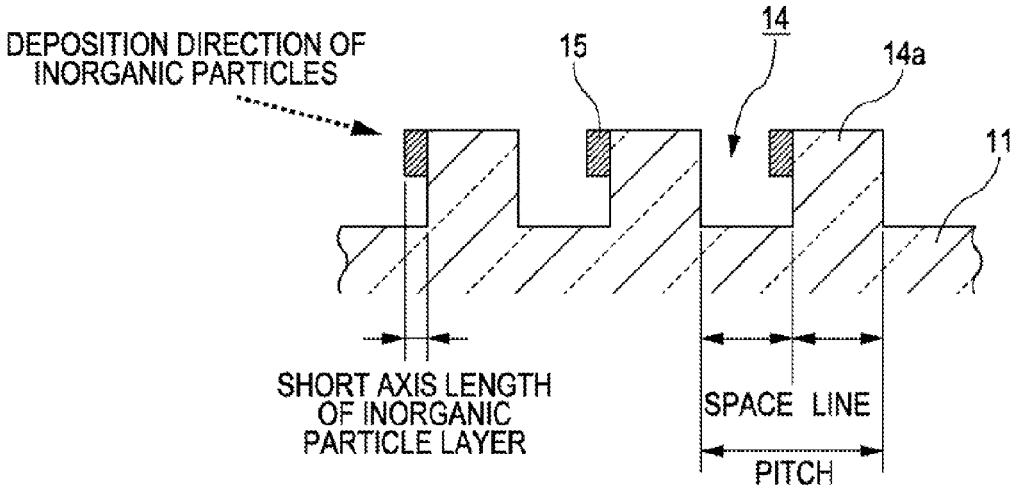
FIG. 2 is a cross-sectional view of a concave-convex member of a substrate.

A concave-convex member 14 is formed of the convex portions 14a having a rectangular cross-sectional shape, which are periodically provided on the primary surface of the substrate 11 to extend in one direction (absorption-axis Y direction) parallel with the primary surface of the substrate 11 at a predetermined pitch, which is smaller than a wavelength in a visible light region, in a direction (transmission-axis X direction) perpendicular to the absorption-axis Y direction of the substrate 11. In addition, the concave-convex member 14 is provided so that the inorganic particle layers 15 are to be formed thereon, and the wire grid structure of the inorganic particle layers is determined by the machined size and the pattern shape of the concave-convex member 14; hence, the concave-convex member 14 is important to obtain predetermined polarization properties of the polarizing element 10. That is, the machined size and the pattern shape of the concave-convex member 14 are appropriately determined in accordance with targeted polarization properties (extinction ratio) and/or an intended visible light wavelength region. In particular, in FIG. 2, the pitch (in the X direction) between grooves of the concave-convex member 14 is 0.5 μm or less, the line width (width of the convex portion 14a) of the concave-convex member 14 is 0.25 μm or less, and the depth of the concave-convex member 14 is 1 nm or more.

In addition, the pitch, line width/pitch, concave portion depth (convex portion height), convex portion length, and top line width/bottom line width of the concave-convex member 14 are preferably set in the following ranges.

$0.05\ \mu m < \text{pitch} < 0.8\ \mu m$ $0.1 < \text{line width/pitch} < 0.9$ $0.01\ \mu m < \text{concave portion depth} < 0.2\ \mu m$ $0.05\ \mu m < \text{convex portion length}$ $1.0 \geq (\text{top line width/bottom line width})$ The concave-convex member 14 may be directly formed in the substrate 11 or may be separately formed. As a method for forming the concave-convex member 14, for example, there may be mentioned a lapping method using a polishing sheet; a method in which after a photoresist, which is used in semiconductor device manufacturing or the like, is applied on a substrate and is then patterned by exposure using a mask, the substrate is etched using the photoresist thus patterned as a mask; and a method in which by using a mold which is formed in accordance with dimensions of the concave-convex member 14, a mold shape is transferred on a substrate (nanoinprinting method), and an appropriate method may be selected among the above methods.

Figure 3A:
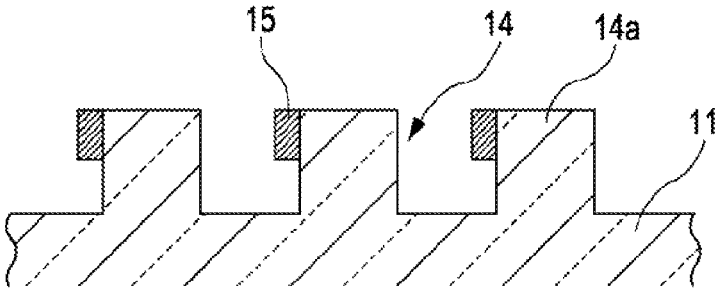
FIGS. 3A to 3C are cross-sectional views each showing a concave-convex shape of a polarizing element surface of an embodiment.
Figure 3B:
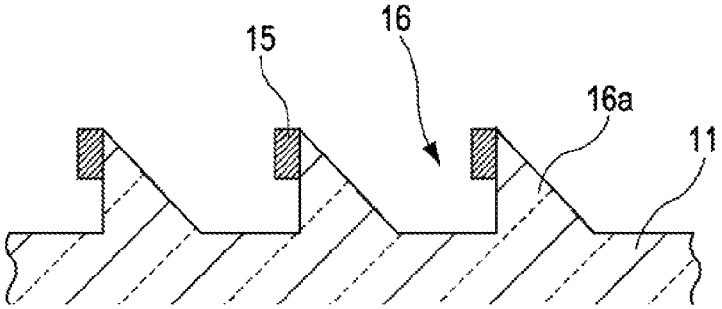
Figure 3C:
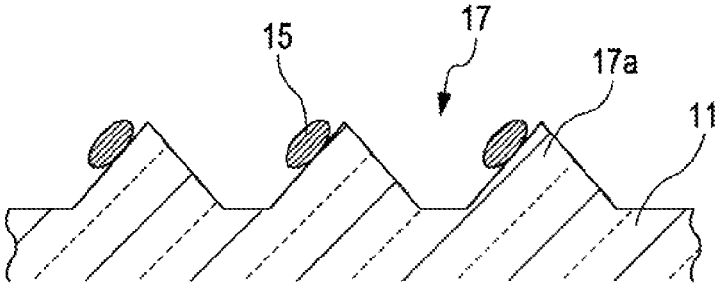

The convex portion 14a of the concave-convex member 14 may have a quadrangular, a trapezoidal, a sawtooth, or a triangular shape. FIG. 3A shows one example in which the convex portion 14a of the concave-convex member 14 has a rectangular cross-sectional shape, and the inorganic particle later 15 is formed on one side surface of the convex portion 14a. In addition, FIG. 3B shows one example in which a convex portion 16a of a concave-convex member 16 has a sawtooth cross-sectional shape, and the inorganic particle later 15 is formed on one side surface of the convex portion 16a, which is provided perpendicular to the surface of the substrate 11. Since the convex portion 16a is formed to have a sawtooth shaped cross-section, adhesion of a film on the top part of the convex portion 16a can be avoided. In addition, FIG. 3C shows one example in which a convex portion 17a of a concave-convex member 17 has a triangular cross-sectional shape, and the inorganic particle later 15 is formed on one side surface of the convex portion 17a.

Since the inorganic particle layers 15 are each formed on the top part or at least one of the sidewall parts of each of the convex portions 14a, the inorganic particle layers 15, which are made of inorganic particles having shape anisotropic properties, each having a desired fine shape, can be disposed to form a stripe pattern on the surface of the substrate 11 and can be isolated from each other. In addition, since the concave-convex member 14 is mechanically formed, and the inorganic particle layers 15 are formed thereon, the concave-convex member 14 can be stably formed, and in addition, the shapes of the inorganic particle layers formed thereon can be easily controlled.

Since the inorganic particle layer 15 is formed by adhering inorganic particles to the top part or at least one sidewall part of the convex portion 14a, the inorganic particles are linearly disposed in one direction (absorption-axis Y direction) parallel with the primary surface of the substrate 11. "The inorganic particles are linearly disposed" indicates the state in which inorganic particles are connected to each other to form a strip-shaped continuous film or the state in which inorganic particles aggregate to form independent islands each having an appropriate size, and the islands are aligned in one direction to form a discontinuous film. As long as grain boundaries are formed, either one of the states described above may be used. In addition, since the inorganic particle layers 15 are formed on the convex portions 14a regularly provided at predetermined intervals, the inorganic particle layers 15 form a stripe pattern (one-dimensional lattice pattern), so that a wire grid structure is obtained.

In this embodiment, the inorganic particle has an elliptical shape having a major axis in the disposed direction and a minor axis in a direction perpendicular thereto. In addition, it is preferable that the inorganic particles have a size smaller than the wavelength in a service bandwidth and be completely isolated from each other.

In addition, as the optical constant of the inorganic particle layer 15 of this embodiment according to the present invention, it is important that the optical constant in the absorption-axis Y direction (disposed direction of the inorganic particles) be larger than that in the transmission-axis X direction (direction perpendicular to the disposed direction of the inorganic particles). In particular, the refractive index of the inorganic particle layer 15 in the absorption-axis Y direction is larger than that in the transmission-axis X direction, and the extinction coefficient of the inorganic particle layer 15 in the absorption-axis Y direction is larger than that in the transmission-axis X direction. In order to obtain the above properties, the inorganic particle layers 15 are formed by an oblique sputtering method.

Figure 4:
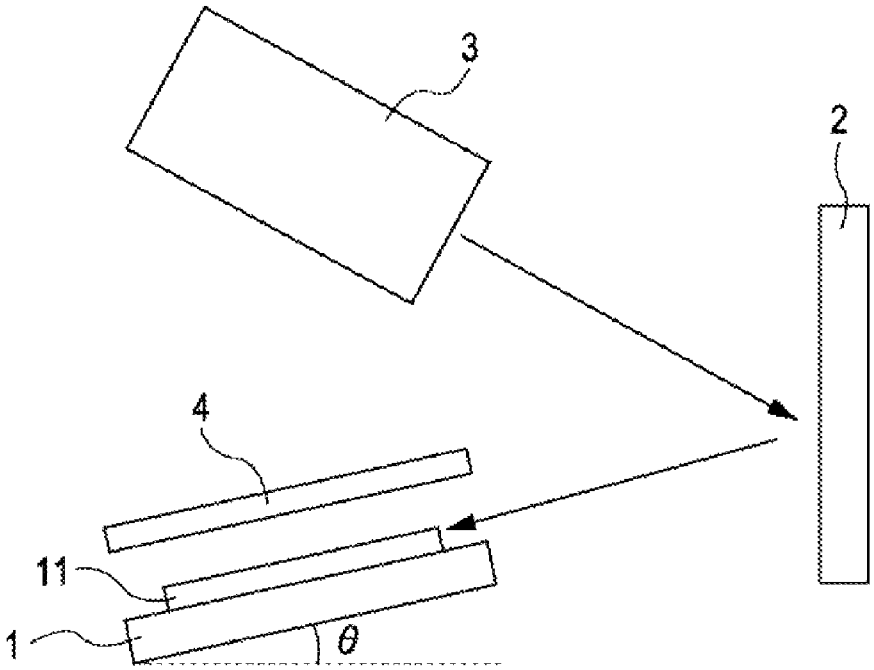
FIG. 4 is a schematic view showing the structure of oblique sputtering deposition.

The oblique sputtering deposition in order to form the inorganic particle layers 15 of this embodiment according to the present invention is shown in FIG. 4. In this figure, although ion beam sputtering is shown by way of example, the oblique sputtering deposition is not limited thereto, and any sputtering method may also be used.

In FIG. 4, reference numeral 1 indicates a stage supporting the substrate 11, reference numeral 2 indicates a target, reference numeral 3 indicates a beam source (ion source), and reference numeral 4 indicates a control plate. The stage 1 is inclined by a predetermined angle θ with respect to a normal line direction of the target 2, and the substrate 11 is disposed so that the longitudinal direction of the convex portions 14a of the concave-convex member 14 is perpendicular to an incident direction of inorganic particles emitted from the target 2. The angle θ is set, for example, in the range of 0° to 15°. Ions emitted from the beam source 3 irradiate the target 2. Inorganic particles kicked out of the target 2 by the irradiation of ion beams are incident on the surface of the substrate 11 in an oblique direction and adhere thereto. In this step, when the flat control plate 4 is disposed over the substrate 11 with a predetermined distance therebetween (such as 50 mm), the direction of particles incident on the substrate 11 can be controlled, so that particles can be deposited only on the sidewall parts of the convex portions 14a. In this case, the thickness of the inorganic particle layer 15 is preferably 200 nm or less.

As described above, when the incident direction of inorganic particles is controlled by inclining the substrate 11 with respect to the target 2 in deposition by a sputtering method, the inorganic particle layers 15 each selectively formed on the top part or at least one of sidewall parts of each of the convex portions 14a are obtained. In each of the inorganic particle layers 15, the inorganic particles are linearly disposed which have an elliptical shape having a major axis in the disposed direction and a minor axis in the direction perpendicular thereto, and in which the optical constant of the inorganic particle layer 15 in the absorption-axis Y direction is larger than that in the transmission-axis X direction.

In this embodiment, as a material (material forming inorganic particles) for the inorganic particle layer 15, a material appropriate as the polarizing element 10 is preferably to be selected in accordance with a service bandwidth. That is, a metal material and a semiconductor material are suitably used as the above material, and in particular, as the metal material, for example, there may be mentioned Al, Ag, Cu, Au, Mo, Cr, Ti, W, Ni, Fe, Si, Ge, Te, Sn, or an alloy thereof. In addition, as the semiconductor material, for example, Si, Ge, Te, or ZnO may be mentioned. Furthermore, a silicide material, such as FeSi (in particular, β-FeSi2), MgSi2, NiSi2, BaSi2, CrSi2, or CoSi2, may also be preferably used.

In addition, when a semiconductor material is used for the inorganic particle layer 15, the absorption function relates to bandgap energy of the semiconductor. The reason for this is that light having energy equal to or less than the bandgap energy is absorbed. Hence, when a semiconductor material is used for a visible light polarizing element, the bandgap energy is necessary to be equal to or less than that of a service bandwidth. For example, in the case in which visible light is used, for absorption at a wavelength of 400 nm or more, a material having a bandgap energy of 3.1 eV or less is necessarily used. The bandgap energy also depends on the size of particles as described in OYO BUTURI, Vol. 73, No. 7, 2004, pp. 917 to 923, and in particular, when the size is decreased to several nanometers, the bandgap energy tends to rapidly increase; hence, in consideration of the size effect as described above, the material and the thickness thereof are to be appropriately determined. From the point as described above, a semiconductor material having a small bandgap energy in the bulk state is preferable, and for example, Ge is a preferable material for a visible light polarizing element since having a small bandgap energy of 0.67 eV (wavelength of approximately 1.85 μm) in the bulk state.

By the structure as described above, the polarizing element 10 has a desired extinction ratio in a visible light region and also has superior durability to that of a related polarizing element.

In addition, if desired, when the front and the rear surfaces of the substrate are coated with antireflection films, reflection at the interface between air and the substrate is prevented, and as a result, the transmission-axis transmittance can be improved. As the antireflection film, for example, there may be used a low refractive-index film of MgF2 or the like, which is generally used, or a multilayer film composed of a low refractive-index film and a high refractive-index film. In addition, after the structure shown in FIGS. 1A and 1B is formed, when a material, such as SiO2, transparent in a service bandwidth region is applied on surfaces of the above structure as a protective film so that the thickness thereof has no influences on the polarization properties, it is preferable since the reliability, such as humidity resistance, is effectively improved. However, since the optical properties of inorganic particles are influenced by the refractive index of the surrounding material, the polarization properties may be changed in some cases when the protective film is formed. In addition, since the reflectance to incident light is also changed by the optical thickness (refractive index×thickness of protective film) of the protective film, a protective film material and the thickness thereof are to be determined in consideration of the above influences. As the protective film material, a material having a refractive index of 2 or less and an extinction coefficient of approximately zero is preferable. As the material described above, SiO2 and Al2O3 may be mentioned by way of example. The materials mentioned above may be formed into films, for example, by a general vacuum film formation method (such as a chemical vapor deposition method, a sputtering method, or an evaporation method), or a spin coating method or a dipping method, which uses a sol in which the above material is dispersed in a liquid. Furthermore, a self-organizing film as disclosed in J. Microelectromechanical Systems Vol. 10, No. 1, 2001, pp. 33 to 40 may also be used. In order to improve humidity resistance, a hydrophobic self-organizing film is preferable. Perfluorodecyltrichlorosilane (FDTS) and Octadecanetrichlorosilane (OTS) may be mentioned by way of example. Since having hydrophobic properties, the above materials are also effective in terms of antifouling. The materials mentioned above are commercially available from chemical drug producers, such as Gelest Inc., USA, and film formation can be performed by dipping. In addition, the film formation may also be performed by vapor phase growth, and an exclusive machine therefor is sold by Applied Microstructure Inc., USA. In the case of a silane-based self-organizing film as described above, in order to improve the adhesion, after SiO2 is applied on the polarizing element by the method described above to form an adhesive layer, the self-organizing film may be deposited.

Next, the structure of a polarizing element of a second embodiment.

In this embodiment, reflection layers in the form of strip-shaped thin films, which are made of a metal, which extend in one direction parallel with a primary surface of a substrate, and which are provided thereon with predetermined intervals, and dielectric layers formed on the reflection layers are provided, and the inorganic particle layers are formed on the dielectric layers at positions corresponding to those of the strip-shaped thin films.

Figure 5A:
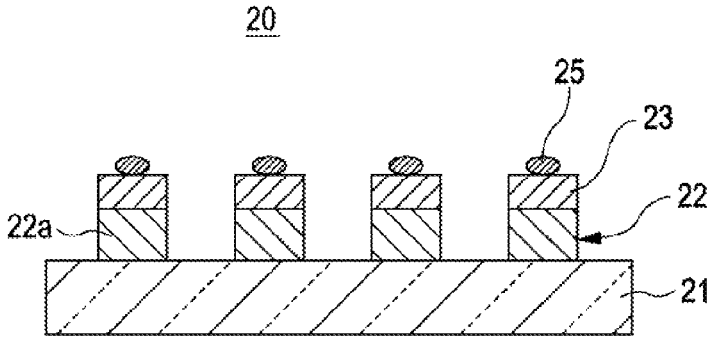
FIGS. 5A and 5B are schematic views each showing the structure of a polarizing element of a second embodiment.
Figure 5B:
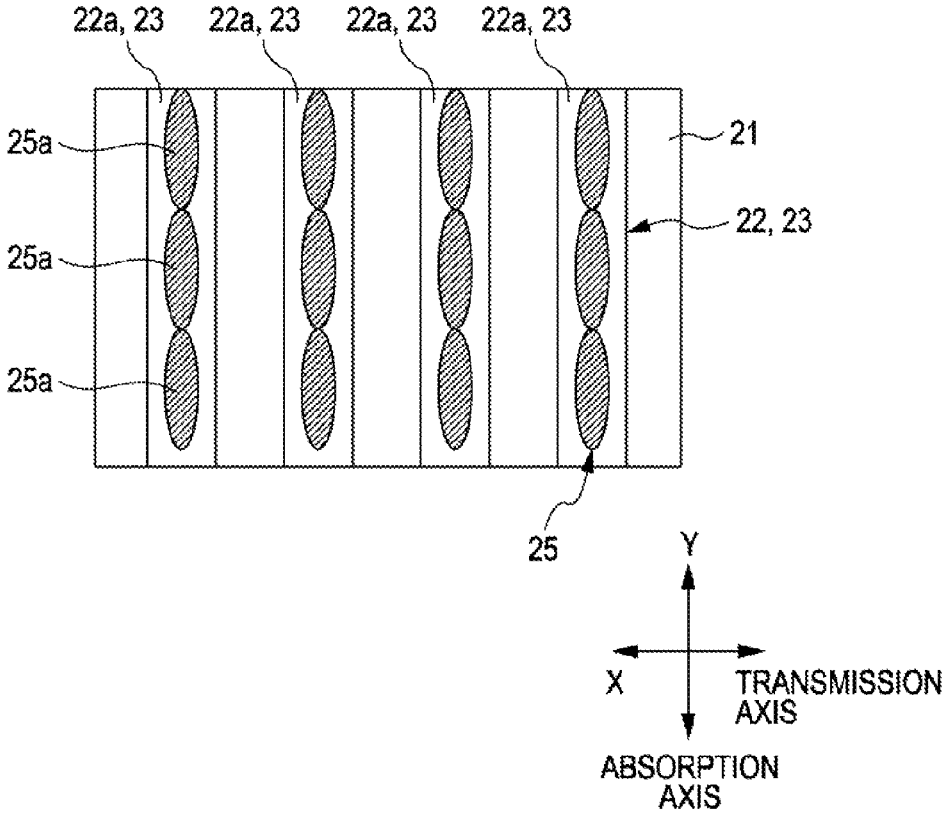

FIGS. 5A and 5B are schematic views each showing a structural example of the polarizing element of the second embodiment according to the present invention. FIG. 5A is a cross-sectional view of a polarizing element 20, and FIG. 5B is a plan view of the polarizing element 20.

As shown in FIGS. 5A and 5B, inorganic particle layers 25 are selectively formed on laminate structures composed of dielectric layers 23 and thin films 22a forming reflection layers 22 provided on a surface of a substrate 21 which is transparent to visible light, and hence a wire grid structure is formed in which the inorganic particle layers 25 are disposed on the substrate 21 with predetermined intervals.

In this embodiment, the substrate 21 is formed from the same material as that for the substrate 11 of the first embodiment.

As the reflection layers 22, the strip-shaped thin films 22a, which are made of a metal and which extend in one direction (absorption-axis Y direction) parallel with the primary surface of the substrate 21, are provided thereon. As a material for the reflection layer 22, various materials may be used. For example, a metal, such as Al, Ag, Cu, Mo, Cr, Ti, Ni, W, Fe, Si, Ge, or Te, or a semiconductor material may be used. In addition, besides the metal materials, for example, an inorganic film or a resin film, which has a high surface reflectance by coloring or the like, may also be used.

The thin films 22a are disposed on the surface of the substrate 21 with a pitch smaller than the wavelength of a visible light region and are formed (metal lattice), for example, by patterning of the above metal film using a photolithographic technique. The reflection layers 22 have a function as a wire grid type polarizer, and among various types of light incident on the surface of the substrate 21, a polarized wave (TE wave (S wave)) having an electric field component in a direction (Y-axis direction) parallel with the longitudinal direction of the wire grid is attenuated, and a polarized wave (TM wave (P wave)) having an electric field component in a direction (X-axis direction) perpendicular to the longitudinal direction of the wire grid is allowed to pass.

In addition, the pitch, line width/pitch, thin film height (thickness, lattice depth), and thin film length (lattice length) of the reflection layer 22 (thin film 22a) are preferably set in the following ranges.

0.05 μm<pitch<0.8 μm 0.1<line width/pitch<0.9

0.01 μm<thin film height<1 μm 0.05 μm<thin film length

The dielectric layers 23 are formed on the surface of the substrate 21 from an optical material, such as SiO2, transparent to visible light by a general vacuum film formation method, such as a sputtering method, a vapor phase growth method, or an evaporation method, or a sol-gel method (method for applying a sol by a spin coating method or the like, followed by thermal-curing to form a gel). The dielectric layer 23 is formed as an underlayer for the inorganic particle layer 25 and is also formed to have a thickness so as to shift the phase of a polarized light passing through the inorganic particle layer 25 and reflected by the reflection layer 22 by a half wavelength with respect to a polarized light reflected by the inorganic particle layer 25, which will be described later. In particular, the thickness may be appropriately set in the range of 1 to 500 nm. The dielectric layer 23 is preferably formed to enhance an interference effect by adjusting the phase of the polarized light and to have a thickness shifting the phase by a half wavelength. However, since the reflected light can be absorbed by the inorganic particle layer, which has an absorption effect, and improvement in contrast can be realized even if the film thickness is not optimized, the film thickness may be practically determined in consideration of desired polarization properties in combination with an actual manufacturing process. A practical film thickness is in the range of 1 to 500 nm.

As a material forming the dielectric layer 23, a general material, such as SiO2, Al2O3, or MgF2, may be used. These materials mentioned above may be formed into a thin film by a general vacuum film formation method, such as a sputtering method, a vapor phase growth method, or an evaporation method, or a method in which a sol material is applied on a substrate, followed by thermal-curing. In addition, the refractive index of the dielectric layer 23 is preferably set in the range of more than 1 to 2.5. Since the optical properties of the inorganic particle layer 25 are influenced by the refractive index of the surrounding material, polarizing element properties can also be controlled by the dielectric layer material.

The inorganic particle layer 25 is formed by adhering inorganic particles to the dielectric layer 23 at a position corresponding to that of the thin film 22a so that the inorganic particles are linearly disposed in one direction (absorption-axis Y direction) parallel with the primary surface of the substrate 21. In addition, since the inorganic particle layers 25 are formed above the respective thin films 22a regularly provided with predetermined intervals, the inorganic particle layers 25 form a stripe pattern, and hence the wire grid structure is formed.

In FIGS. 5A and 5B, the inorganic particle layer 25 has the structure in which island-shaped inorganic particles 25a having a prolate ellipsoid shape are disposed so that the long axis direction thereof is parallel with the longitudinal direction (Y-axis direction) of the thin film 22a and so that the short axis direction is in a direction (X-axis direction) perpendicular thereto. In addition, it is preferable that the inorganic particles 25a have a size smaller than the wavelength in a service bandwidth and be completely isolated from each other.

As the optical constant of the inorganic particle layer 25 of this embodiment according to the present invention, the optical constant in the absorption-axis Y direction (disposed direction of the inorganic particles) is larger than that in the transmission-axis X direction (direction perpendicularly to the disposed direction of the inorganic particles). In particular, the refractive index of the inorganic particle layer 25 in the absorption-axis Y direction is larger than that in the transmission-axis X direction, and the extinction coefficient in the absorption-axis Y direction is larger than that in the transmission-axis X direction. In order to obtain the properties described above, the inorganic particle layers 25 are formed by an oblique sputtering method. The details of the oblique sputtering method are the same as those of the method shown in the first embodiment. In addition, a material for the inorganic particle layer 25 is the same as that for the inorganic particle layer 15 of the first embodiment.

In the polarizing element 20 thus formed of this embodiment, the front surface of the substrate 21, that is, the surface on which the strip-shaped thin films 22a, the dielectric layers 23, and the inorganic particle layers 25 are formed is used as a light incident surface. In addition, by using the following four functions, that is, the light transmission, reflection, interference, and selective light absorption of a polarized wave by optical anisotropic properties, the polarizing element 20 attenuates a polarized wave (TE wave (S wave)) having an electric field component (Y-axis direction) parallel with a wire grid longitudinal direction of the reflection layer 22 and transmits a polarized wave (TM wave (P wave)) having an electric field component (X-axis direction) perpendicular to the wire grid longitudinal direction.

Figure 6A:
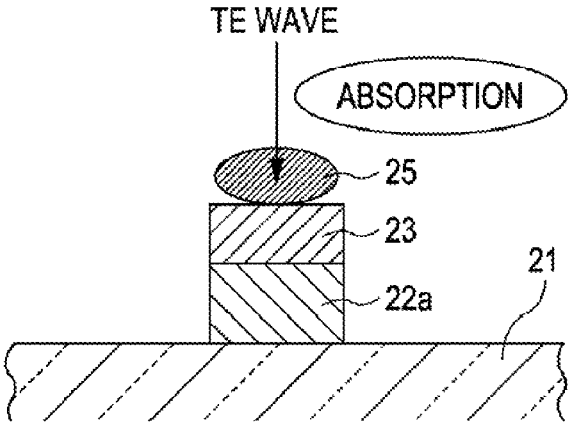
FIGS. 6A and 6B are schematic views each illustrating a function of the polarizing element shown in FIGS. 5A and 5B.
Figure 6B:
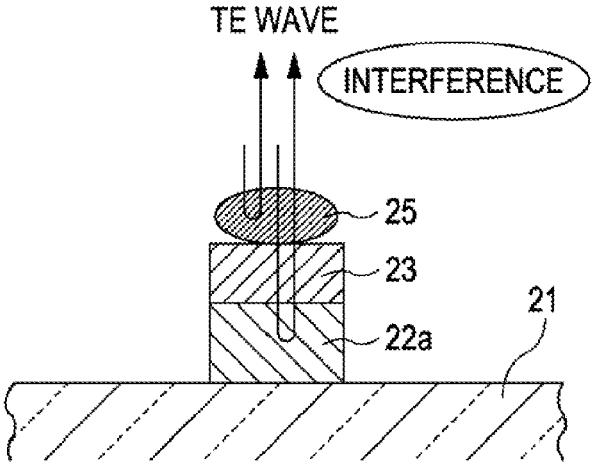

That is, as shown in FIG. 6A, the TE wave is attenuated by the selective light absorption function, which is for a polarized wave, of the optical anisotropic properties of the inorganic particle layer 25 formed of the inorganic particles 25a having shape anisotropic properties. The thin films 22a function as a wire grid and each reflect a TE wave passing through the inorganic particle layer 25 and the dielectric layer 23, as shown in FIG. 6B. In this step, when the dielectric layer 23 is formed so that the phase of the TE wave passing through the inorganic particle layer 25 and reflected by the thin film 22a is shifted by a half wavelength, the TE wave reflected by the thin film 22a and a TE wave reflected by the inorganic particle layer 25 cancel each other by the interference and are attenuated. As described above, the selective attenuation of the TE wave can be performed. A thickness to shift the phase by a half wavelength is preferable; however, since the inorganic particle layer itself has an absorption effect, improvement in contrast can be realized even if the thickness of the dielectric layer is not optimized, and hence the thickness may be practically determined in consideration of desired polarization properties together with economical efficiency in the actual manufacturing process. reflection layer side. Also in this case, by the selective absorption effect of the inorganic particle layer, a transmission contrast equivalent to that described above can be obtained. As described later, the reason for this is that the intensity of the transmission contrast depends on the thickness of the reflection layer. In the case in which the above method is actually used, for example, in an optical engine portion (FIG. 13) of a liquid crystal projector of an embodiment according to the present invention, when a polarizing plate of the embodiment according to the present invention is used as an incident polarizing plate 10A in order to avoid undesirable reflected light to a liquid crystal panel, a surface (the inorganic particle layer 25 side in FIGS. 6A and 6B) of the polarizing plate is disposed to face the liquid crystal panel side. By the configuration as described above, undesired reflected light returns to a light source side. When the polarizing plate of this embodiment according to the present invention is also used as an emission polarizing plate 10B or 10C, the surface (the inorganic particle layer 25 side in FIGS. 6A and 6B) of this polarizing plate may be disposed to face the liquid crystal panel side. The direction of light incident on the polarizing plate is reversed between the use as an incident polarizing plate and the use as an emission polarizing plate; however, regardless of the direction of light incident on the polarizing plate, equivalent transmission contrast is obtained as described above, and hence practical problems may not occur.

The polarizing element 20 may be formed, for example, as described below. That is, after a metal film and a dielectric film are formed on the substrate 21, and a lattice pattern is formed by patterning the metal film and the dielectric film using a photolithographic technique or the like, the inorganic particle layers 25 are formed by an oblique sputtering deposition method. By adjusting an incident angle in the oblique sputtering deposition, particles can be intensively deposited in the vicinities of top parts of convex portions formed of the strip-shaped thin films 22a and the dielectric layers 23.

Besides the above method, a method may also be used in which a one-dimensional lattice pattern is formed on a transparent substrate using a transparent material, and metal layers, dielectric layers, and inorganic particle layers are sequentially formed on top parts of convex portions of this lattice pattern by oblique deposition. Furthermore, another method may also be used in which after a metal film, a dielectric film, and an inorganic particle film are sequentially formed on a substrate, these layers are simultaneously etched to form a one-dimensional lattice pattern.

Figure 7:
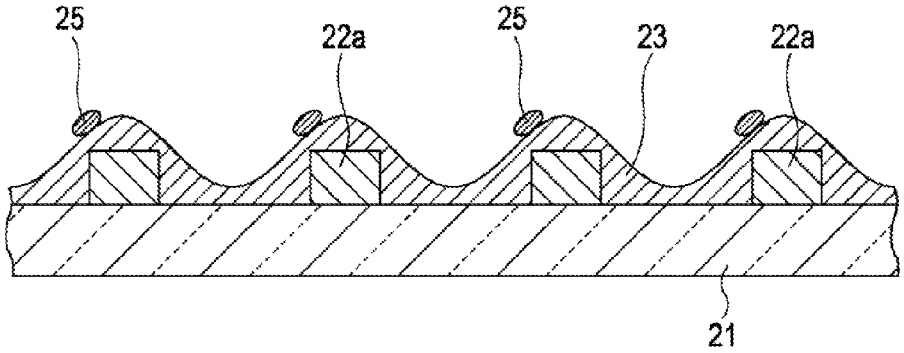
FIG. 7 is a schematic longitudinal cross-sectional view of a modified example of the structure of the polarizing element shown in FIGS. 5A and 5B.

Furthermore, as shown in FIG. 7, after the reflection layers 22 are formed on the substrate 21 to have a one-dimensional lattice pattern, the dielectric layer 23 is formed all over the substrate 21. Hence, the dielectric layer 23 has a concave-convex shape having convex portions over the strip-shaped thin films 22a and concave portions therebetween. Subsequently, by an oblique sputtering deposition method, the inorganic particle layers 25 are formed on side surfaces of top parts of the convex portions of the dielectric layer 23, so that a polarizing element having the same effect as that of the example shown in FIGS. 5A and 5B can be formed. The area on which the inorganic particle layer 25 is formed is not limited to one side surface of the top part of the dielectric layer 23 as shown in the figure and may be formed on both side surfaces of the top part.

In addition, as the polarizing element of this embodiment according to the present invention, a polarizing element having the structure in which the dielectric layers 23 shown in FIGS. 5A and 5B are omitted may also be used. That is, when the inorganic particle layers 25 are selectively formed on the thin films 22a forming the reflection layers 22 provided on the surface of the substrate which is transparent to visible light, a wire grid structure is obtained in which the inorganic particle layers 25 are disposed on the substrate 21 with predetermined intervals. Even by the structure described above, a desired extinction ratio (contrast: transmission-axis transmittance/absorption-axis transmittance) can be obtained in a visible light region.

Next, as an emission-surface stray-light countermeasure (ghost countermeasure) for a liquid crystal projector, an example in which selective light absorption layers are provided on a rear surface side of the polarizing element 20 will be described.

Figure 8:
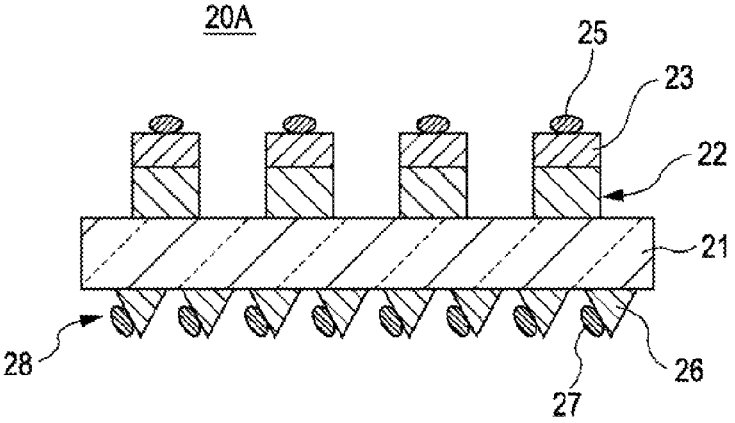
FIG. 8 is a view showing an example (1) of an emission-surface stray-light countermeasure of the polarizing element shown in FIGS. 5A and 5B.

FIG. 8 is a side cross-sectional view showing a schematic structure of a polarizing element 20A. In this figure, the same constituent elements as those of the above polarizing element 20 are designated by the same reference numerals, and a detailed description thereof is omitted.

In the polarizing element 20A of this embodiment, the reflection layers 22 having a one-dimensional lattice pattern are formed on a surface (one surface) of the substrate 21, and on the reflection layers 22, the dielectric layers 23 and the inorganic particle layers 25 are sequentially formed. In addition, on the rear surface (opposite side surface) of the substrate 21, selective light absorption layers 28 having optical anisotropic properties for a polarized wave are provided, each of which is composed of a convex portion 26 of a dielectric material and a second inorganic particle layer 27 formed on a top part or at least one of side surface parts of this convex portion 26.

In the polarizing element 20 which is not provided with the selective light absorption layers 28 having optical anisotropic properties for a polarized wave, since the rear surface of the substrate 21 has a mirror surface, return light, which passes through the polarizing element and is reflected by another optical element, such as a lens, disposed following the polarizing element, is again reflected by the above mirror surface. The stray light as described above causes degradation in image quality, such as ghost, in a liquid crystal projector.

In this embodiment, when the selective light absorption layers 28 having optical anisotropic properties for a polarized wave, having the above structure, are provided at the rear surface side of the substrate 21, the above stray light is absorbed, and reflection by the reflection layers 22 is prevented. The convex portions 26 forming the selective light absorption layers 28 having optical anisotropic properties for a polarized wave are formed from the same material as that for the dielectric layer 23 and are also formed into a one-dimensional lattice pattern extending in the same direction as that of the strip-shaped thin films 22a of the reflection layers 22. The second inorganic particle layer 27 is formed of inorganic particles linearly disposed on the top part or the side surface part of the convex portion 26 and is formed from a material similar to that for the inorganic particle layer 25 provided at the front surface side of the substrate 21, and hence the selective light absorption effect for incident light from the rear surface of the substrate 21 can be obtained.

As a method for forming the convex portions 26, as is the method for forming the dielectric layers 23, a sputtering method, a sol-gel method, or the like may be used. The formation of the convex shape is preferably formed by pattern processing using a photolithographic technique or press formation by a nanoinprinting method. As a method for forming the second inorganic particle layers 27, oblique deposition similar to that for the inorganic particle layers 25 provided at the front surface side of the substrate 21 is preferable. The second inorganic particle layer 27 is formed on the top part, one side surface part, or two side surfaces of the convex portion 26.

Figure 47:
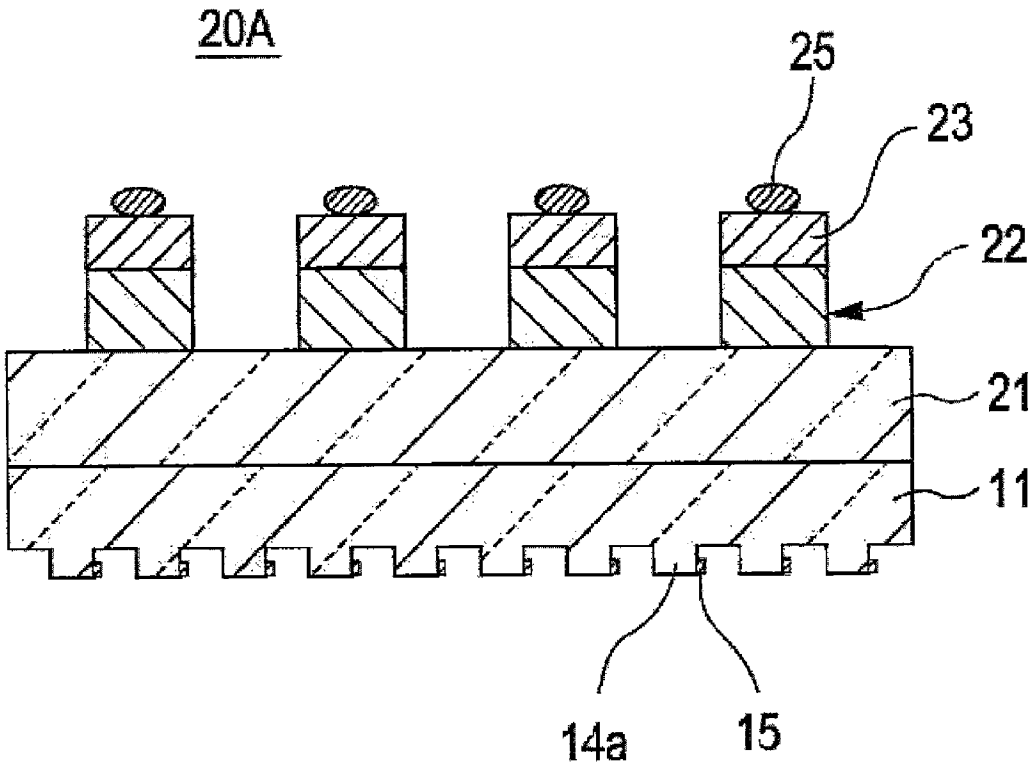
FIG. 47 is a view showing an alternate example (1) of an emission-surface stray-light countermeasure of the polarizing element shown in FIGS. 5A and 5B.

Alternatively, as another method for manufacturing the polarizing element 20A, by using the polarizing element 10 shown in FIGS. 1A and 1B and the polarizing element 20 shown in FIGS. 5A and 5B, the rear surfaces of the substrates 11 and 21 may be adhered to each other with a transparent adhesive to form the polarizing element 20A as shown in FIG. 47. In this case, the inorganic particles of the inorganic particle layers 15 and those of the inorganic particle layers 25 are preferably disposed in the same direction.

Next, as another ghost countermeasure for a liquid crystal projector, an example in which an antireflection layer is provided between the substrate 21 and the reflection layer 22 will be described.

Figure 9:
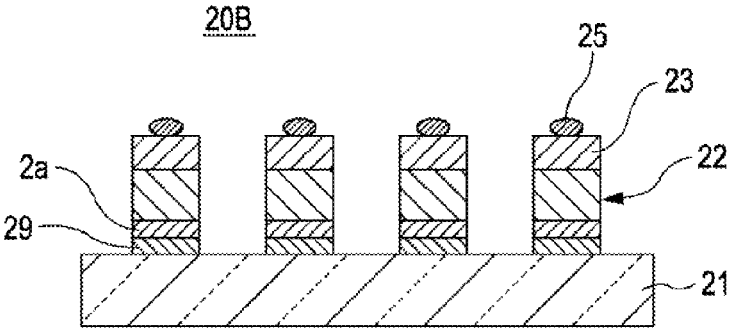
FIG. 9 is a view showing an example (2) of the emission-surface stray-light countermeasure of the polarizing element shown in FIGS. 5A and 5B.

FIG. 9 is a side cross-sectional view showing a schematic structure of a polarizing element 20B. In this figure, the same constituent elements as those of the above polarizing element 20 are designated by the same reference numerals, and a detailed description thereof is omitted.

The polarizing element 20B of this embodiment is formed for a purpose similar to that for the above polarizing element 20A. That is, in the polarizing element 20B of this embodiment, antireflection layers 29 are provided between the substrate 21 and the reflection layers 22. By the antireflection layers 29 provided under the reflection layers 22 having a one-dimensional lattice pattern, reflection of incident light from the rear surface of the substrate 21 is prevented.

As the antireflection layer 29, for example, a black layer, such as a carbon black layer, is preferably used. By the layer as described above, the incident light from the rear surface of the substrate 21 can be efficiently absorbed. In addition, besides carbons, an oxygen-deficient silicon oxide layer or a low reflection-material layer having a reflectance lower than that of the reflection layer 22 may also be used. Alternatively, a layer similar to the inorganic particle layer 25 may be used as the antireflection layer 29. In addition, in the example shown in the figure, in order to decrease the reflectance by obtaining an interference effect between the reflection layer 22 and the antireflection layer 29, a dielectric layer 2a is provided. The dielectric layers 2a and the antireflection layers 29, having a lattice pattern, can be simultaneously obtained when the reflection layers 22 are formed by patterning.

In addition, as another ghost countermeasure for a liquid crystal projector, the following method may also be used. That is, a rubbing treatment is performed on the surface of the substrate 21 so as to form a texture structure of irregularities in which fine streaks are aligned in one direction in accordance with the disposed direction of the inorganic particles 25a of the inorganic particle layers 25 which are subsequently formed on the above surface, and thin films (antireflection layers) of inorganic particles having shape anisotropic properties may then be formed by the above-described oblique sputtering method on the surface processed by the rubbing treatment in accordance with the disposed direction of the inorganic particles 25a. By the texture structure described above, the alignment properties of the inorganic particles are improved so that the long axis directions thereof are along the longitudinal directions of the fine streaks, and the polarization properties of the thin film are improved, so that the ghost countermeasure effect can be enhanced. In addition, an increase in transmission contrast properties as the polarizing element can also be expected.

As one variation of the second embodiment, at least one laminate structure of the dielectric layer 23 and the inorganic particle layer 25 may be further provided on the inorganic particle layer 25 to form a multilayer structure. An example of this multilayer structure is shown in FIGS. 10A and 10B.

Figure 10A:
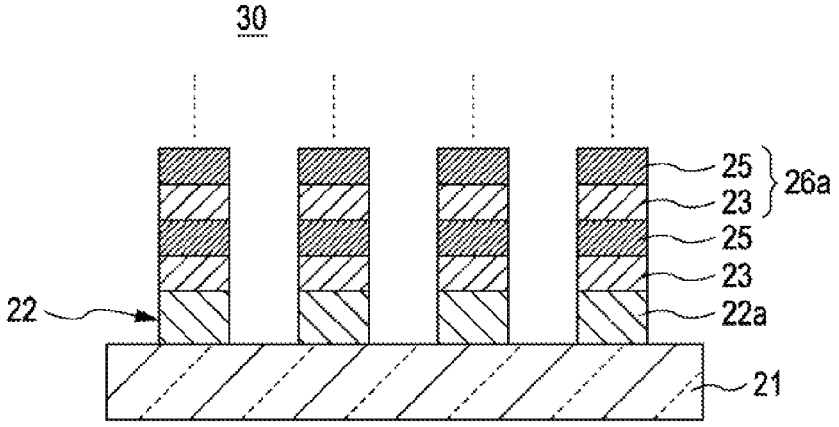
FIGS. 10A and 10B are schematic views each showing a modified structure of the polarizing element of the second embodiment.
Figure 10B:
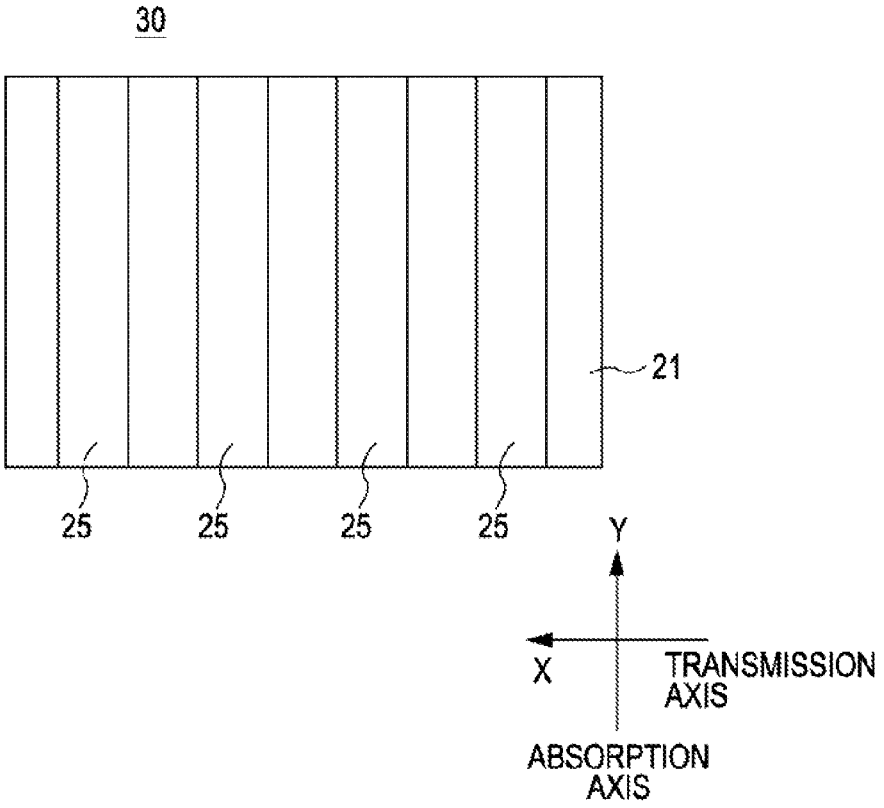

In a polarizing element 30 shown in FIGS. 10A and 10B, the strip-shaped thin film 22a forming the reflection layer 22, the dielectric layer 23, and the inorganic particle layer 25 are formed on the substrate 21 in that order from the bottom, and on the above inorganic particle layer 25, a laminate structure 26a of the dielectric layer 23 and the inorganic particle layer 25 is further formed, so that a wire grid structure is formed. In addition, on a laminate structure la thus formed, another laminate structure la may be further provided. Accordingly, the transmission-axis direction contrast is increased at a desired wavelength by increasing the interference effect between the layers, and at the same, an undesirable reflection component from a polarizing element can be decreased in a wide range in transmission type liquid crystal display devices; hence, as a result, by a polarizing element having a film thickness smaller than that of the polarizing element 20 having the structure shown in FIGS. 5A and 5B, a high contrast and a low reflection can be realized.

As a method for manufacturing the polarizing element 30 of this embodiment, the following three methods may be mentioned by way of example. That is, as a first method, after a reflection layer material (metal lattice material), and a dielectric film are laminated on the substrate 21, and a one-dimensional lattice pattern is formed, for example, by a nanoinprinting or a photolithographic technique using etching or the like, particles are deposited by an oblique sputtering deposition method. According to the above method, by adjusting an incident angle in the oblique sputtering deposition, inorganic particles can be intensively deposited in the vicinities of top parts of convex portions of the dielectric layers 23. In addition, as a second method, after a concave-convex member having a one-dimensional lattice pattern is formed on a transparent substrate using a transparent material, a reflection layer material, a dielectric layer material, and an inorganic particle material are sequentially and repeatedly deposited by oblique deposition in accordance with the number of laminates. In addition, as a third method, a laminate structure composed of a dielectric film and an inorganic particle thin film is repeatedly formed on a thin film (metal lattice film) for a reflection layer in accordance with the number of laminates, followed by etching. The inorganic particle material may have an imperfect island shape as long as it has a grain boundary. In addition, the dielectric layers 23 and the inorganic particle layers 25 may be formed by a method including sputtering deposition and etching in combination with a method using oblique sputtering deposition. When the above manufacturing processes are carried out, the type of substrate material is not particularly limited; however, when the substrate is used for a projector generating a large amount of heat, quartz or sapphire, having a high thermal conductivity, is preferably used.

Incidentally, in the polarizing element 30 having the structure as described above, since the light emission surface (reflection layer 22) is formed of a metal, when light returns, the reflectance is unfavorably increased. Accordingly, also in this embodiment, the emission-surface stray-light countermeasure described above is preferably used.

Figure 11:
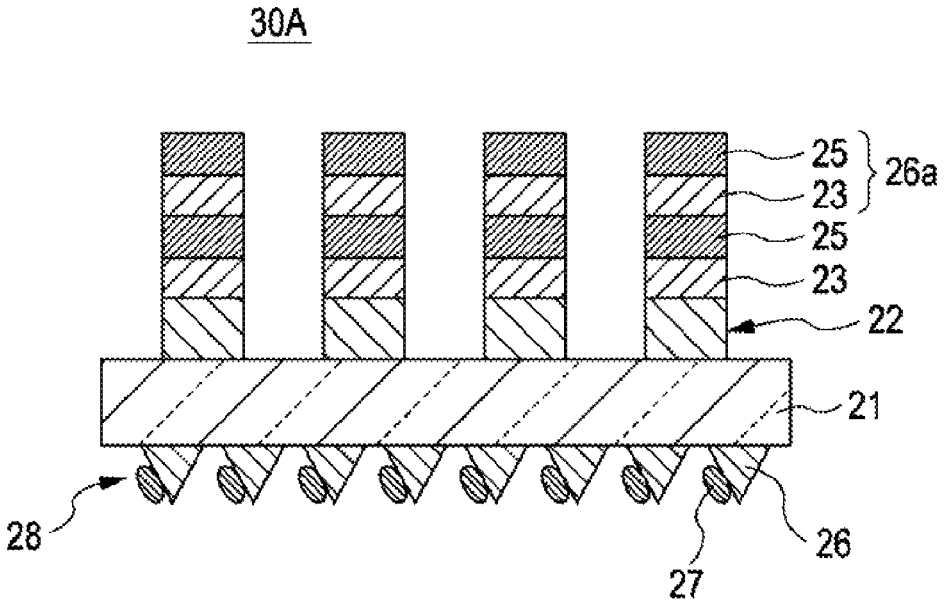
FIG. 11 is a view showing an example (1) of an emission-surface stray-light countermeasure of the polarizing element having the structure shown in FIGS. 10A and 10B.
Figure 12:
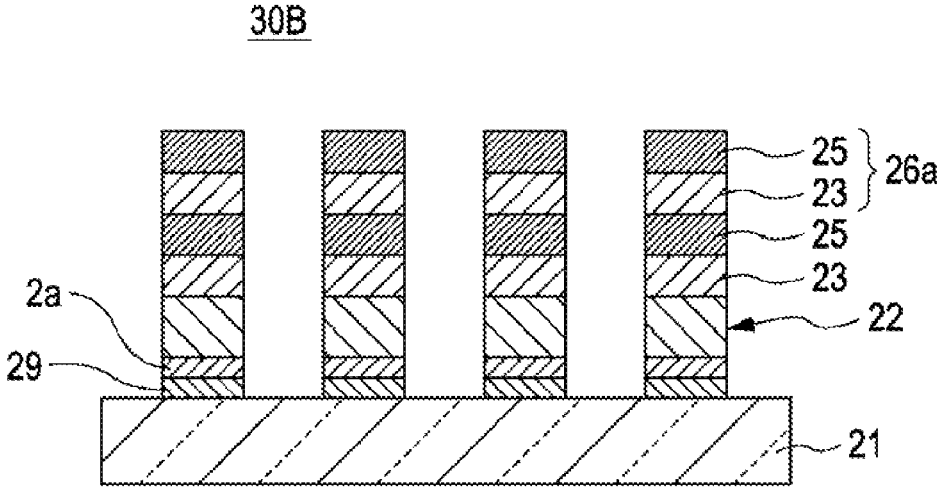
FIG. 12 is a view showing an example (2) of the emission-surface stray-light countermeasure of the polarizing element having the structure shown in FIGS. 10A and 10B.

FIGS. 11 and 12 each show an example of an emission-surface stray-light countermeasure of this embodiment.

FIG. 11 shows an example in which the structure shown in FIG. 8 is used in this embodiment.

A polarizing element 30A is formed such that in the polarizing element 30, on the surface (rear surface) of the substrate 21 opposite to that on which the reflection layers 22 are formed, there are provided the selective light absorption layers 28 having optical anisotropic properties for a polarized wave, each of which is composed of the convex portion 26 of a dielectric material and the second inorganic particle layer 27 formed on the top part or at least one side surface part of the convex portion 26.

FIG. 12 shows an example in which the structure shown in FIG. 9 is used in this embodiment.

A polarizing element 30B is formed such that in the polarizing element 30, the antireflection layers 29 are provided under the reflection layers 22 having a one-dimensional lattice pattern, and the dielectric layers 2a are provided between the reflection layers 22 and the antireflection layers 29 in order to obtain the interference effect. In this embodiment, in FIG. 12, the dielectric layer 2a under the reflection layer 22 may not be provided, and the antireflection layer 29 may be directly provided under the reflection layer 22. In addition, when the antireflection layer 29 is formed from the same material as that for the inorganic particle layer 25, improvement in contrast can be obtained; however, in order to simply prevent reflection of return light, as the antireflection layer 29, a layer (low reflection layer) having a reflectance lower than that of the reflection layer 22 may be provided thereunder. As a low reflection material, any material having a reflectance lower than that of the reflection layer 22 has the effect, and for example, carbon, an oxide film, such as oxygen-deficient $SiO_2$, metal particles, or semiconductor particles may also be used.

In the case in which the antireflection layer 29 and the dielectric layer 2a are provided under the reflection layer 22, or the antireflection layer 29 is directly formed under the reflection layer 22, when these films are formed before a film for the reflection layers is formed and are simultaneously etched when the reflection layers 22 are formed by etching, these layers can be formed only under the strip-shaped thin films 22a of the reflection layers 22, and hence it is possible not to give any influences on the transmission properties.

In addition, in the second embodiment, if desired, when the front and the rear surfaces of the substrate are coated with antireflection films, reflection at the interface between air and the substrate is prevented, and as a result, the transmission-axis transmittance can be improved. As the antireflection film, for example, there may be used a low refractive-index film of $MgF_2$ or the like, which is generally used, or a multilayer film composed of a low refractive-index film and a high refractive-index film In addition, after the structure shown in FIGS. 5A and 5B or FIG. 7 is formed, when a material, such as $SiO_2$, transparent in a service bandwidth region is applied on surfaces of the above structure as a protective film so that the thickness thereof has no influences on the polarization properties, it is preferable since the reliability, such as humidity resistance, is effectively improved. However, since the optical properties of inorganic particles are influenced by the refractive index of the surrounding material, the polarization properties may be changed in some cases when the protective film is formed. In addition, since the reflectance to incident light is also changed by the optical thickness (refractive index×thickness of protective film) of the protective film, a protective film material and the thickness thereof are to be determined in consideration of the above influences. As the protective film material, a material having a refractive index of 2 or less and an extinction coefficient of approximately zero is preferable. As the material described above, $SiO_2$ and $Al_2O_3$ may be mentioned by way of example. The materials mentioned above may be formed into films, for example, by a general vacuum film formation method (such as a chemical vapor deposition method, a sputtering method, or an evaporation method), or a spin coating method or a dipping method, which uses a sol in which the above material is dispersed in a liquid. Furthermore, a self-organizing film, as disclosed in J. Microelectromechanical Systems Vol. 10, No. 1, 2001, pp. 33 to 40, may also be used. In order to improve humidity resistance, a hydrophobic self-organizing film is preferable. Perfluorodecyltrichlorosilane (FDTS) and Octadecanetrichlorosilane (OTS) may be mentioned by way of example. Since having hydrophobic properties, the above materials are also effective in terms of antifouling. The materials mentioned above are commercially available from chemical drug producers, such as Gelest Inc., USA, and film formation can be performed by dipping. In addition, the film formation may also be performed by vapor phase growth, and an exclusive machine therefor is sold by Applied Microstructure Inc., USA. In the case of a silane-based self-organizing film as described above, in order to improve the adhesion, after $SiO_2$ is applied on the polarizing element by the method described above to form an adhesive layer, the self-organizing film may be deposited.

Next, a liquid crystal projector of an embodiment will be described.

The liquid crystal projector of this embodiment according to the present invention has a lamp as a light source, a liquid crystal panel, and one of the polarizing elements 10, 20, 20A, 20B, 30, 30A, and 30B.

Figure 13:
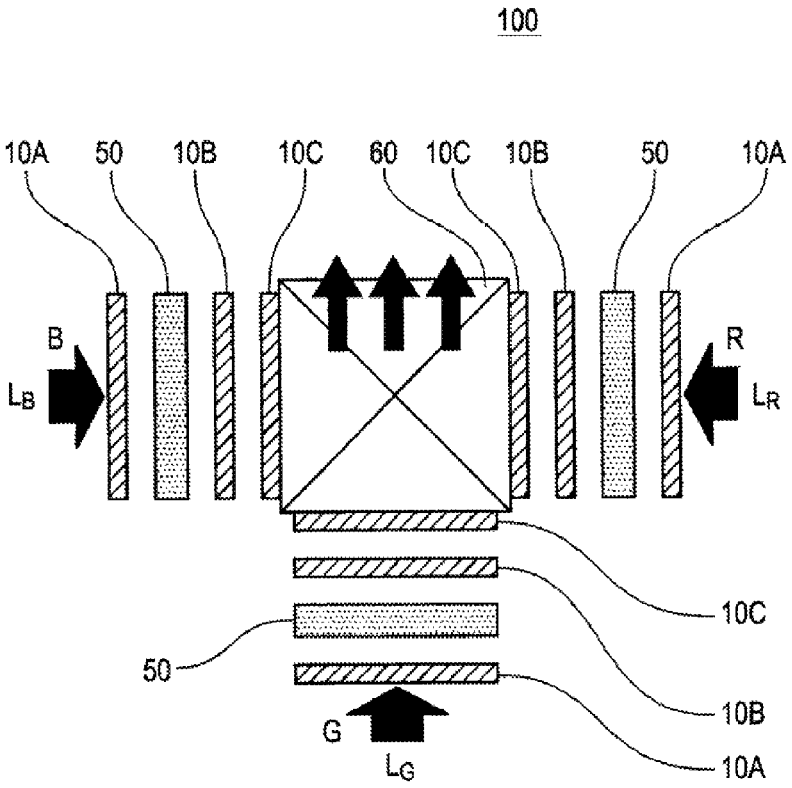
FIG. 13 is a cross-sectional view showing the structure of an optical engine portion of a liquid crystal projector of an embodiment.

FIG. 13 is a cross-sectional view showing a structural example of an optical engine portion of a liquid crystal projector of this embodiment.

The engine portion of a liquid crystal projector 100 has an incident side polarizing element 10A, a liquid crystal panel 50, an emission pre-polarizing element 10B, and an emission main polarizing element 10C for red color LR; an incident side polarizing element 10A, a liquid crystal panel 50, an emission pre-polarizing element 10B, and an emission main polarizing element 10C for green color LG; an incident side polarizing element 10A, a liquid crystal panel 50, an emission pre-polarizing element 10B, and an emission main polarizing element 10C for blue color LB; and a cross dichroic prism which synthesizes the three types of light emitted from the individual emission main polarizing elements 10C and which emits the synthesized light to a projector lens. The polarizing elements 10, 20, and 30 of the embodiments are used as the incident side polarizing element 10A, the emission pre-polarizing element 10B, and the emission main polarizing element 10C, respectively.

In the liquid crystal projector 100 of this embodiment, after light emitted from a light source lamp (not shown) is separated into the red light LR, the green light LG, and the blue light LB by a dichroic mirror (not shown), these three types of light are injected into the respective incident side polarizing elements 10A, are then polarized thereby, and are further spatial-modulated by the respective liquid crystal panels 50, and these three types of light thus processed are then emitted therefrom. Subsequently, the red light LR, the green light LG, and the blue light LB thus emitted pass through the respective emission pre-polarizing elements 10B and emission main polarizing elements 10C, are then synthesized in the cross dichroic prism 60, and are subsequently emitted from the projector lens (not shown). Even when the light source lamp is a high power type, since the polarizing elements 10, 20, and 30 of the embodiments have superior light resistance against intense light, a highly reliable liquid crystal projector can be realized.

In addition, the polarizing elements of the embodiments are not limited to application for the liquid crystal projector and are preferably used as a polarizing element to be used in high temperature environments. For example, the polarizing elements of the embodiments according to the present invention may be used as a polarizing element for car navigation systems and/or liquid crystal displays.

EXAMPLES

Hereinafter, the verification results of polarization properties of the polarizing element of the embodiment will be described.

Example 1

First, the optical properties of inorganic particle layers formed by the oblique sputtering deposition shown in FIG. 4 were verified.

Figure 14A:
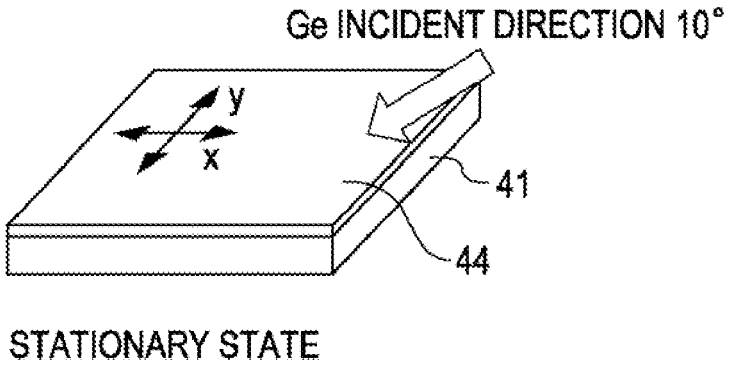
FIG. 14A is a schematic view illustrating a method for performing oblique sputtering deposition of Ge on a stationary substrate.
Figure 14B:
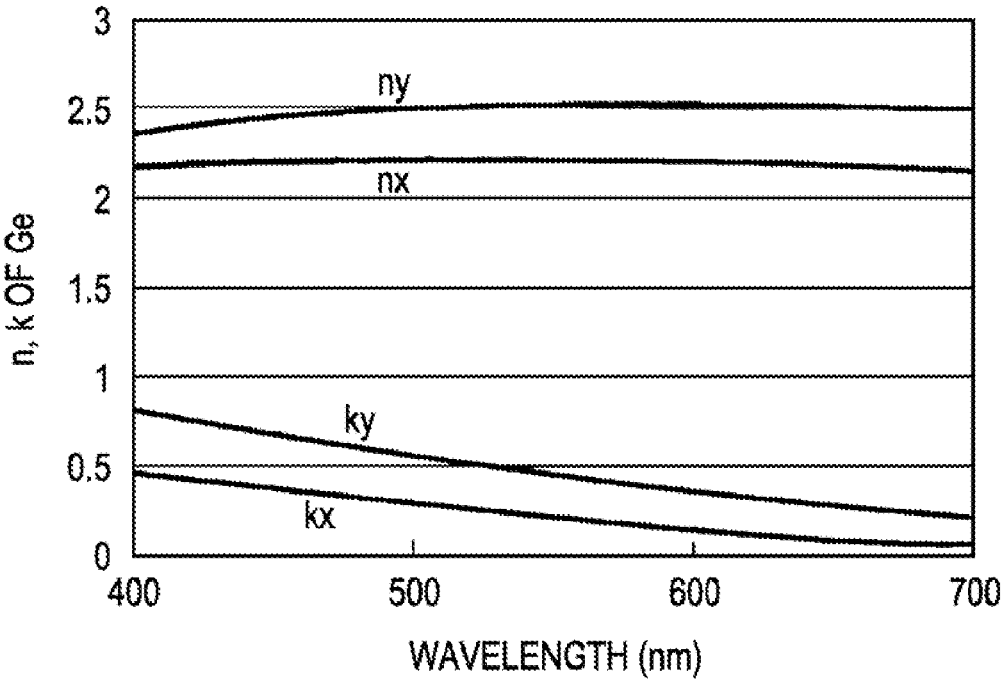
FIG. 14B is a graph showing measurement results of optical constants of a Ge film formed by the method shown in FIG. 14A.
Figure 15A:
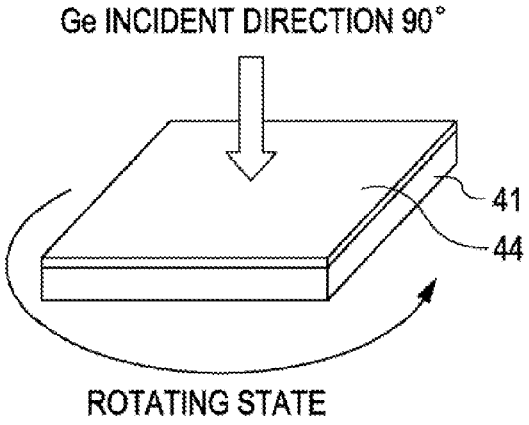
FIG. 15A is a schematic view illustrating a method for performing sputtering deposition of Ge (incident in a vertical direction) on a rotating substrate.
Figure 15B:
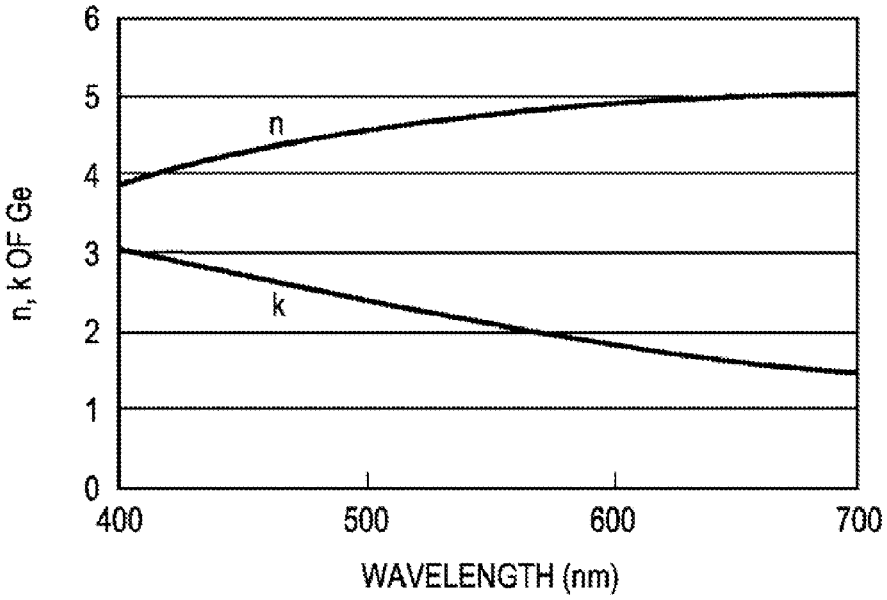
FIG. 15B is a graph showing measurement results of optical constants of a Ge film formed by the method shown in FIG. 15A.

In FIGS. 14A and 14B, experimental results of an optical anisotropy enhancement effect by the oblique ion beam sputtering are shown. As shown in FIG. 14A, by an ion beam sputtering method, Ge particles were sputtered in a 10° direction with respect to the surface of a stationary glass substrate 41 and deposited thereon, so that a Ge particle film 44 was formed. In FIG. 14B, measurement results of optical constants (refractive index and extinction coefficient) of the Ge particle film 44 thus formed are shown. The measurement was performed using a spectral ellipsometer. The thickness for this measurement was 10 nm. In this experiment, since optical anisotropic properties were generated, the in-plane optical constants were different; that is, refractive indexes n in different directions were different from each other, and extinction coefficients k in different directions were also different from each other. In addition, for comparison purposes, when Ge particles were deposited on the substrate 41 in a direction perpendicular thereto while the substrate 41 is rotated, as shown in FIG. 15A, as the optical constants of the Ge particle film 44 thus obtained, the refractive index n and the extinction coefficient k both showed no optical anisotropic properties, as shown in FIG. 15B, and the individual optical constants were close to literature values.

Figure 16A:
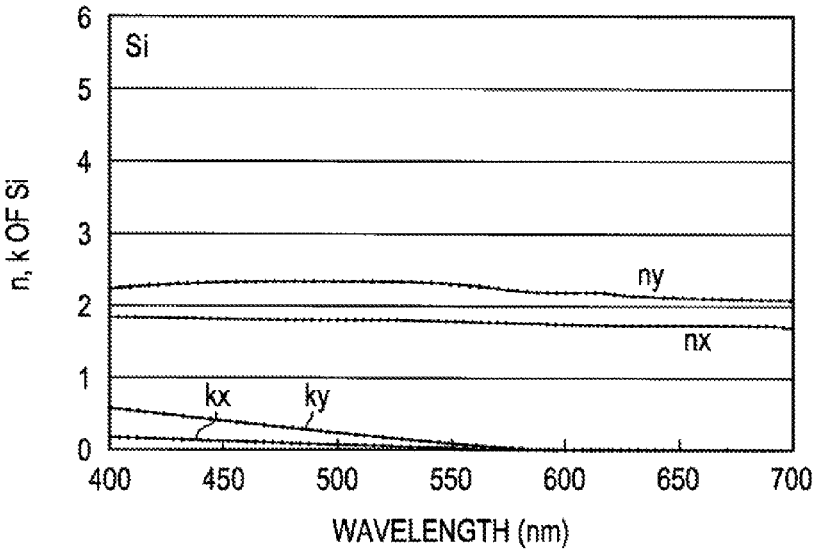
FIGS. 16A and 16B are graphs each showing measurement results of optical constants of a Si film obtained by sputtering deposition.
Figure 16B:
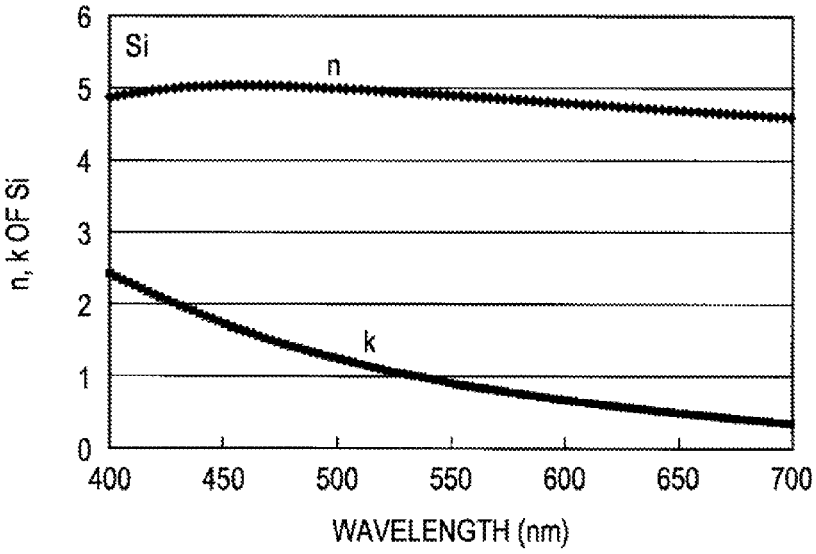

In addition, after the composition of the target 2 was changed from Ge to Si, a Si particle film was formed on the glass substrate 41 under the same conditions as those in the case of the Ge sputtering deposition, and the optical constants were measured. The results are shown in FIGS. 16A and 16B.

Also in the case of Si, when sputtering deposition was performed in a 10° direction with respect to the surface of the glass substrate 41 (FIG. 16A), since optical anisotropic properties were generated, it was found that in-plane optical constants in different directions were different from each other; that is, the refractive indexes n in different directions were different from each other, and the extinction coefficients k in different directions were also different from each other. In addition, when sputtering deposition was performed perpendicular to the substrate 41 while the substrate 41 was rotated (FIG. 16B), optical anisotropic properties of the optical constants, that is, of the refractive index n and the extinction coefficient k, were not generated.

Figure 17:
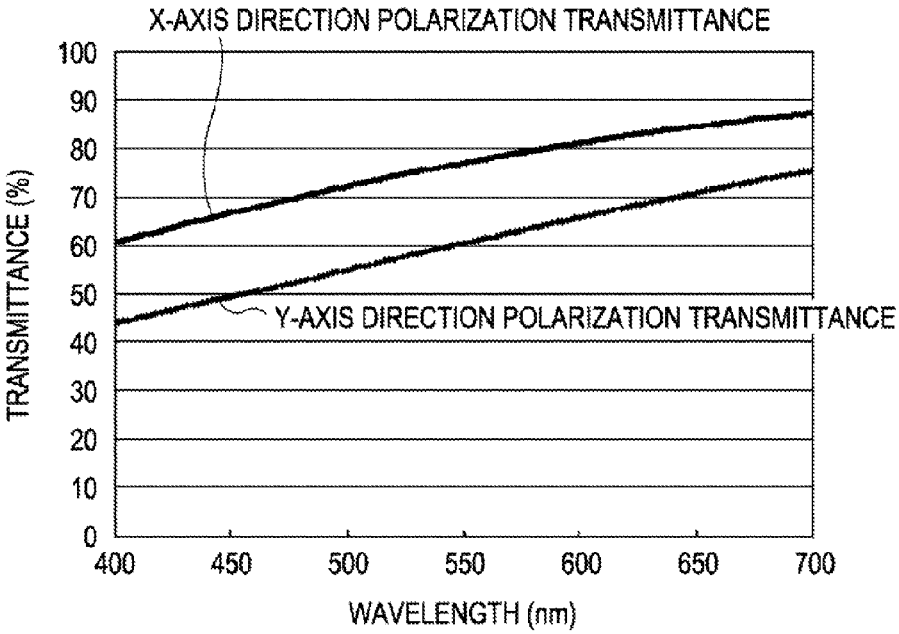
FIG. 17 is a graph showing polarization transmission properties of a Ge film having an optical anisotropy.

Next, the polarization transmittance was obtained by simulation calculation in the case in which the Ge particle film 44 was formed to have a thickness of 20 nm on the glass substrate 41 under the conditions shown in FIG. 14A. The results are shown in FIG. 17. In this case, the polarization transmittances were calculated using an optical constant in the X-axis direction for light in which its electric field vibrated parallel with the X-axis direction and an optical constant in the Y-axis direction for light in which its electric field vibrated in the Y-axis direction. According to the results, because of the optical anisotropic properties, the transmittances in different polarization directions were different from each other. That is, when a film having optical anisotropic properties as described above is used for a material for a polarizing element, improvement in properties thereof can be expected.

Example 2

Figure 18A:
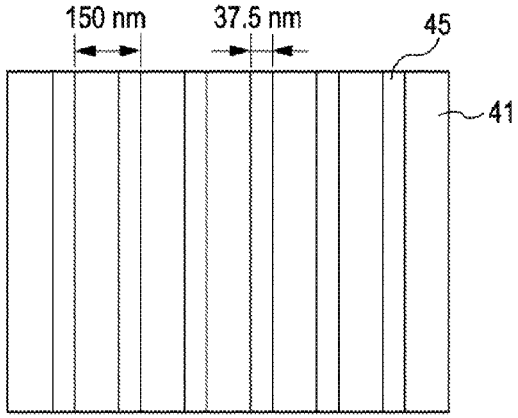
FIGS. 18A and 18B are schematic views each showing a sample structure of Example 2.
Figure 18B:
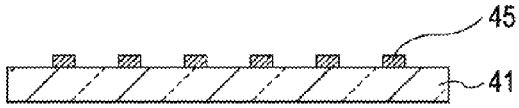

Next, influences of the optical anisotropic properties of the inorganic particle layer on a polarizing element were investigated. In particular, by using the polarizing elements having the structures shown in FIGS. 1A and 1B and FIGS. 5A and 5B, the polarization properties thereof were obtained by a rigorous coupling wave analysis (RCWA). In this measurement, as shown in FIGS. 18A and 18B, the structure was formed in which inorganic particle layers 45 made of Ge were provided on the glass substrate 41 to form a wire grid structure, and the dimensions of the inorganic particle layers 45 were set such that the pitch was 150 nm and the line width (Ge lattice direction width) was 37.5 nm. In addition, when the inorganic particle layers 45 had the optical anisotropic properties (by the method shown in FIG. 14A), the thickness was assumed to 100 nm, when the inorganic particle layers 45 had no optical anisotropic properties (by the method shown in FIG. 15A), the thickness was assumed to 10 nm, and the calculation was performed based on the above conditions. The results are shown in FIG. 19.

Figure 19:
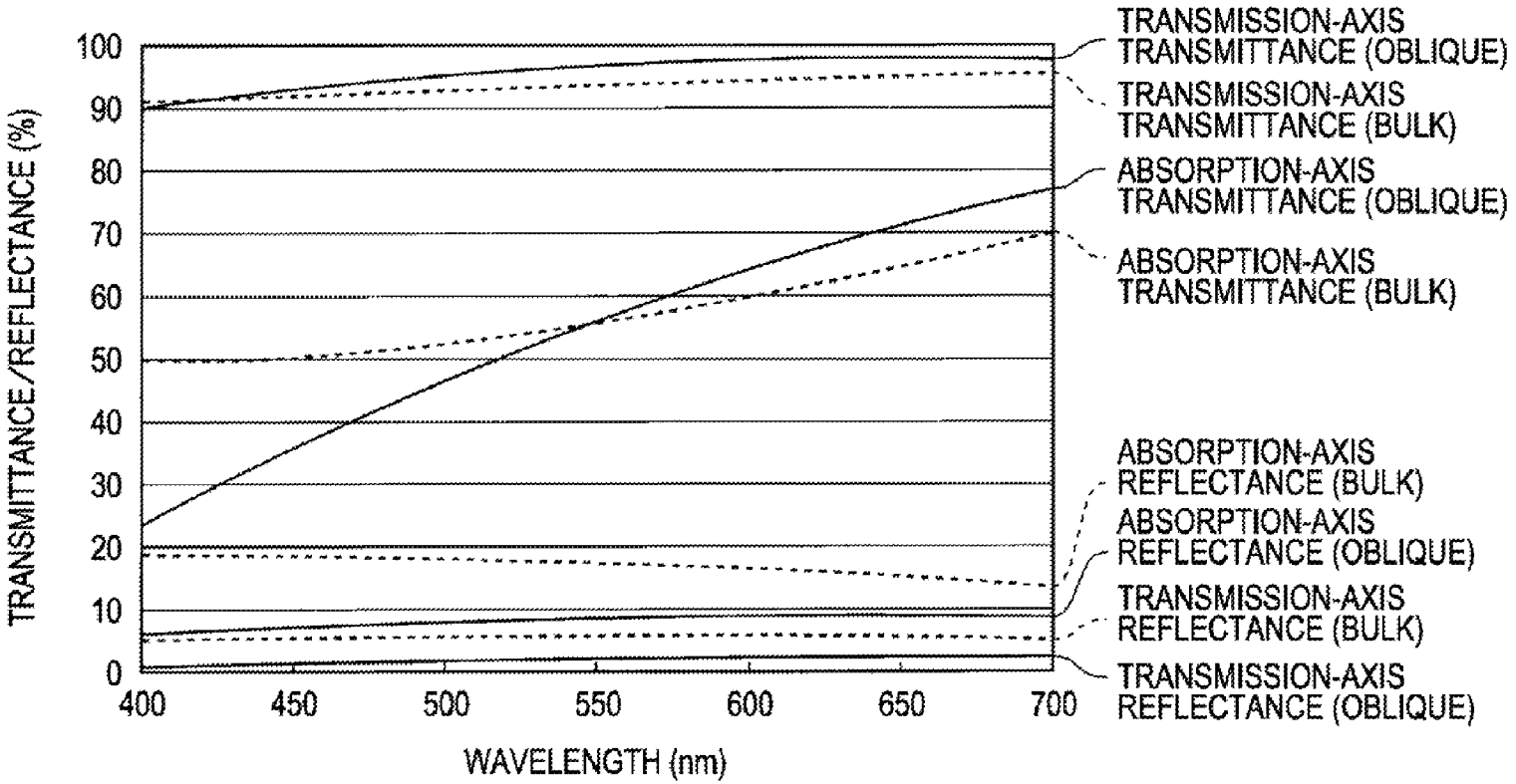
FIG. 19 is a graph showing results of optical properties of Example 2.

According to the results shown in FIG. 19, when the optical anisotropic properties were not present (data shown by dotted lines indicated as "bulk"), in a visible region having a wavelength of 550 nm or less (that is, in the green and the blue region) which was important for an optical engine application such as a projector, although the thickness was small, the absorption-axis transmittance was high and the reflectance was also high as compared to the case in which the optical anisotropic properties were present (data shown by solid lines indicated as "oblique"). On the other hand, when the optical anisotropic properties were present, the absorption-axis transmittance was low and the reflectance was also low. Accordingly, as the absorption type, preferable properties were obtained. In this calculation, when the optical anisotropic properties were not present, the thickness was assumed to 10 nm. When the thickness is increased, the absorption-axis transmittance is decreased; however, at the same time, the reflectance is unfavorably increased. Hence, preferable properties as a polarizing element having the optical anisotropic properties cannot be obtained by the thickness adjustment.

Example 3

FIG. 19 shows the example in which the inorganic particle layer was a single layer, and results similar to those described above can also be obtained for a polarizing element having the multilayer structure of inorganic particle layers, shown in FIG. 10.

Figure 20:
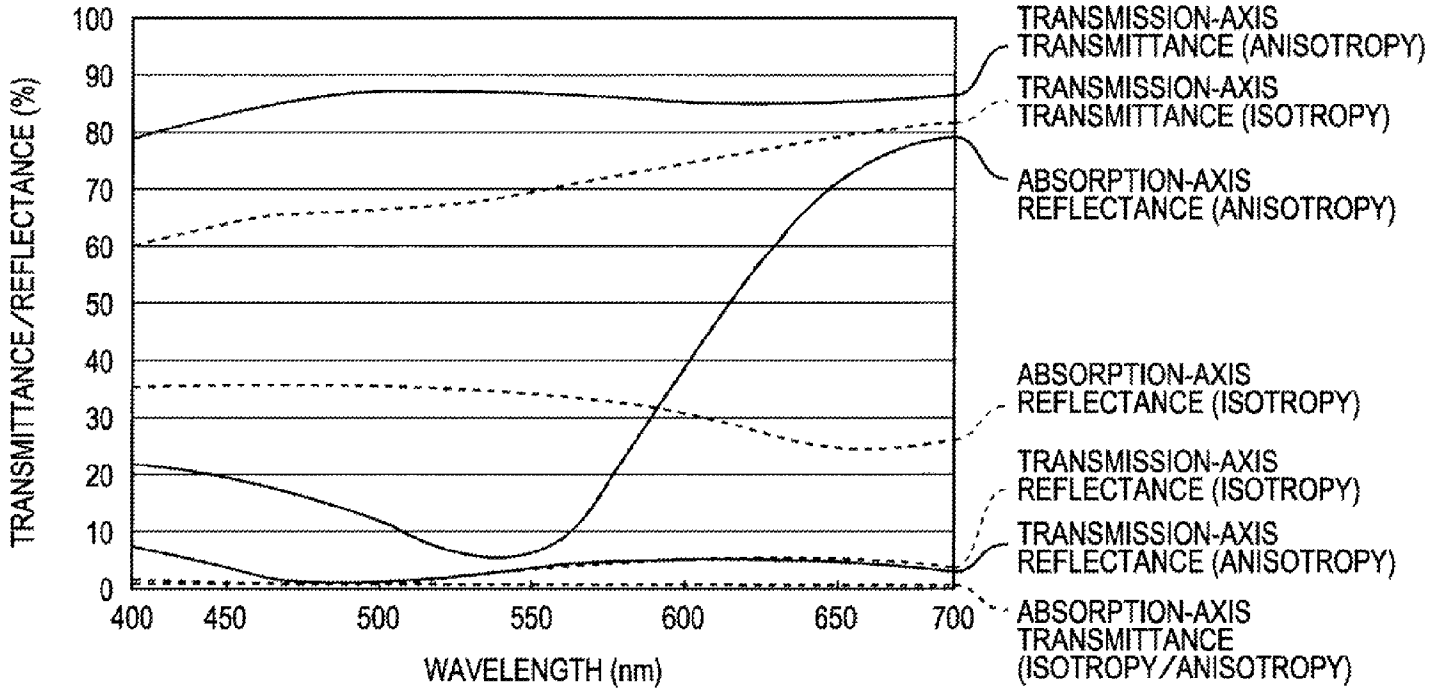
FIG. 20 is a graph showing results of optical properties of Example 3.

In the polarizing element having a multilayer structure, polarization properties obtained when inorganic particle layers of Ge were formed by the method shown in FIG. 14A to have the optical anisotropic properties, and polarization properties obtained when inorganic particle layers of Ge were formed by the method shown in FIG. 15A were calculated by a rigorous coupling wave analysis (RCWA). In addition, the multilayer structure used in this example was composed of Ge (15 nm), an Al reflection layer (240 nm), a SiO2 dielectric layer (205 nm), and a Ge inorganic particle layer (90 nm) provided at the front surface side of the substrate in that order therefrom (value in the parentheses indicates the thickness), and the dimensions of the inorganic particle layers were set such that the pitch was 150 nm, and the line width (Ge lattice direction width) was 37.5 nm. In addition, in order to suppress the influence of stray light caused by re-reflection of return light returning to a polarizing element emission surface, a Ge layer was provided at the substrate side closer than the reflection layer. The calculation results are shown in FIG. 20.

When the optical anisotropic properties were not present (data shown by dotted lines indicated as "isotropy"), as was the case of the single layer (FIG. 19), in a visible region having a wavelength of 550 nm or less, the absorption-axis reflectance was high and the transmission-axis transmittance was low as compared to those obtained when the optical anisotropic properties were present (data shown by solid lines indicated as "anisotropy"). Accordingly, as an absorption type polarizing element, the above properties were not preferable. As described above, the effect of the optical anisotropic properties on the polarization properties of the polarizing element was significant.

Example 4

When inorganic particle layers having the optical anisotropic properties as described above are used for a polarizing element, the polarization properties can be improved. In addition, the optical constants of the inorganic particle layer preferably satisfy such that the transmission-axis direction optical constant is smaller than the absorption-axis direction optical constant, that is, it is important to satisfy the relationships in which the transmission-axis direction refractive index is smaller than the absorption-axis direction refractive index and in which the transmission-axis direction extinction coefficient is smaller than the absorption-axis direction extinction coefficient. Examples illustrating the above relationships are shown in FIGS. 21 and 22.

Figure 21:
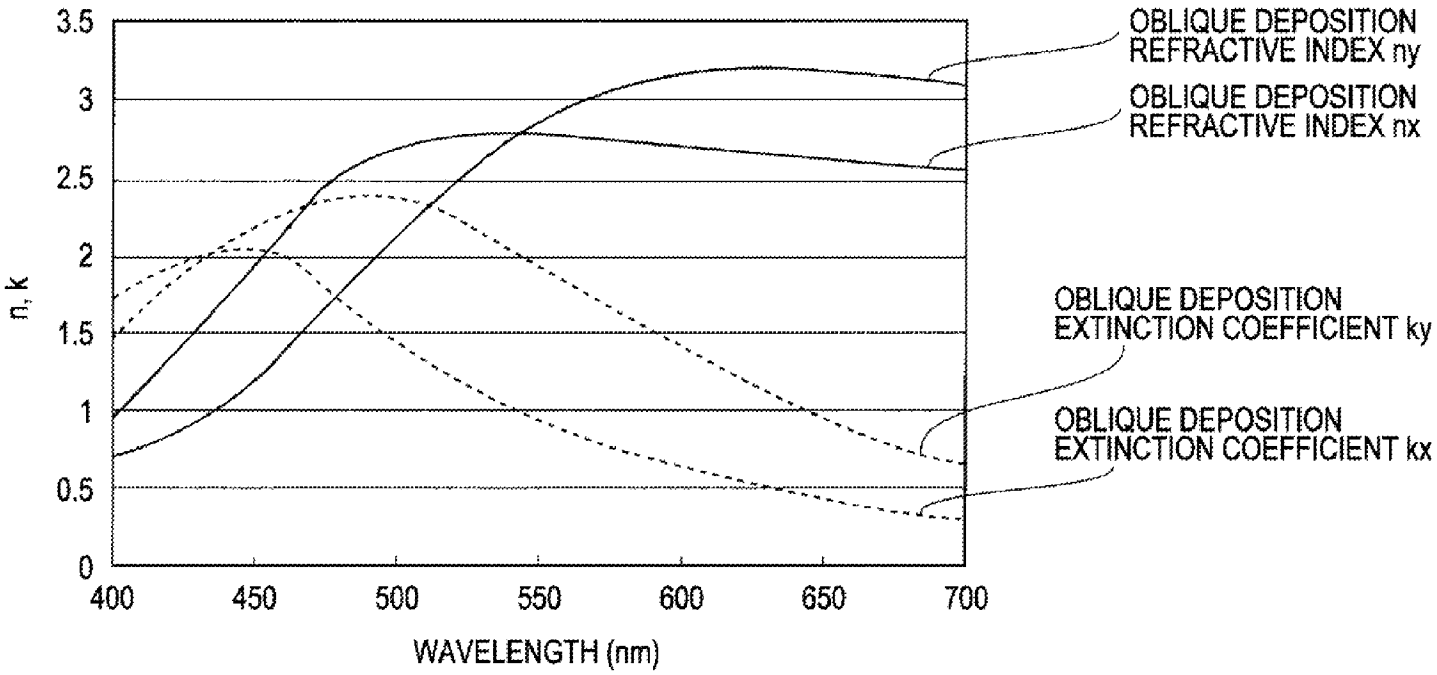
FIG. 21 is a graph showing optical constants of an inorganic particle layer composed of Ag and having an optical anisotropy.

FIG. 21 shows the optical constants of an Ag film (inorganic particle layer 25) of a polarizing element having the structure shown in FIGS. 5A and 5B, the Ag film being formed by an oblique sputtering deposition method using Ag to form the inorganic particle layer 25. Also in this case, the optical anisotropic properties were obtained as was the case of Ge. However, as shown in FIG. 21, in the vicinity of a wavelength of 550 nm, the relationship between the refractive indexes in the X and Y directions was reversed, and in the vicinity of a wavelength of 440 nm, the relationship between the extinction coefficients in the X and Y directions was reversed.

Figure 22:
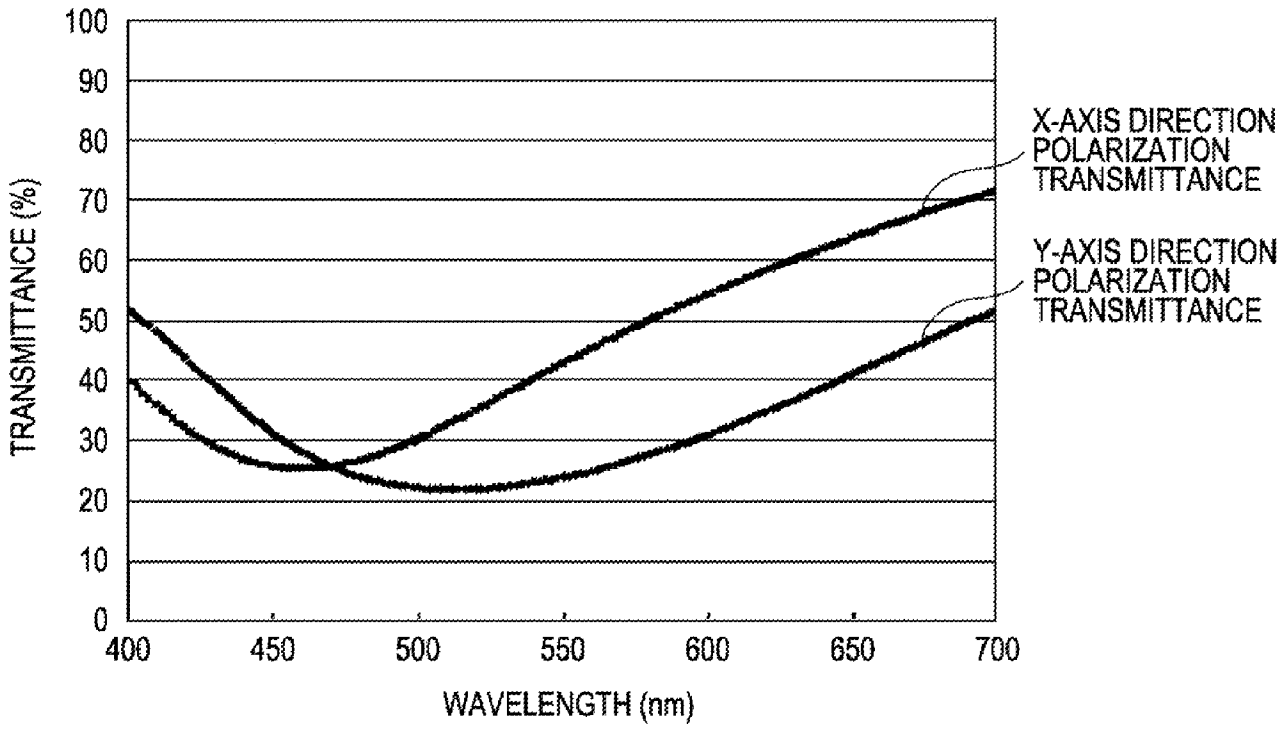
FIG. 22 is a graph showing polarization transmission properties of a polarizing element having the inorganic particle layers shown in FIG. 21.

As was the case shown in FIG. 17, FIG. 22 shows the results of the polarization transmittance obtained when the Ag film thickness was 20 nm, which were obtained by calculation using the optical constants of the Ag film (inorganic particle layer 25) shown in FIG. 21. The polarization transmittance was decreased as the wavelength was decreased, and in the vicinity of a wavelength of 450 nm, the relationship between the polarization transmittances in the X and Y directions was reversed. This was caused by the reversion of the optical constant shown in FIG. 21, and when the above inorganic particle layer is used for a polarizing element, the reversion property as described above is not preferable since it indicates a decrease in polarization transmittance. In addition, when the extinction coefficient along the absorption axis is large, the absorption index is high, and along the transmission axis, light incident from an air layer is preferably transmitted without being attenuated and/or reflected. That is, a lower refractive index is more preferable (since the refractive index of air is 1). Accordingly, as the preferable optical constants of the inorganic particle layer, the optical properties in a service bandwidth are not reversed, and the transmission-axis direction optical constant is smaller than the absorption-axis direction optical constant; that is, in other words, the relationships are satisfied so that the transmission-axis direction refractive index is smaller than the absorption-axis direction refractive index and so that the transmission-axis direction extinction coefficient is smaller than the absorption-axis direction extinction coefficient.

Example 5

Next, the relationship between the optical anisotropic properties and the inorganic particles of the polarizing element of the embodiment according to the present invention was investigated.

(1) Inorganic Particle Layer on a Flat Plate

First, by using a substrate having a smooth and flat surface, which was a single crystal Si substrate provided with a SiO2 film having a thickness of 10 nm, a Ge particle film was formed under the same conditions as those in Example 1 (oblique sputtering deposition, and sputtering deposition in a direction perpendicular to the substrate surface), and the shape of Ge particles of the Ge particle film was observed by an atomic force microscope (hereinafter referred to as "AFM"). The results are shown in FIGS. 23A and 23B.

Figure 23A:
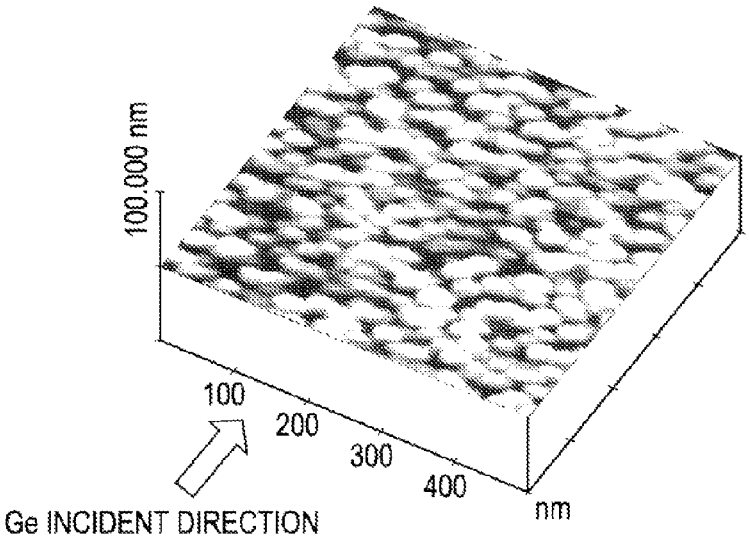
FIGS. 23A and 23B are photographs each showing a surface texture of an inorganic particle layer on a flat plate.
Figure 23B:
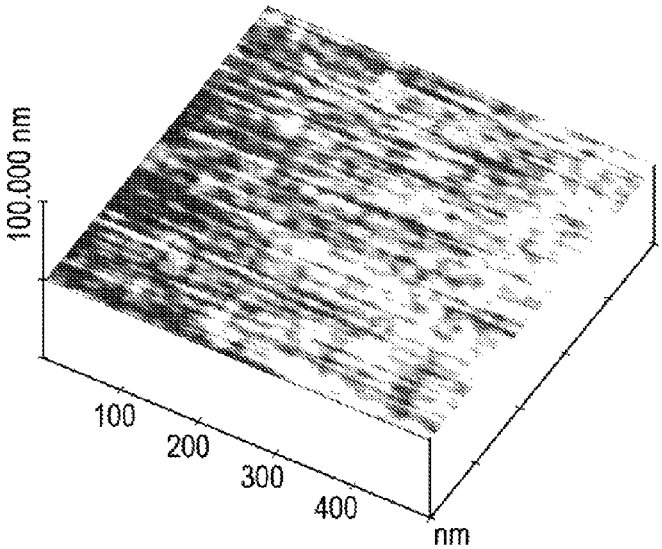

In a sample obtained by oblique sputtering deposition, shown in FIG. 23A, individual particles were clearly observed, and in the particles, shape anisotropic properties were generated such that the diameter in the direction perpendicular to the Ge incident direction was the major axis and the diameter in the Ge incident direction was the minor axis. On the other hand, in a sample formed by sputtering deposition in a direction perpendicular to the substrate surface, shown in FIG. 23B, since the particle size was very small, and a very smooth film surface was formed, which were observed at the same magnification as that described above, the shape of the particle could not be observed.

(2) Polarizing Element 10

Figure 24:
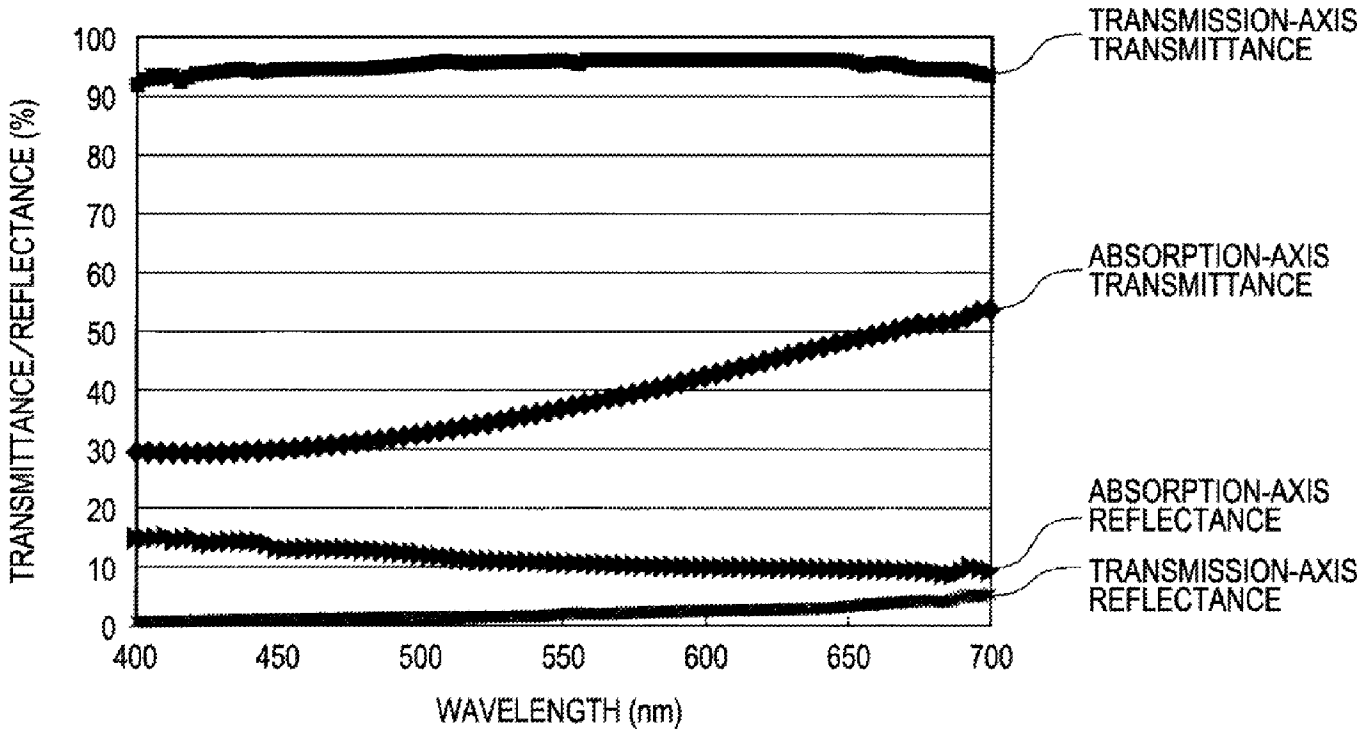
FIG. 24 is a graph showing polarization properties of a polarizing element sample having the structure shown in FIG. 3C.

Next, a sample of a polarizing element having the structure shown in FIG. 3C was formed. In this example, first, a polymer layer (mr-I 8010E manufactured by Micro Resist Technology GmbH) applied on a quartz substrate was press-molded by a thermal nanoinprinting method using a mold having a one-dimensional lattice pattern (pitch: 150 nm, line/space ratio: 0.7, and depth: 150 nm) so that the mold pattern was transferred to the polymer layer, and the quartz substrate was etched by CF4 gas and Ar gas using the polymer layer thus processed as a resist mask, so that the substrate 11 provided with the convex portions 17a extending in one direction at predetermined intervals was obtained. Subsequently, by using the ion beam sputtering apparatus shown in FIG. 4, the inorganic particle layers 15 made of Ge having a thickness of 30 nm were formed by the oblique sputtering deposition of Example 1 at a substrate inclined angle θ of 5°, and a polarizing element protective layer was formed by a vapor phase growth method using SiO2 to have a thickness of 15 nm, so that the sample was obtained. In addition, a multilayer film of SiO2/Ta2O5 was formed as an antireflection film at a rear surface side of the substrate 11 by sputtering. The polarization properties of the obtained polarizing element sample were investigated. As a result, as shown in FIG. 24, optical anisotropic properties were obtained in which the transmittance of the absorption axis was lower than that of the transmission axis.

Figure 25:
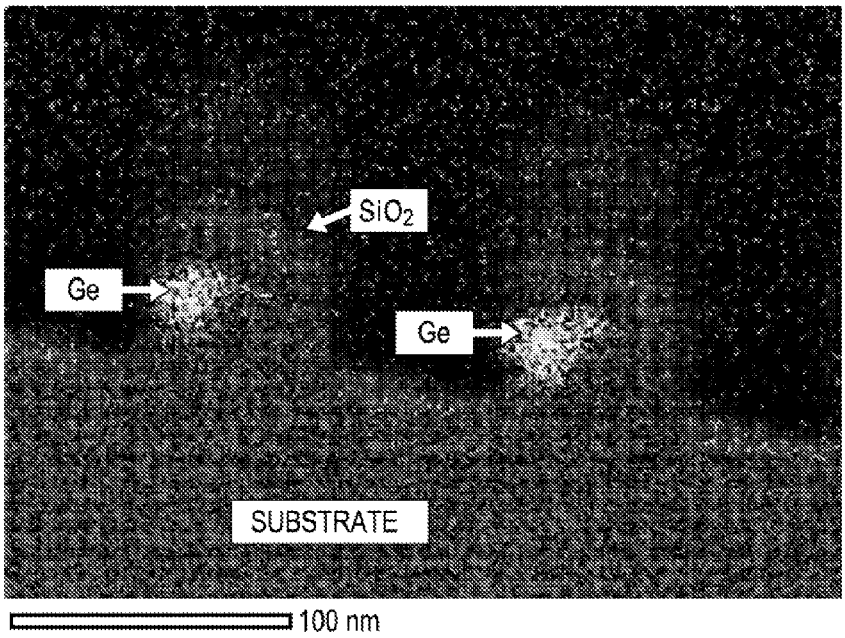
FIG. 25 is a view of element distribution mapping of a cross-section of the polarizing element sample having the structure shown in FIG. 3C.
Figure 26A:
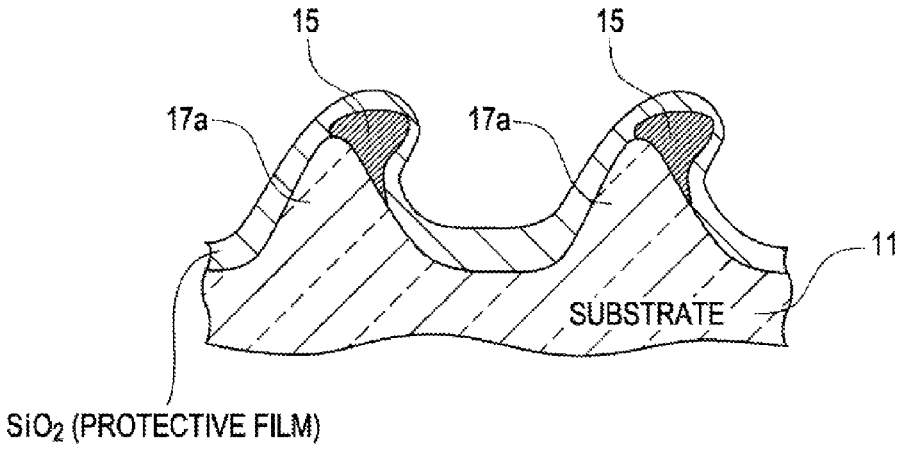
FIGS. 26A and 26B are schematic views each showing an observation result of an inorganic particle layer of the polarizing element sample having the structure shown in FIG. 3C.
Figure 26B:
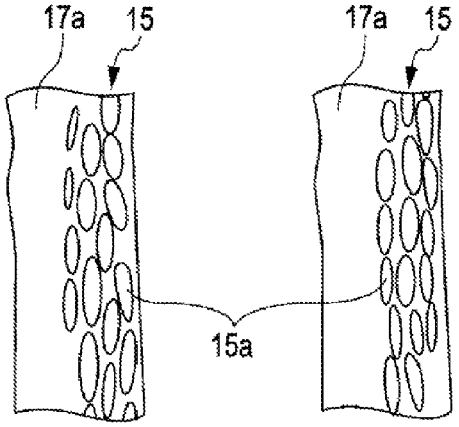

Analysis of the element distribution was performed for a cross-section of this polarizing element sample using a TEM, and it was found that as shown by element distribution mapping in FIG. 25, the inorganic particle layers 15 made of Ge were each formed from the top part to the sidewall of the convex portion 17a of the substrate primarily formed of Si. Based on this result, the inorganic particle layer 15 of this polarizing element sample was observed in detail. The results are shown in FIGS. 26A and 26B. FIG. 26A is a schematic cross-sectional view in combination with the element analysis result. In addition, FIG. 26B is a schematic plan view, observed from above.

As shown in FIG. 26B, the inorganic particle layers 15 were each formed from the top part to the sidewall part of the one-dimensional lattice convex portion 17a along the longitudinal direction thereof, and in addition, the inorganic particle layers 15 were each observed as a strip or a belt shape formed of inorganic particles 15a which had shape anisotropic properties and were continuously disposed. In addition, each inorganic particle 15a was clearly observed, and it was also observed that the long axis direction of the inorganic particle was the disposed direction and that the short axis direction was perpendicular thereto.

Figure 27:
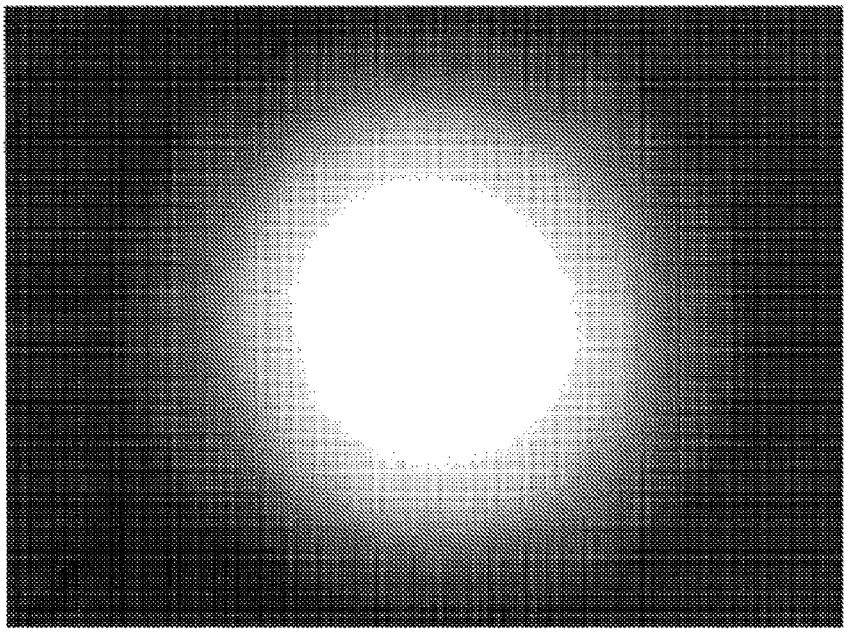
FIG. 27 is an electron beam diffraction image of the inorganic particle layer of the polarizing element sample having the structure shown in FIG. 3C.

In addition, an electron beam diffraction image of the Ge part in FIG. 25 was investigated, and as shown in FIG. 27, since no clear bright lines were observed, it was found that the crystal structure of the Ge particles 15a forming the inorganic particle layer 15 was amorphous. The amorphous indicates that the Ge particle has no crystallographic orientation. In addition, it has been known that in general, the structure of a Ge film formed by low-temperature growth tends to be placed in an amorphous state (Dubey M, Mclane G F, Jones K A, Lareau R T, Eckart D W, Han W Y, Roberts C, Dunkel J, West L C, Mat. Res. Soc. Symp. Proc. Vol. 340, pp. 411 to 416 (1994).

(3) Polarizing Element 20

Figure 28:
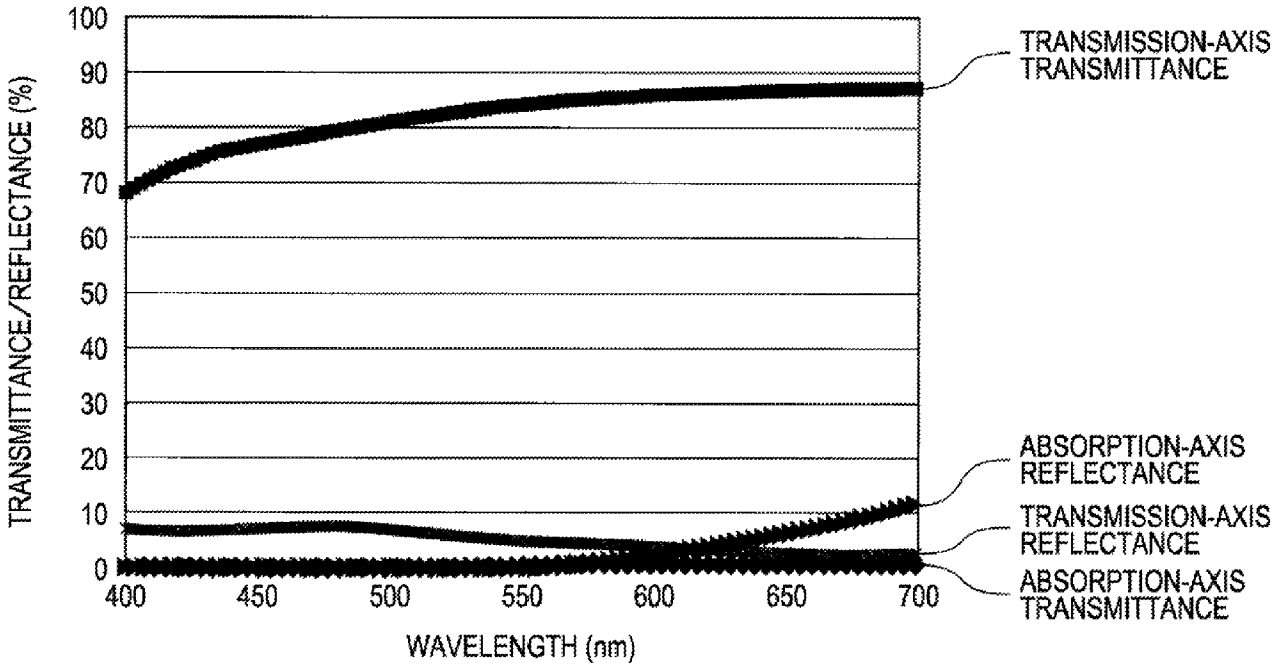
FIG. 28 is a graph showing polarization properties of a polarizing element sample having the structure shown in FIGS. 5A and 5B.
Figure 29:
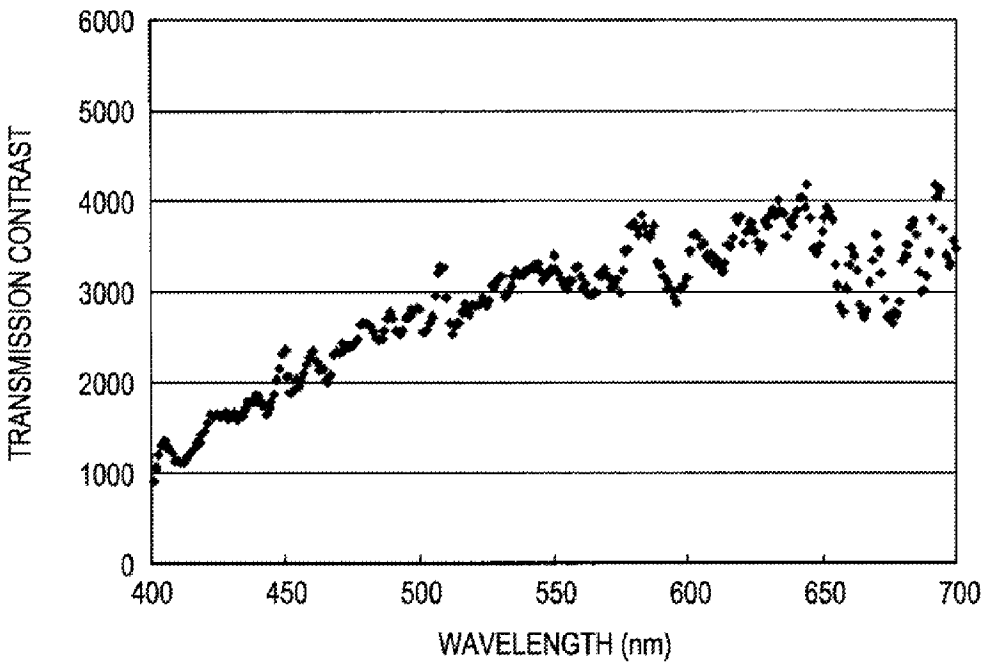
FIG. 29 is a graph showing transmission contrast of the polarizing element sample having the structure shown in FIGS. 5A and 5B.

Next, a sample of a polarizing element having the structure shown in FIGS. 5A and 5B was formed. In this example, after an aluminum lattice having a pitch of 150 nm and a lattice depth of 200 nm was formed as the reflection layers 22 on the substrate 21 made of glass (Corning 1737), and the dielectric layers 23 were then formed using SiO2 on the reflection layers 22 to have a thickness of 30 nm, oblique sputtering deposition was performed under the same conditions as those of the polarizing element 10 of this example, so that Ge particle layers having a thickness of 30 nm were formed as the inorganic particle layers 25. Subsequently, as a topmost layer, a film of SiO2 having a thickness of 30 nm was formed as a protective film, so that the polarizing element sample shown in FIGS. 5A and 5B was formed. In FIG. 28, the polarization properties of this polarizing element sample are shown. The transmittance of the absorption axis was approximately zero, and the reflectance was also low. In addition, the ratio of transmittance in this case is shown as contrast in FIG. 29. The contrast was 3,000 or more in a green region centered at a wavelength of 550 nm and was 1,500 or more in an entire visible light region including a blue region at a wavelength of approximately 450 nm, and hence superior properties as the polarizing element were obtained.

Figure 30A:
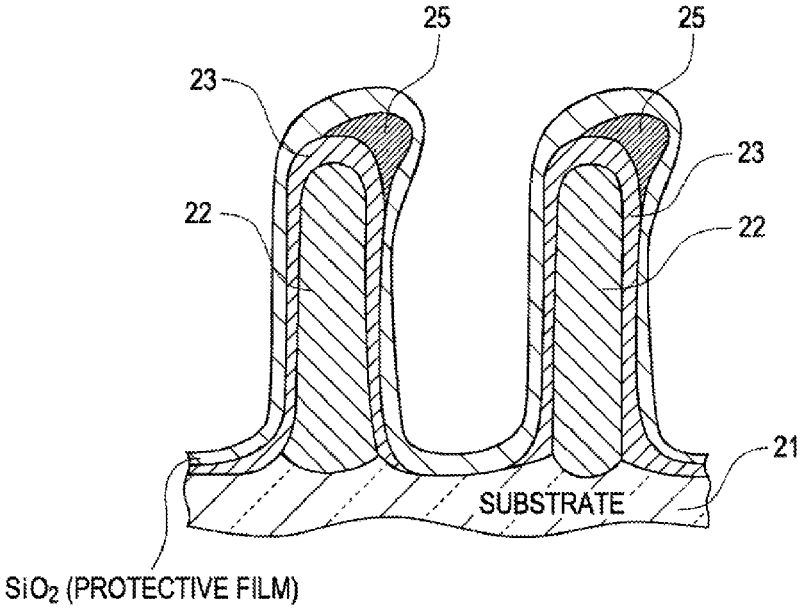
FIGS. 30A and 30B are schematic views each showing an observation result of an inorganic particle layer of the polarizing element sample having the structure shown in FIGS. 5A and 5B.

The cross-section of this polarizing element sample was observed, and it was found that as shown in a schematic view shown in FIG. 30A, the inorganic particle layers 25 made of Ge were each formed from the top part to the sidewall of the one-dimensional lattice reflection layer 22 and dielectric layer 23, which were provided on the substrate 21.

Figure 30B:
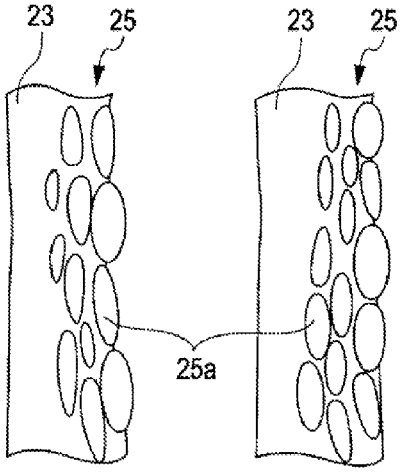
Figure 31:
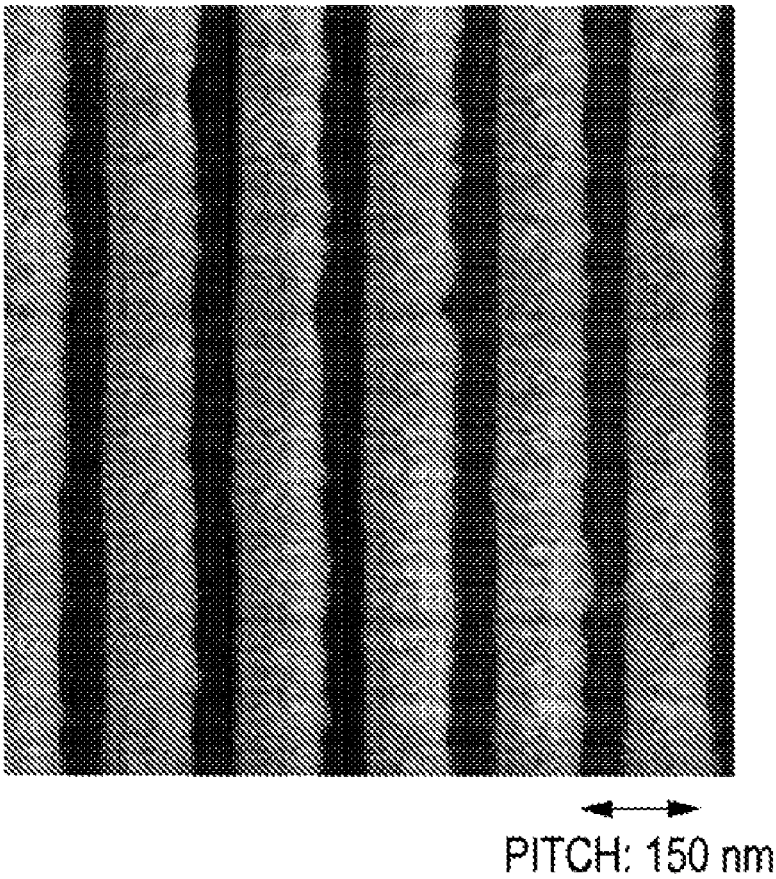
FIG. 31 is a SEM image of the polarizing element sample having the structure shown in FIGS. 5A and 5B, when viewed in plan.

In addition, in FIGS. 30B and 31, the observation results of this polarizing element sample viewed from above are shown. FIG. 30B is a schematic view, and FIG. 31 is a SEM image used for forming the above schematic view.

The inorganic particle layers 25 were each formed from the top part to the sidewall part of the one-dimensional lattice dielectric layer 23 along the longitudinal direction thereof, and in addition, the inorganic particle layers 25 were each observed as a strip or a belt shape formed of the inorganic particles 25a which had shape anisotropic properties and were continuously disposed. In addition, each inorganic particle 25a was observed such that the long axis direction of the inorganic particle was the disposed direction and the short axis direction was perpendicular thereto.

From the above results, it is found that the inorganic particles of the polarizing element of the example according to the present invention have shape anisotropic properties by oblique sputtering deposition and are formed so that when the inorganic particles are disposed in a one-dimensional lattice pattern, the long axis directions of the inorganic particles are aligned in the lattice direction of the one-dimensional lattice. In addition, the inorganic particles are placed in an amorphous state. It is believed that in the present invention, the above-described properties of the inorganic particles relates to the expression of the optical anisotropic properties. The particles having shape anisotropic properties are formed by oblique sputtering deposition, and the expression of the shape anisotropic properties is called Steering Effect (Jikeun Seo, S.-M. Kwon, H.-Y. Kim, and J.-S. Kim, Phys. Rev. B67, 121402 (2003).

Figure 32A:
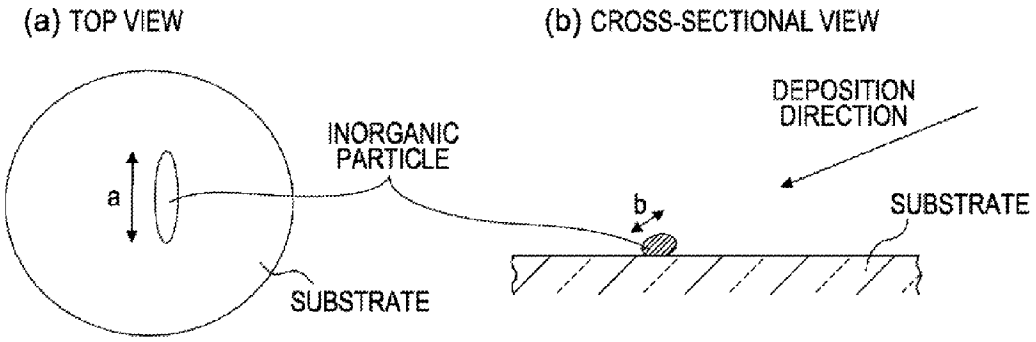
FIGS. 32A and 32B are schematic views each showing the relationship between the major axis and the thickness of an inorganic particle obtained by oblique sputtering deposition.
Figure 32B:
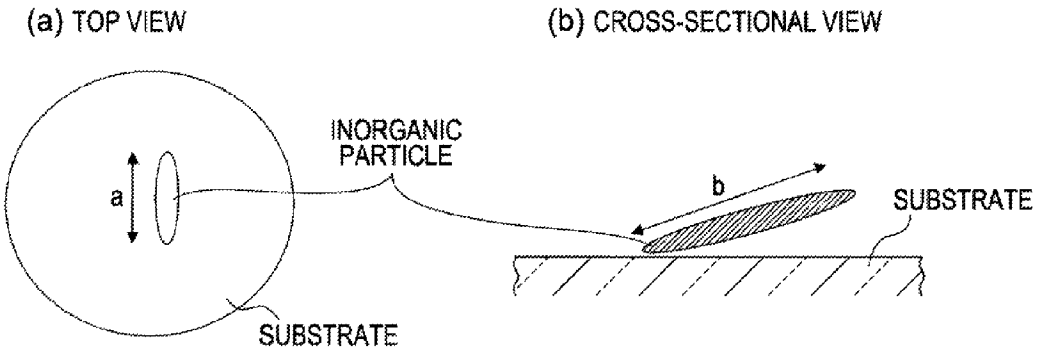

In addition, by oblique sputtering deposition, as shown in FIGS. 32A and 32B, the shape of a deposited particle is changed with the change in thickness (thickness of an inorganic particle in the growth direction), and the optical anisotropic properties are influenced thereby. That is, when a major axis diameter a of the inorganic particle is larger than a thickness b thereof (FIG. 32A), the optical anisotropic properties are shown in two directions (X and Y directions) on the substrate, and the particle major axis diameter a direction is the absorption axis. On the other hand, when the major axis diameter a of the inorganic particle is smaller than the thickness b thereof (FIG. 32B), the optical anisotropic properties are shown in the thickness direction of the inorganic particle and in the in-plane axis direction, and the particle thickness b direction is the absorption axis; hence, the directions of the optical anisotropic properties shown in FIGS. 32A and 32b are substantially reversed. In the polarizing elements 10 and 20 of the example according to the present invention, since the lattice direction is used as the absorption axis, as the thickness is increased, the polarization properties are degraded. Hence, as shown in FIG. 32A, the lattice direction is preferably used as the absorption direction in the state in which the particle major axis diameter a is larger than the particle thickness b.

In addition, although a thin film (such as a germanium thin film) having no optical anisotropic properties is formed on the dielectric layer 23 instead of the inorganic particle layer 25, when the thickness of the thin film is optimized, the reflectance in the absorption-axis direction can be suppressed. However, in this case, the reflection is suppressed dominantly by the interference effect, the wavelength band is narrow, and since absorption occurs in the transmission-axis direction, the transmission-axis transmittance is disadvantageously decreased. Furthermore, since the interference effect is sensitive to the thickness, in order to obtain desired properties, strict control of the thicknesses of the dielectric layer 23 and the germanium thin film are to be appropriately performed. On the other hand, in the present invention, since germanium particles having optical anisotropic properties are used, the degree of designing freedom is high, and also manufacturing can be easily performed.

Accordingly, by a rigorous coupling wave analysis (RCWA), the optical anisotropic properties of the inorganic particle layer 25 of the polarizing element 20 were simulated for two cases in which a thin film and fine particles were used for forming the inorganic particle layer 25 in order to obtain the difference therebetween. In this case, the reflection layer 22 was formed from Al to have a thickness of 200 nm, a lattice pitch of 150 nm, and an Al width of 45 nm, the dielectric layer 23 was formed from SiO2 to have a thickness of 30 nm. In addition, the dependences of the absorption-axis reflectance, the transmission-axis transmittance, and the transmission contrast on the thickness of the Ge thin film and the thickness of the Ge particle were calculated at a wavelength of 450 nm. In addition, as the optical constants of the Ge thin film, the values in FIG. 15B were used, and in order to obtain the optical constants of the Ge particles, in consideration of an increase in anisotropic properties when the Ge particles are formed into a lattice pattern, calculation was performed assuming that, in accordance with the model shown in FIG. 33, the particles sufficiently smaller than a wavelength of incident light were distributed in the dielectric layer and aligned in the axis direction. Furthermore, calculation was performed assuming that the volume fraction of Ge in the dielectric layer 23 was 0.4, and the aspect ratio of Ge was 20.

Figure 34A:
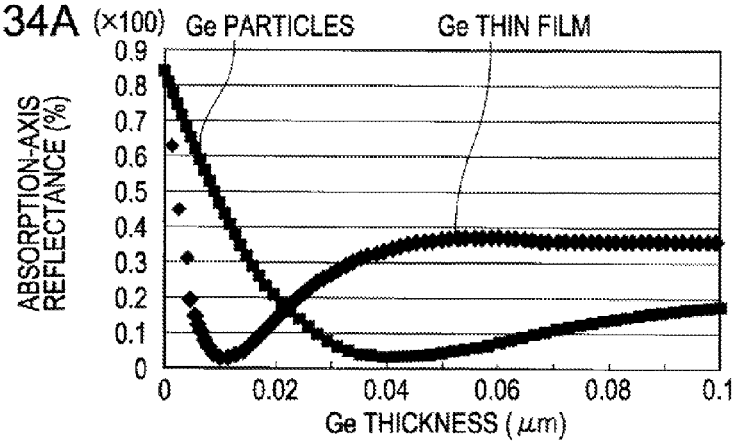
FIGS. 34A to 34C are graphs each showing optical properties of a polarizing element when a material for an inorganic particle layer is Ge particles or a Ge thin film.
Figure 34B:
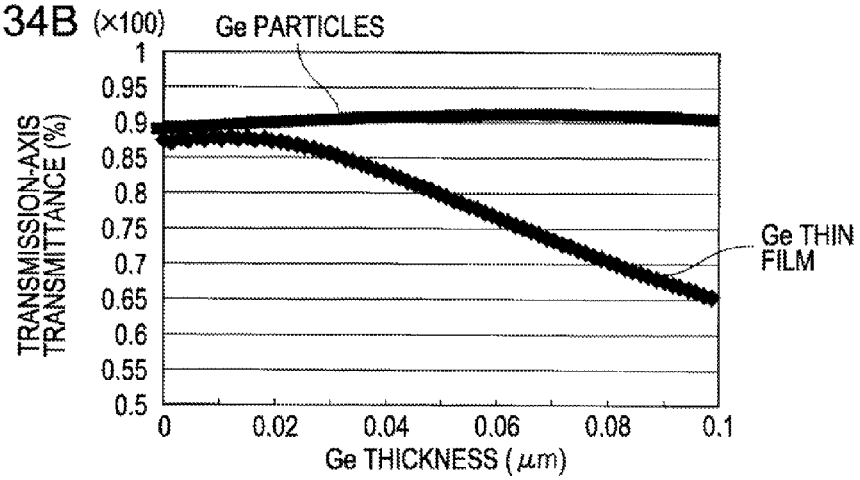
Figure 34C:
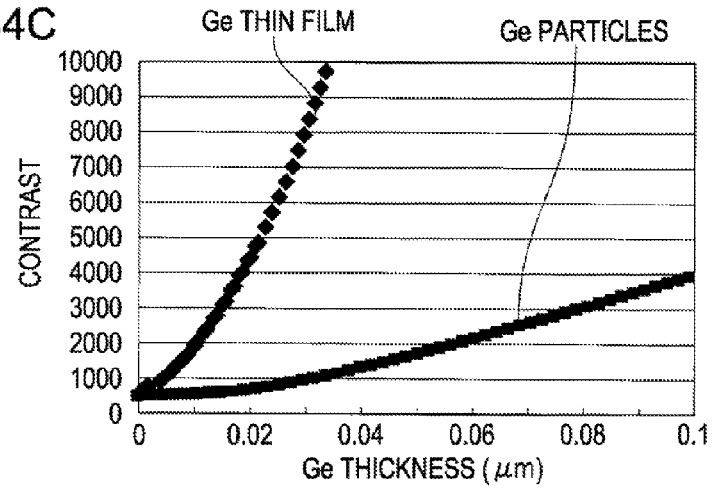

The results are shown in FIGS. 34A to 34C. FIG. 34A shows the results of the absorption-axis reflectance, FIG. 34B shows the results of the transmission-axis transmittance, and FIG. 34C shows the results of the transmission contrast. It was found that compared to the case of the Ge thin film, in the case of the Ge particles, the contrast was not rapidly changed, the transmittance was high, and the thickness range in which the reflectance could be decreased was wide.

Example 6

Next, the relationship between the aspect ratio of the inorganic particle and the contrast of the polarizing element was investigated.

(1) Oblique Sputtering Deposition on a Flat Plate

First, Ge particle layers having a thickness of 30 nm were formed on a flat Si substrate at substrate inclined angles θ of 20° and 10° using the ion beam sputtering apparatus shown in FIG. 4. The samples obtained thereby were observed by a SEM, and any 40 Ge particles in a SEM image were extracted and were measured to obtain the size (long diameter or major axis diameter (major axis length) and short diameter or minor axis diameter (minor axis length)), so that the aspect ratio was obtained.

Figure 35A:
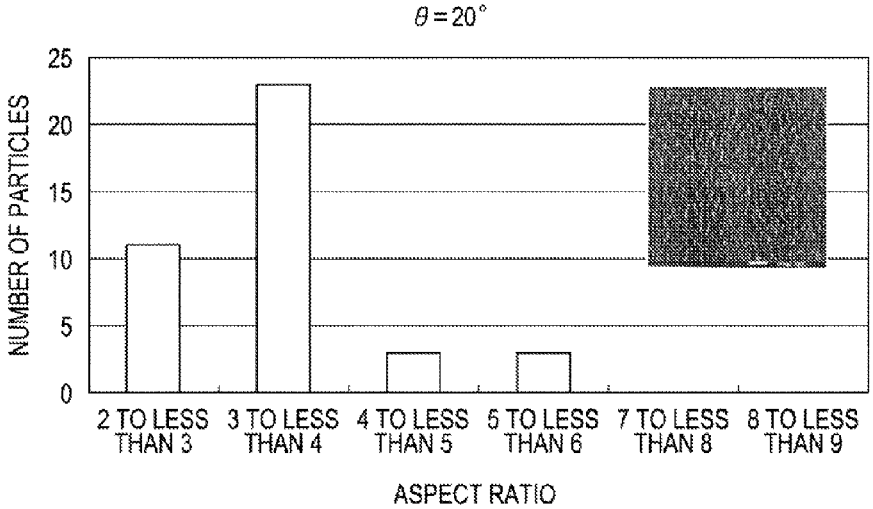
FIGS. 35A and 35B are graphs each showing an aspect ratio distribution of Ge particles, which is obtained when oblique sputtering deposition is performed on a flat plate by changing a substrate inclined angle θ.
Figure 35B:
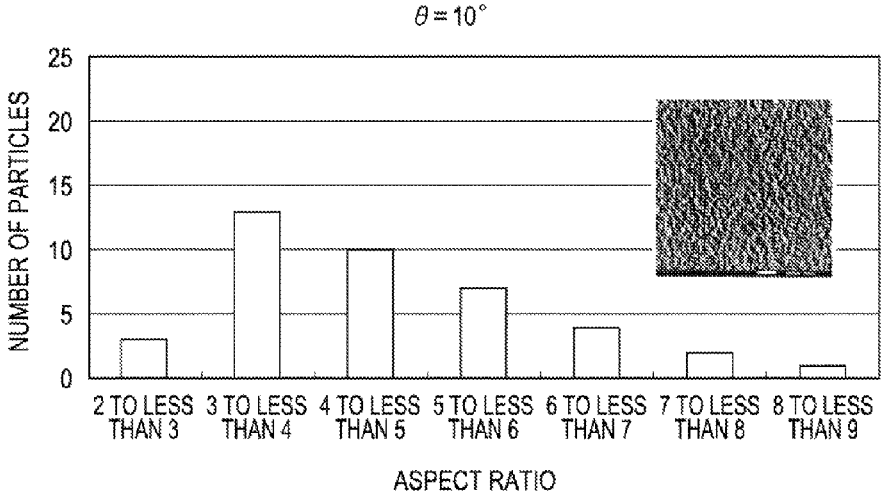

FIGS. 35A and 35B are each showing the result of the aspect ratio using a histogram analysis. According to the results shown by the histogram, the distribution tends to shift toward a high aspect ratio side in the case shown in FIG. 35B (substrate inclined angle θ: 10°) as compared to the case shown in FIG. 35A (substrate inclined angle θ: 20°). In addition, the average long axis lengths of the Ge particles were 30 nm and 63 nm at substrate inclined angles θ of 20° and 10°, respectively, and the average aspect ratios were 3.2 and 4.0 at substrate inclined angles θ of 20° and 10°, respectively.

In addition, by using samples which included Ge particle layers having a thickness of 10 nm formed on a flat glass substrate (Corning 1737) at substrate inclined angles θ of 20° and 10° by the ion beam sputtering apparatus shown in FIG. 4, the transmittance was measured, and the transmittance ratio at a wavelength of 550 nm was obtained as the contrast. In addition, an x direction and a y direction correspond to those shown in FIG. 14A. The results are shown in Table 1. As the substrate inclined angle θ was decreased, the aspect ratio of the Ge particle tended to increase, and in addition, the contrast also tended to increase.

TABLE 1

| Substrate inclined angle θ (degree) | Transmittance (%) x direction | Transmittance (%) y direction | Contrast | Ge particle Long axis length (nm)* | Ge particle Aspect ratio* |
|---|---|---|---|---|---|
| 20 | 63.2 | 72.4 | 1.1 | 30 | 3.2 |
| 10 | 58.4 | 74.9 | 1.3 | 63 | 4.0 |

*average value (2) Polarizing Element 10

Figure 36:
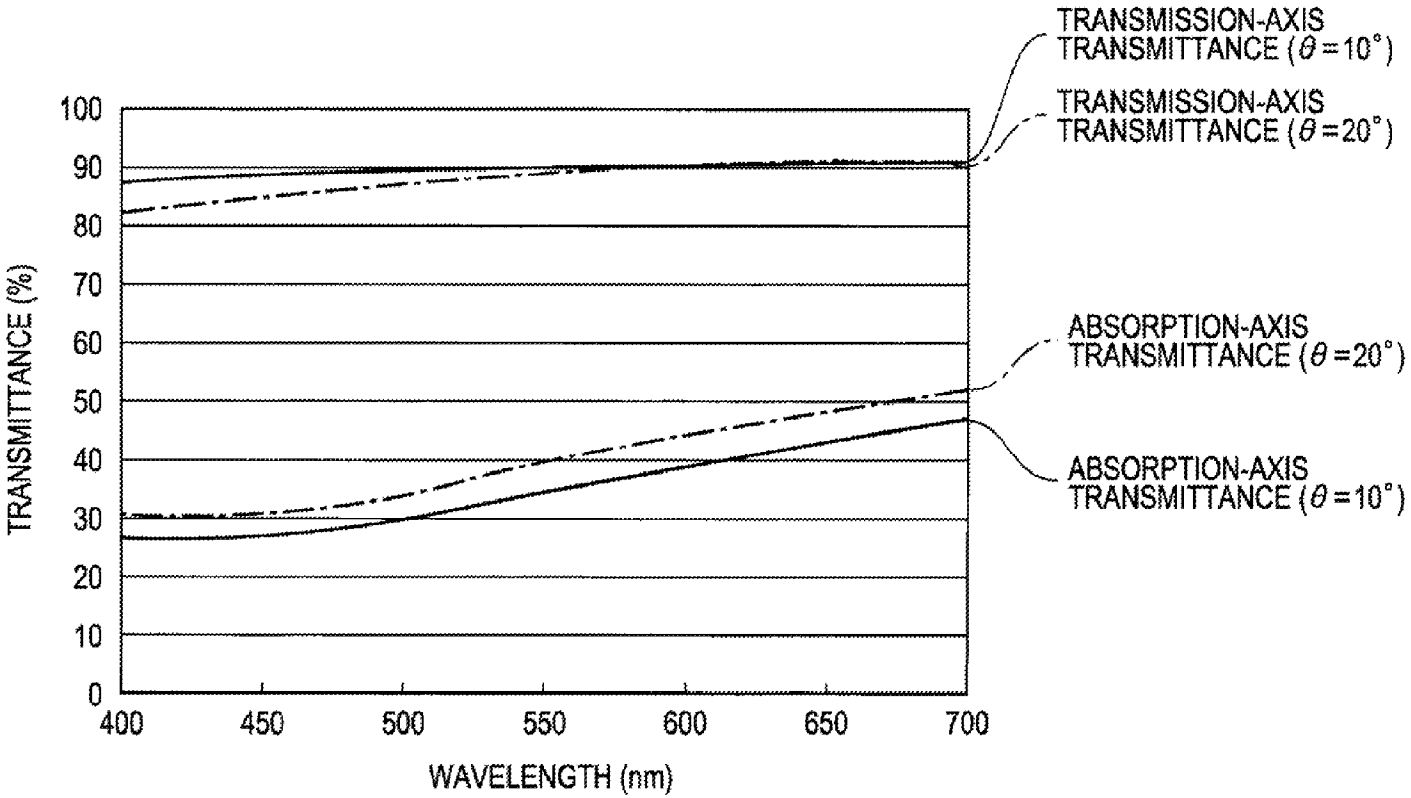
FIG. 36 is a graph showing polarization properties of a polarizing element sample having the structure shown in FIG. 3C.

Polarizing element samples were formed under the same conditions as those for the polarizing element 10 of Example 5 except that the oblique sputtering deposition for forming the inorganic particle layers 15 were performed at substrate inclined angles θ of 10° and 20°. The transmittances of this sample in the transmission axis and the absorption axis were measured, and the transmittance ratio at a wavelength of 550 nm was obtained as the contrast. The results are shown in FIG. 36 and Table 2. Also in the polarizing element of this example according to the present invention, as the substrate inclined angle θ was decreased, the contrast tended to increase.

TABLE 2

| Substrate inclined angle | Transmittance (%) | | |
|---|---|---|---|
| θ (degree) | x direction | y direction | Contrast |
| 20 | 88.3 | 37.2 | 2.4 |
| 10 | 90.7 | 33.9 | 2.7 |

As described above, although inorganic particles having shape anisotropic properties can be formed into films on the substrate by oblique sputtering deposition, the aspect ratio, which is a ratio between the major axis diameter and the minor axis diameter of the inorganic particle, depends on the incident angle (substrate inclined angle θ in FIG. 4) of the inorganic particles, and as the angle is decreased, the aspect ratio increases. In addition, as the aspect ratio increases, the transmission contrast simultaneously increases. As described above, using Steering Effect by the oblique sputtering deposition, a polarizing element having superior properties can be realized.

Example 7

By changing the type of film formation method (dry process), Al particle layers were formed on the substrate. In this example, the following three dry processes were used.

Figure 37A:
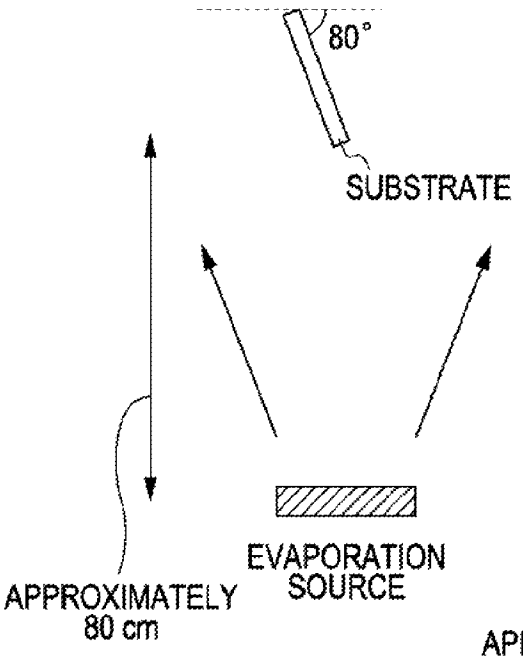
FIGS. 37A to 37C are views each illustrating an oblique sputtering method of Example 7.

(a) Electron Beam Deposition (FIG. 37A)

A substrate inclined by 10° with respect to the normal line direction of an evaporation source containing Al was set at a distance of 80 cm apart from the evaporation source, and electron beam deposition was performed at a film formation rate of 0.3 nm/sec.

Figure 37B:
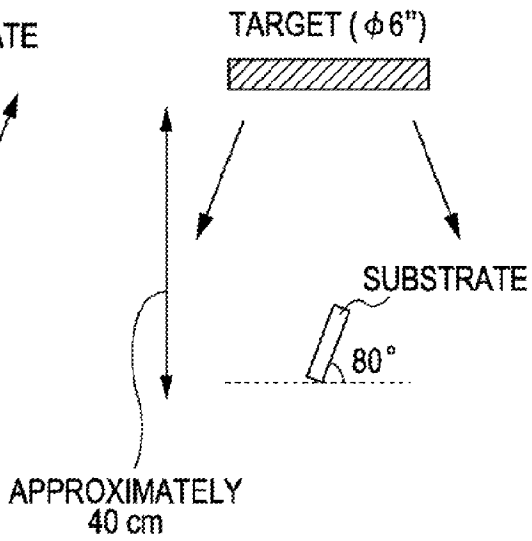

(b) Magnetron Sputtering (FIG. 37B)

A substrate inclined by 10° with respect to the normal line direction of an Al target was set at a distance of 40 cm apart from the target, and magnetron sputtering deposition was performed at a film formation rate of 0.1 nm/sec.

Figure 37C:
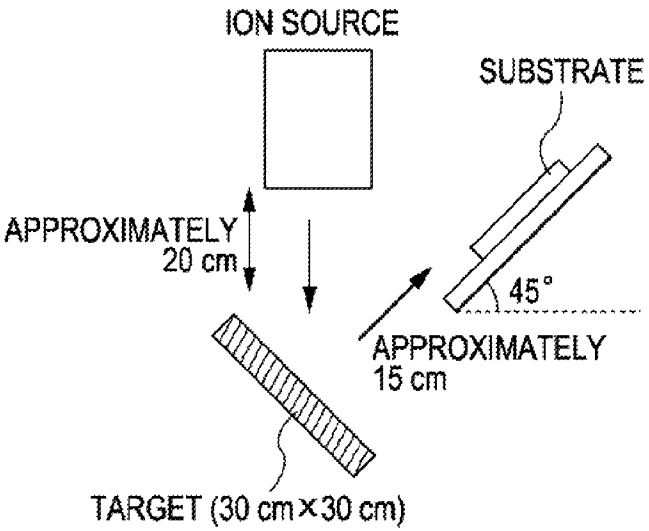

(c) Ion Beam Sputtering (FIG. 37C)

The sputtering deposition method shown in FIG. 4 by way of example in the present invention was performed. In this method, a substrate was set at an angle of 45° at a distance of approximately 15 cm apart from the Al target, and ion beam sputtering deposition was performed at a film formation rate of 0.2 nm/sec.

In this example, the same substrate as the substrate 11 of the polarizing element 10 of Example 5 was used and was set so that the Al incident direction was set along a direction (y direction) perpendicular to the lattice longitudinal direction (x direction) as shown in FIG. 14A. In addition, the thicknesses of the Al particle layers were all set to 10 nm.

Figure 38:
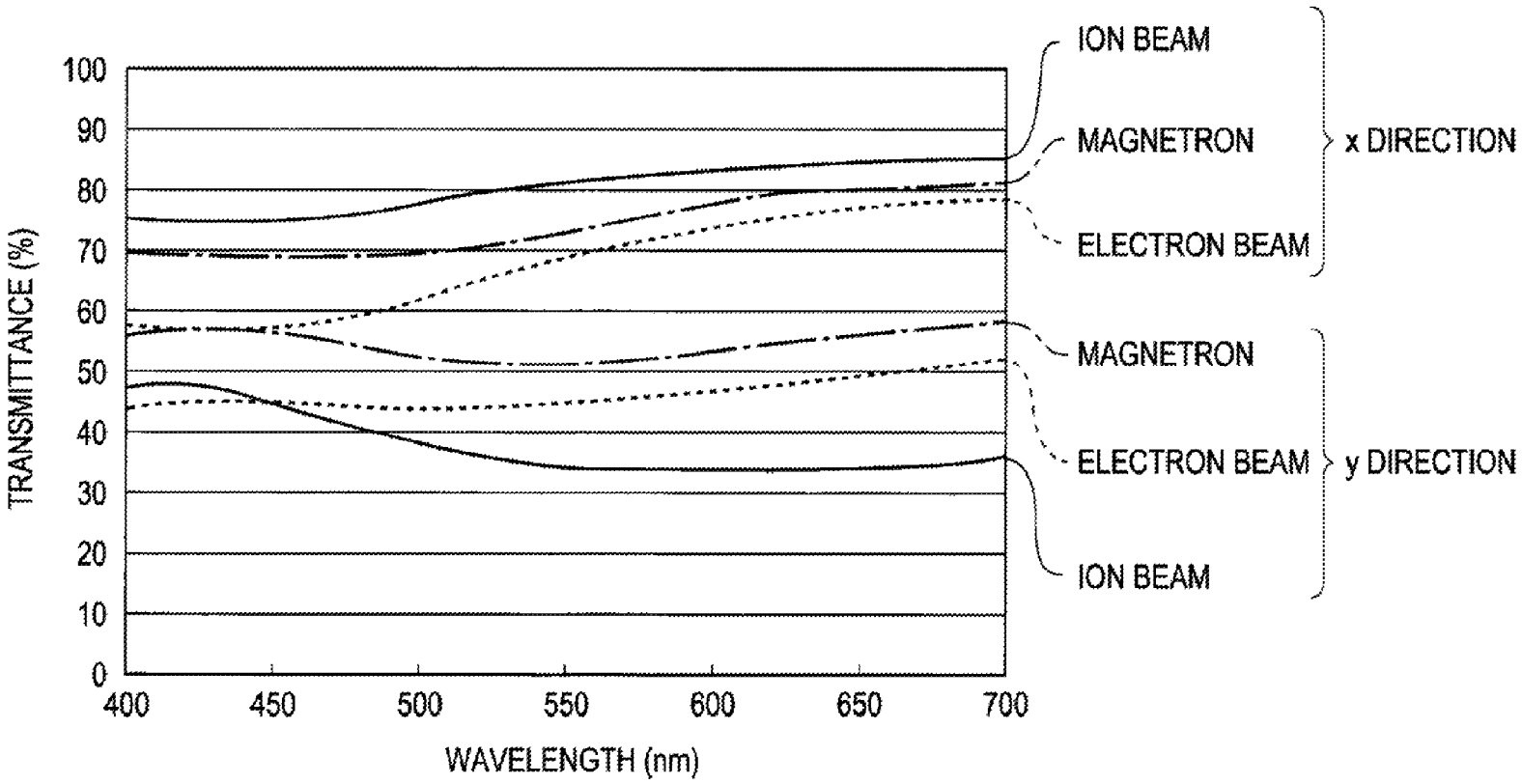
FIG. 38 is a graph showing polarization properties of a Ge particle layer sample of Example 7.

The transmittances of the samples thus obtained were measured. The results are shown in FIG. 38.

Among the three types of samples, since the sample obtained by the ion beam sputtering had a high transmittance, and the difference in transmittance in the x and y directions was large, it was found that ion beam sputtering was the most favorable film formation method.

Example 8

Figure 39:
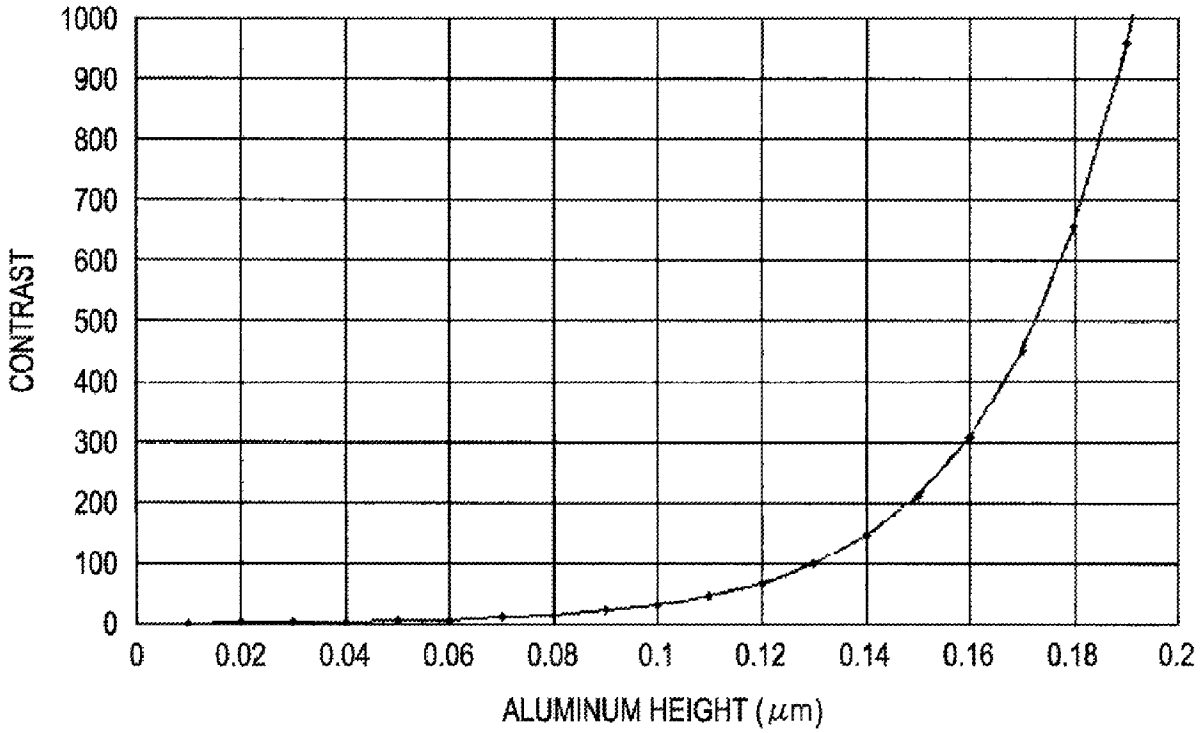
FIG. 39 is a graph showing the relationship between the contrast and an aluminum height as a reflection layer of the polarizing element having the structure shown in FIGS. 5A and 5B.

Among the polarizing elements of the embodiments, in the polarizing element 20 having the structure shown in FIGS. 5A and 5B, when the height (thickness) of the reflection layer 22 is changed, the transmission contrast of the polarizing element can be easily controlled. As one example, in FIG. 39, the calculation result of the relationship between the transmission contrast and the reflection layer thickness (Al height) of the one-dimensional lattice reflection layer 22 made of Al and having a pitch of 150 nm and an aluminum width of 37.5 nm are shown, the result being obtained by a rigorous coupling wave analysis (RCWA).

In addition, in the polarizing element 20 having the structure shown in FIGS. 5A and 5B, when the height (thickness) of the dielectric layer 23 is changed, the optical properties of the polarizing element can be easily controlled. In this example, the one-dimensional lattice reflection layers 22 made of Al and having a thickness (Al height) of 200 nm, a pitch of 150 nm, and a lattice width of 50 nm, the dielectric layers 23 made of SiO2 and having different thicknesses of 0, 19, 37, 56, and 74 nm obtained by RF sputtering deposition, and the inorganic particle layers 25 made of Ge particles and having a thickness of 30 nm were provided on the substrate 21 made of glass (Corning 1737) to form five types of samples of the polarizing element 20 of the example according to the present invention, and by using the samples thus obtained, the relationships of the dielectric layer thickness with the transmission-axis transmittance, the contrast, and the absorption-axis reflectance were obtained at wavelengths of 450, 550, and 650 nm. The results are shown in Table 3.

TABLE 3

| Dielectric layer thickness | Absorption-axis reflectance (%) | | | Transmission-axis transmittance (%) | | | Contrast | | |
|---|---|---|---|---|---|---|---|---|---|
| (nm) | λ = 450 nm | λ = 550 nm | λ = 650 nm | λ = 450 nm | λ = 550 nm | λ = 650 nm | λ = 450 nm | λ = 550 nm | λ = 650 nm |
| 0 | 19 | 18 | 26 | 72 | 82 | 86 | 1,800 | 2,929 | 3,440 |
| 19 | 8 | 3 | 3 | 72 | 83 | 86 | 3,130 | 3,952 | 4,315 |
| 37 | 3 | 2 | 2 | 78 | 84 | 86 | 2,167 | 3,652 | 3,913 |
| 56 | 11 | 10 | 8 | 75 | 83 | 85 | 1,875 | 3,773 | 4,739 |
| 74 | 30 | 22 | 21 | 73 | 85 | 86 | 1,460 | 4,250 | 5,369 |

From the results thus obtained, for example, when it is desired to decrease the absorption-axis reflectance, the thickness of the dielectric layer 23 may be set in the range of 19 to 37 nm. In addition, when the polarizing element is used for application in which reflection may not cause any serious problems, the thickness of the dielectric layer 23 may be decreased to zero. This means a decrease in number of manufacturing steps, and hence the productivity can be improved. In addition, since a high contrast is realized at a wavelength in the range of 450 to 650 nm, the polarizing element can be preferably applied to a projector used in a wide service bandwidth.

On the other hand, as for the transmittance, a high transmittance is realized such as 70% or more at a wavelength of 450 nm and 80% or more at wavelengths of 550 and 650 nm. When the pitch of the lattice is further decreased, the transmittance can be further improved.

In addition, the contrast can be adjusted by the height of the metal lattice. When a higher contrast is preferable, the height of an Al lattice may be increased, and when a lower contrast is preferable, the height may be decreased.

Figure 40:
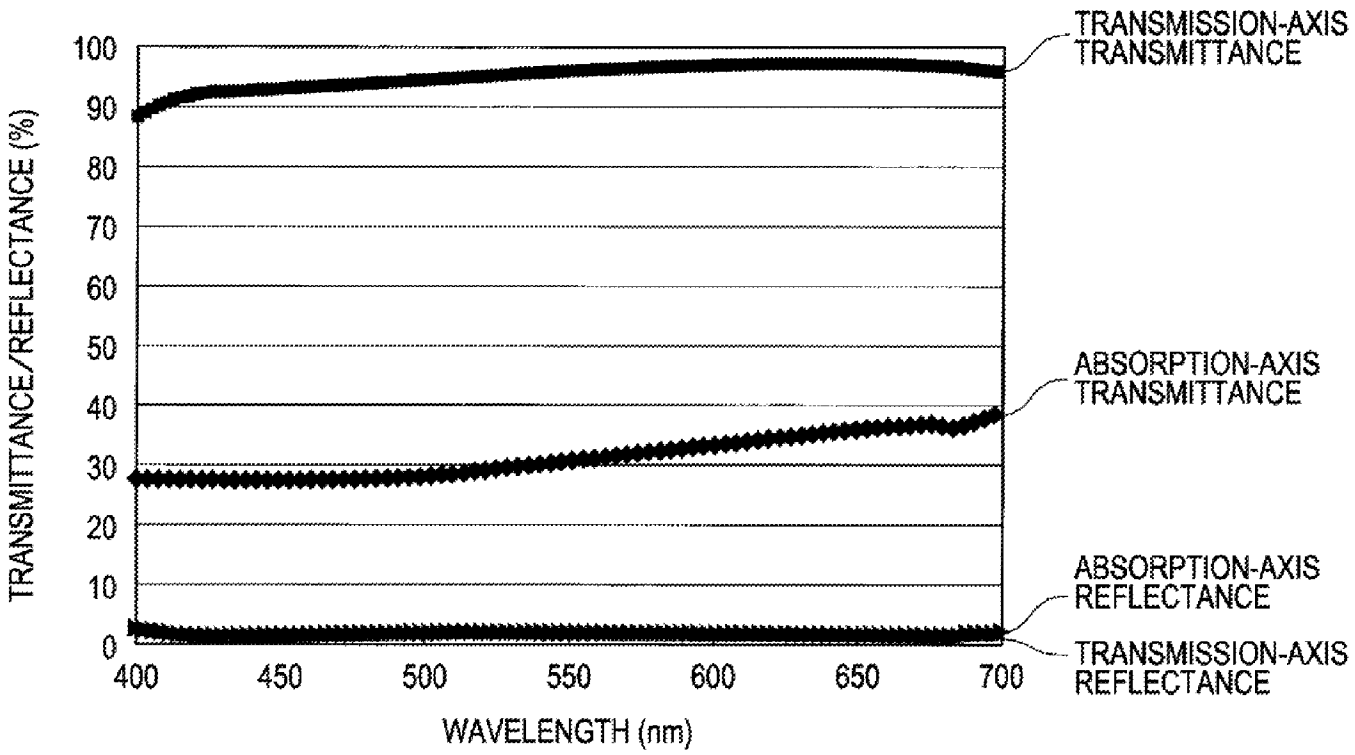
FIG. 40 is a graph showing polarization properties of a polarizing element sample of Example 8.

Next, in FIG. 40, the polarization properties are shown which were obtained when the height of an Al reflection layer of a polarizing element having the same structure as that of the polarizing element 20 of Example 5 was set to 30 nm. In this case, since the thickness of the reflection layer was small (the Al height was low), the contrast in a blue region was approximately 3; however, the reflectance was suppressed to 2% or less by the effect of Ge fine particles as the case shown in FIG. 28. In the case of a polarizing element having the properties as described above, as shown by the SEM image of FIG. 31, Ge particles are deposited on sidewalls of the convex portions formed of the reflection layers and the dielectric layers, and hence a superior shape is formed as an anisotropic optical absorbing element. The above may also be said for the polarizing element 10 shown in FIGS. 1A and 1B and FIGS. 3A to 3C.

In the polarizing elements of the example according to an embodiment, when the lattice shape (the shapes and heights of the convex portions 14a in FIG. 2 and the reflection layer 22/dielectric layer 23 in FIGS. 5A and 5B, the pitch of the one-dimensional lattice pattern, and the like) and Steering Effect (the size, the aspect ratio, the alignment properties, and the like of the inorganic particles) are used in combination, a fine particle shape preferably used for an absorption type polarizing element can be realized.

Example 9

In the polarizing element 20 shown in FIGS. 5A and 5B, as an emission-surface stray-light countermeasure (ghost countermeasure), after a rubbing treatment is performed on the surface of the substrate 21 so as to form a texture structure in which fine streaks are formed in one direction so as to correspond to the disposed direction of the inorganic particles 25a which are subsequently formed, a thin film (thin film to be formed into the antireflection layers 29 (hereinafter referred to as "antireflection film")) made of inorganic particles having shape anisotropic properties may be formed on the surface processed by the rubbing treatment so as to correspond to the disposed direction of the inorganic particles 25a. In particular, when a texture structure is mechanically formed in the surface of the substrate 21 by a polishing material, such as a polishing tape, and an antireflection film made of inorganic particles is then formed by an oblique sputtering deposition method, inorganic particles having shape anisotropic properties by Steering Effect can be obtained as is the case of the inorganic particle layers 25 to be formed on the lattice; hence, the polarization effect of the inorganic particles is enhanced, and as a result, a ghost suppression effect can be enhanced. Hereinafter, a particular example which was actually carried out will be described.

Figure 41:
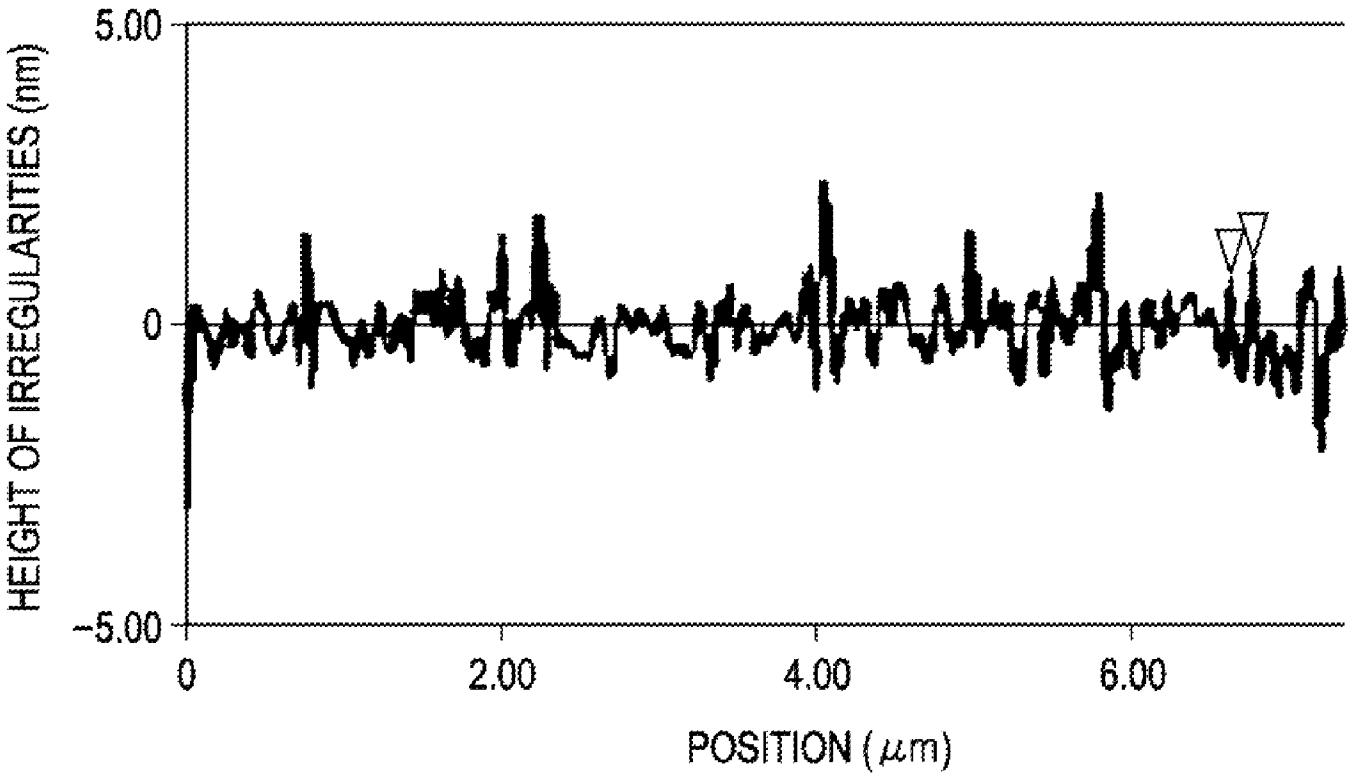
FIG. 41 is a view showing irregularities of a texture structure formed by a rubbing treatment.
Figure 42:
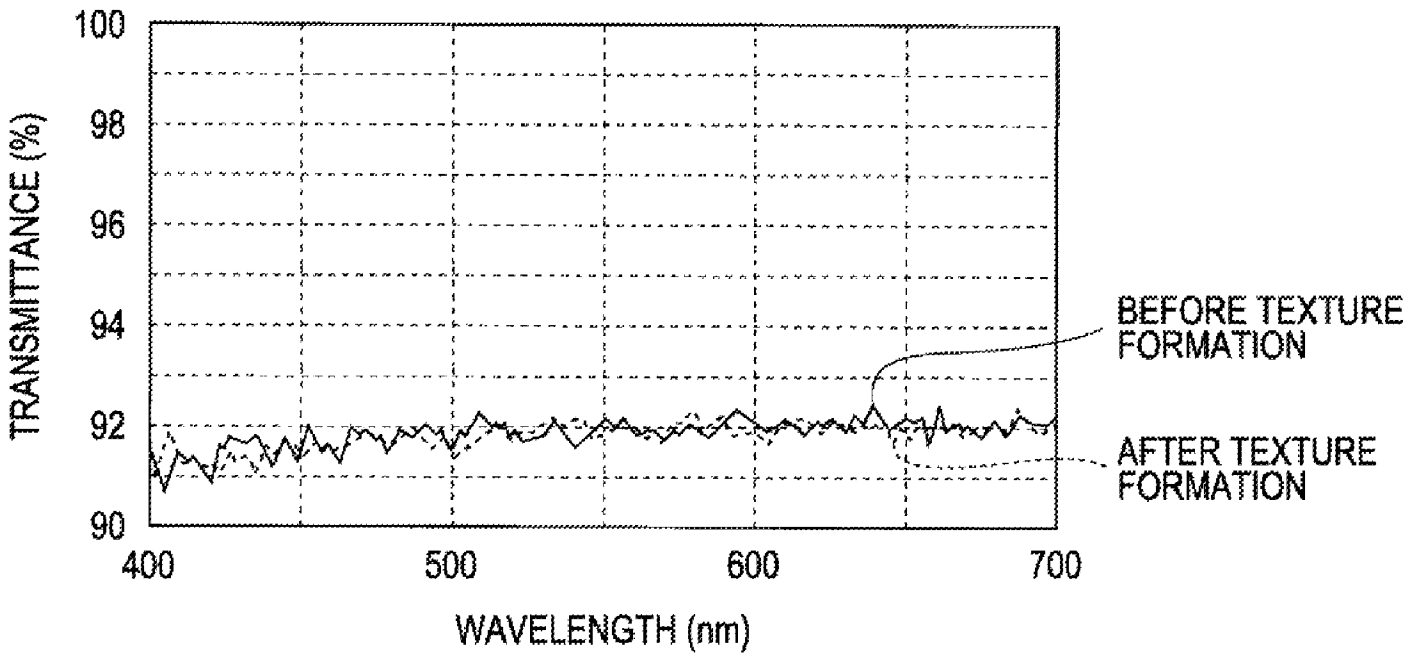
FIG. 42 is a graph showing transmittance properties of a substrate before and after a rubbing treatment.

In this example, by using D20000 manufactured by Nihon Micro Coating Co., Ltd. as a polishing material, the effect described above was verified. Corning 1737 glass was used as the substrate, and the texture was formed by rubbing the surface of the substrate in one direction with D20000. The substrate surface after the texture was formed was measured by an AFM, and the measurement result is shown in FIG. 41. The horizontal axis indicates the position on the substrate, and the vertical axis indicates the height of irregularities. The average pitch of the irregularities of the substrate surface was 160 nm. In addition, the transmittances of the substrate were measured before and after the formation of the texture, and it was found that the transmittances before and after the formation of the texture were not changed from each other, as shown in FIG. 42. That is, by the method described above, precise machining on the order of nanometers can be easily performed without degrading the transmission properties of the substrate.

Figure 43:
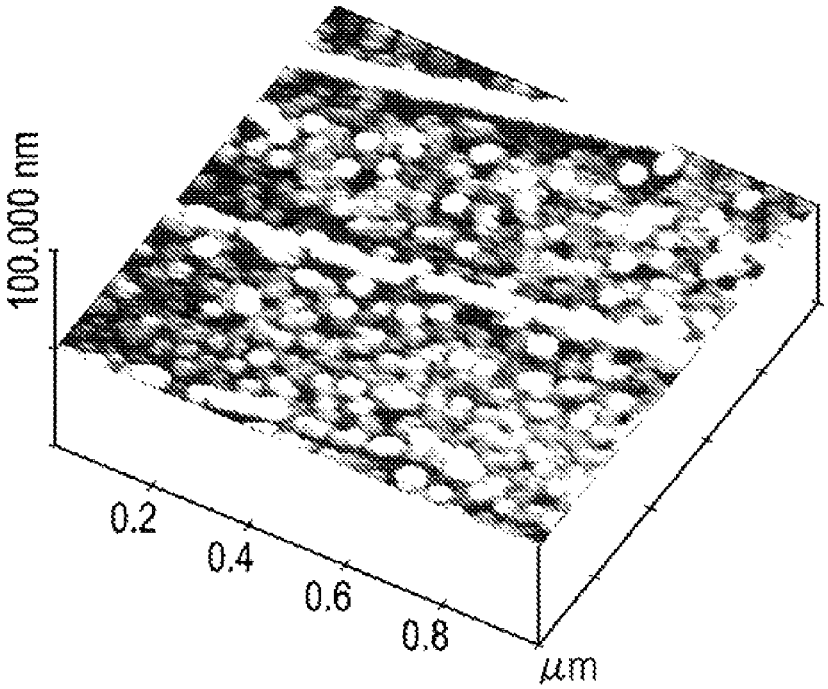
FIG. 43 is a view showing a surface texture of a Ge particle film (antireflection film) provided on a substrate processed by a rubbing treatment.

Subsequently, by using the ion beam sputtering apparatus shown in FIG. 4, oblique sputtering deposition was performed on the textured substrate at a substrate incident angle θ of 5° to form an antireflection film of Ge particles having a thickness of 10 nm. In this step, the sputtering deposition was performed on the substrate so that the relationship between the Ge incident direction and the substrate was set such that the y direction in FIG. 14A was the texture longitudinal direction. By using the sample thus obtained, the shapes of the Ge particles of the antireflection film were observed by an AFM, and it was found that the Ge particles were aligned along the texture as shown in FIG. 43.

Figure 44:
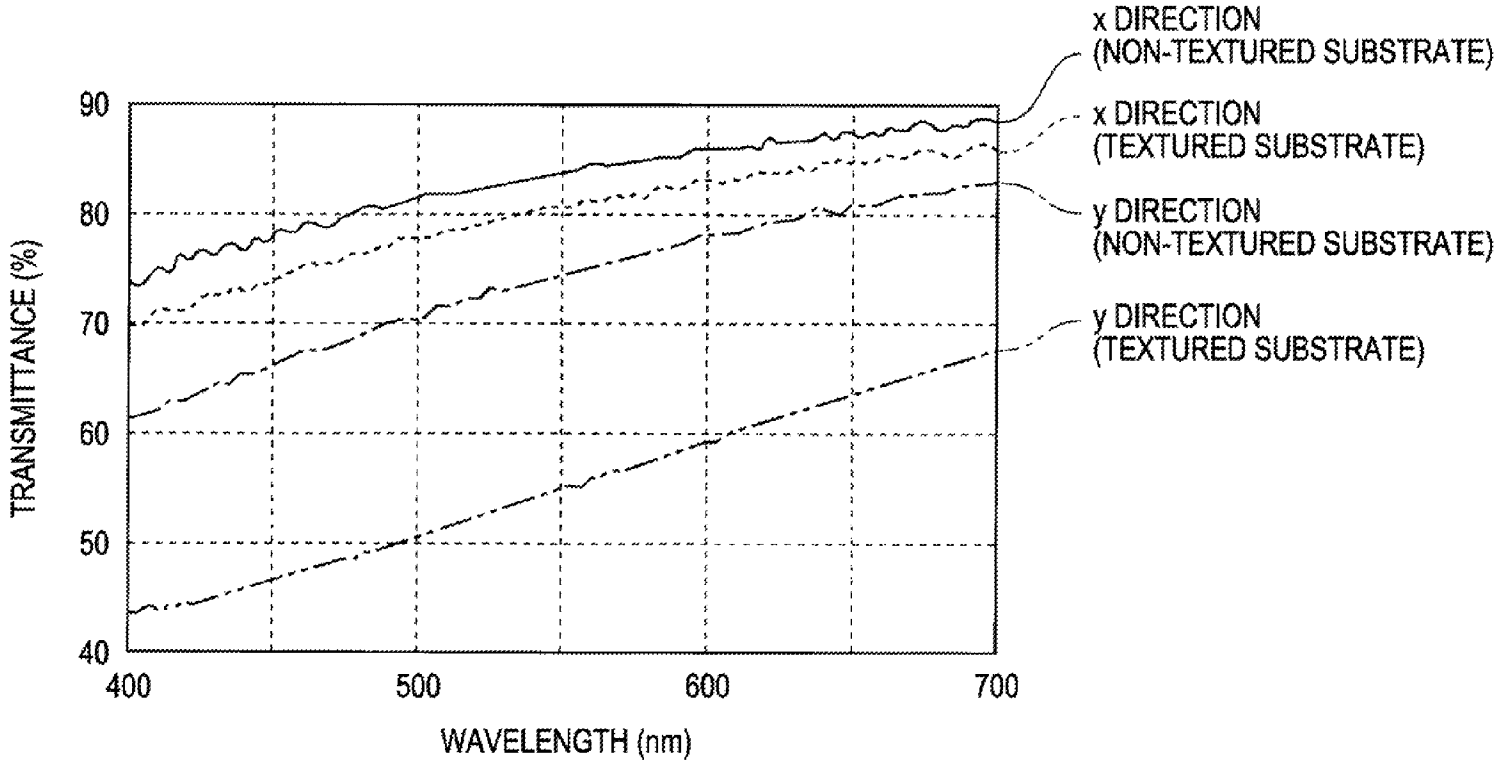
FIG. 44 is a graph showing improvement in polarization properties of an antireflection film by a rubbing treatment.

In FIG. 44, the transmission properties of this sample are shown. In addition, for comparison purposes, by using a glass substrate made of Corning 1737, which was not processed by the rubbing treatment, and an antireflection film which was formed under the same conditions as described above, a comparative sample was formed, and the transmission properties thereof were also investigated. In FIG. 44, "textured substrate" indicates the example sample, and "non-textured substrate" indicates the comparative sample. From the results shown in FIG. 44, although both samples showed polarization properties by Steering Effect; however, in the case of the "textured substrate", the transmittance in the x direction was much higher than that in the y direction, and hence the difference in transmittance between in the x and the y directions is large, so that superior polarization properties are obtained.

According to an embodiment, the example sample (the textured substrate provided with the antireflection film formed thereon) is used, and the layered structure of the polarizing element 20 shown in FIGS. 5A and 5B is formed thereon. Subsequently, when the reflection layers 22 and the dielectric layers 23 are formed by pattern processing, the antireflection film is simultaneously processed to have a lattice pattern, so that the antireflection layers 29 are formed. As a result, the effect of the ghost countermeasure can be enhanced, and at the same time, as the polarizing element, improvement in transmission contrast properties can also be expected.

Example 10

According to the above examples, in the most cases, the polarizing elements were described using Ge by way of example; however, inorganic particles having shape anisotropic properties can be formed using another material. Hence, by appropriately selecting a material, a polarizing element to be used at a targeted wavelength can be formed.

Figure 45:
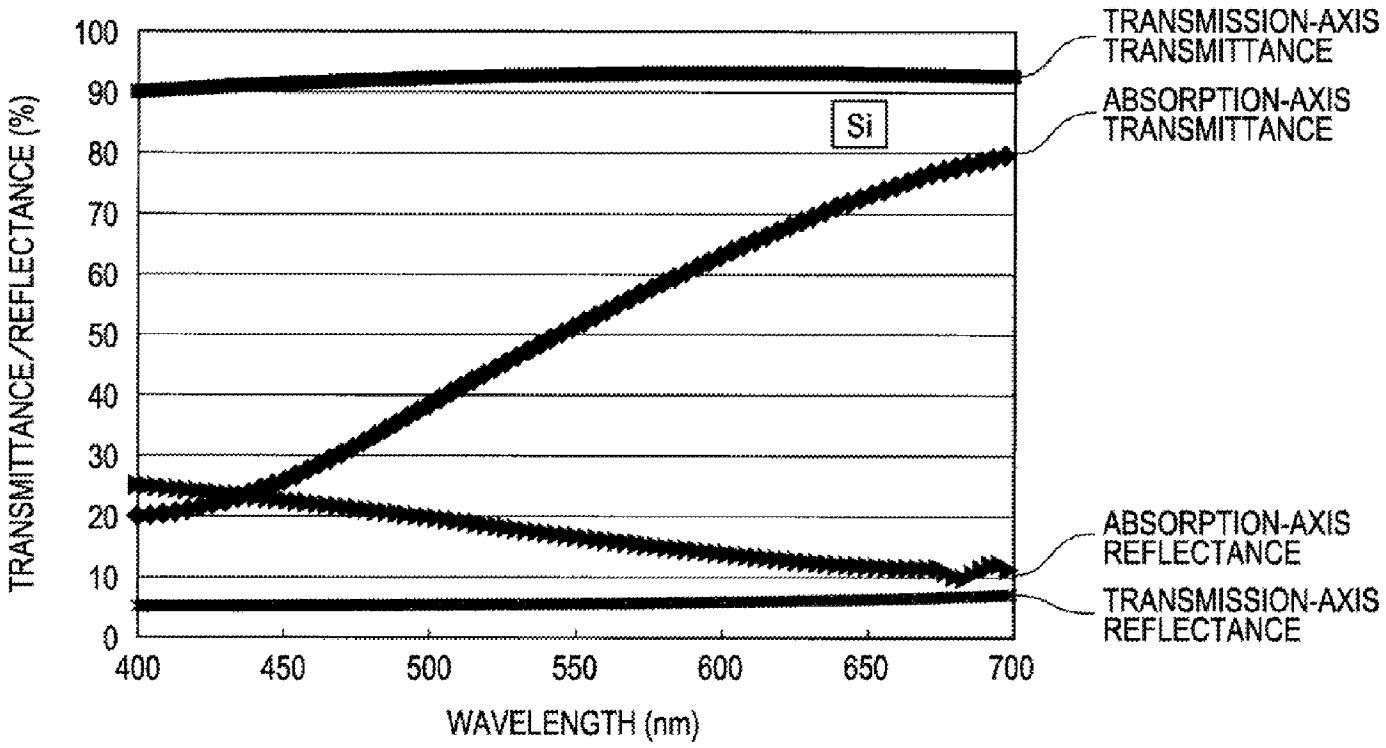
FIG. 45 is a graph showing polarization properties of a sample of an inorganic particle layer made of Si of Example 10.
Figure 46:
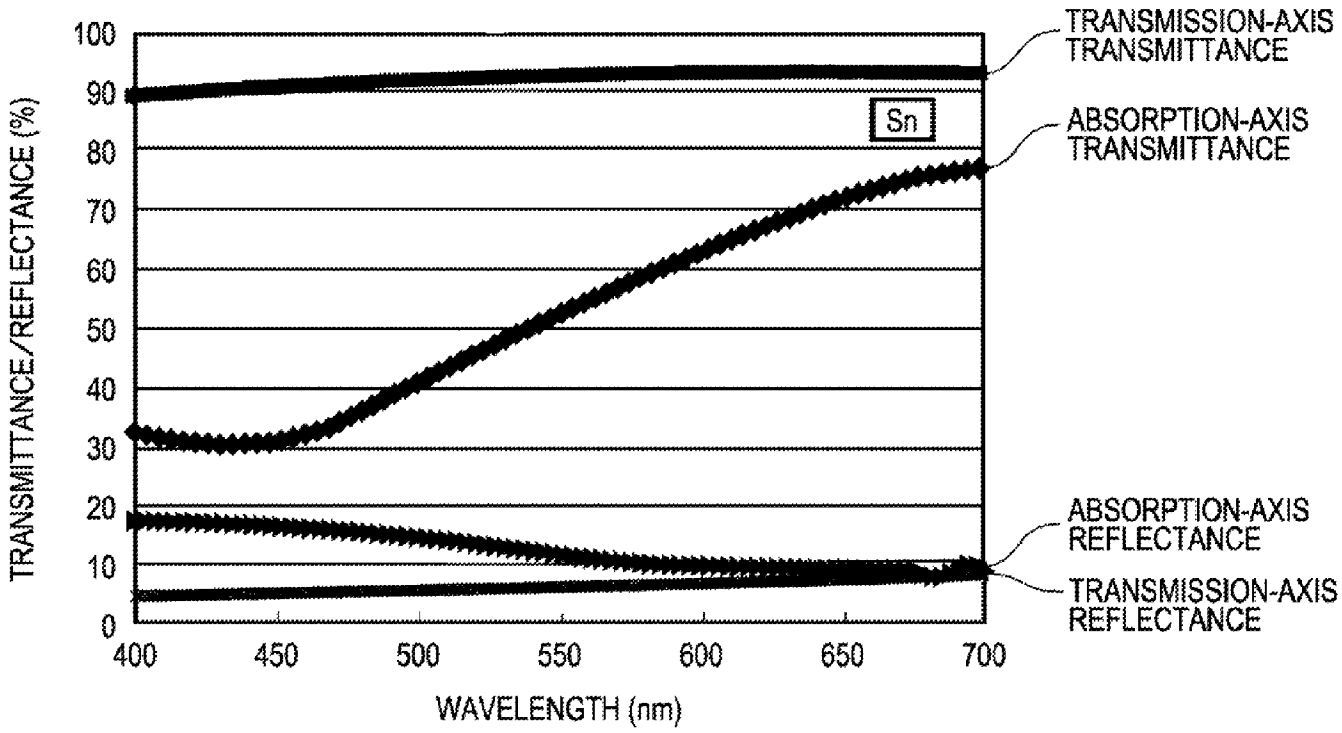
FIG. 46 is a graph showing polarization properties of a sample of an inorganic particle layer made of Sn of Example 10.

FIGS. 45 and 46 are graphs showing polarization properties of the polarizing element 10 shown in FIG. 3C including Si and Sn, respectively, as inorganic particles having a thickness of 30 nm. In this case, the antireflection films on the rear surface are not formed. In the cases in which the above materials are used, although the reflectance is slightly higher than that of Ge, the transmission-axis polarization properties in a blue region are high, and depending on applications, the above materials may also be used for a polarizing element.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A polarizing element comprising:

a first polarizing element including a first substrate transparent to visible light, and first inorganic particle layers in each of which first inorganic particles are linearly disposed on the first substrate, the first inorganic particle layers being disposed on the first substrate at predetermined intervals to form a wire grid structure, wherein the first inorganic particles each have an elliptical shape with a major axis in a disposed direction and a minor axis in a direction perpendicular thereto, wherein the first polarizing element further includes convex portions, which are made of a material transparent to visible light and which extend in one direction, provided on the first substrate, wherein the first inorganic particle layers are each provided on a top part or at least one of sidewall parts of each of the convex portions; and a second polarizing element including a second substrate transparent to visible light, and second inorganic particle layers in each of which second inorganic particles are linearly disposed on the second substrate, the second inorganic particle layers being disposed on the second substrate at predetermined intervals to form a wire grid structure, wherein the second inorganic particles each have *an elliptical* shape [anisotropic properties in which a diameter] *with a major axis* in a disposed direction [is long] and a [diameter] *minor axis* in a direction perpendicular thereto [is short], wherein the second polarizing element further includes reflection layers of strip-shaped thin films, which are made of a metal and which extend in one direction, provided on the second substrate at predetermined intervals[;], and first dielectric layers provided on the reflection layers, wherein the second inorganic particle layers are provided on the first dielectric layers at positions corresponding to those of the strip-shaped thin films, and wherein the first and second substrates are adhered to each other at rear surfaces thereof.

2. The polarizing element according to claim 1, wherein a refractive index of the first inorganic particles in the disposed direction is larger than that of the first inorganic particles in the direction perpendicular to the disposed direction.

3. The polarizing element according to claim 2, wherein an extinction coefficient of the first inorganic particles in the disposed direction is larger than that of the first inorganic particles in the direction perpendicular thereto.

4. The polarizing element according to claim 1, wherein the first inorganic particle layers are formed by an oblique sputtering method.

5. The polarizing element according to claim 1, wherein the first inorganic particles include a single element selected from the groups consisting of: Al, Ag, Cu, Au, Mo, Cr, Ti, W, Ni, Fe, Si, Ge, Te, and Sn, an alloy thereof, or a silicide semiconductor material.

6. The polarizing element according to claim 1, wherein the first inorganic particles include a semiconductor material having a bandgap energy of 3.1 eV or less.

7. The polarizing element according to claim 1, wherein the first inorganic particle layers have a thickness of 200 nm or less.

8. The polarizing element according to claim 1, wherein the second substrate is processed by a rubbing treatment so that the direction of the rubbing treatment corresponds to the disposed direction of the first inorganic particles, the polarizing element further comprising antireflection layers of inorganic particles having shape anisotropic properties, the antireflection layers being provided on the surface of the second substrate so that the direction of the inorganic particles corresponds to the disposed direction of the first inorganic particles.

9. The polarizing element according to claim 1, further comprising second dielectric layers, the second inorganic particle layers and the second dielectric layers forming laminates, wherein at least one of the laminates is provided on each of the first inorganic particle layers.

10. The polarizing element according to claim 1, further comprising a polarizing element protective layer transparent to light in a service bandwidth as an outermost surface.

11. A liquid crystal projector comprising:

a lamp;

a liquid crystal panel; and a polarizing element including a substrate transparent to visible light; and first inorganic particle layers in each of which first inorganic particles are linearly disposed on the substrate, the first inorganic particle layers being disposed on the substrate at predetermined intervals to form a wire grid structure, wherein the first inorganic particles each have an elliptical shape with a major axis in a disposed direction and a minor axis in a direction perpendicular thereto, wherein the first polarizing element further includes convex portions, which are made of a material transparent to visible light and which extend in one direction, provided on the first substrate, wherein the first inorganic particle layers are each provided on a top part or at least one of sidewall parts of each of the convex portions; and a second polarizing element including a second substrate transparent to visible light, and second inorganic particle layers in each of which second inorganic particles are linearly disposed on the second substrate, the second inorganic particle layers being disposed on the second substrate at predetermined intervals to form a wire grid structure, wherein the second inorganic particles each have *an elliptical* shape [anisotropic properties in which a diameter] *with a major axis* in a disposed direction [is long] and a [diameter] *minor axis* in a direction perpendicular thereto [is short], wherein the second polarizing element further includes reflection layers of strip-shaped thin films, which are made of a metal and which extend in one direction, provided on the second substrate at predetermined intervals[;], and first dielectric layers provided on the reflection layers, wherein the second inorganic particle layers are provided on the first dielectric layers at positions corresponding to those of the strip-shaped thin films, and wherein the first and second substrates are adhered to each other at rear surfaces thereof.

*12. A polarizing element comprising:*

*a substrate transparent to visible light;*

*reflection layers including strip-shaped thin films, which include a metal and which extend in one direction, provided on the substrate at predetermined intervals;*

*dielectric layers formed on the reflection layers;*

*inorganic particle layers in each of which inorganic particles are linearly disposed; and*

*a polarizing element protective layer transparent to light in a service bandwidth formed as an outermost surface using $SiO_2$,*

*wherein the inorganic particle layers are formed at positions corresponding to positions of the strip-shaped thin films, on at least one side surface part of the strip-shaped thin films on the dielectric layers, and*

*wherein the polarizing element has a wire grid structure having a longitudinal direction which is a same direction in which the inorganic particles are linearly disposed.*

*13. A polarizing element comprising:*

*a substrate transparent to visible light;*

*reflection layers including strip-shaped thin films, which include a metal and which extend in one direction, provided on the substrate at predetermined intervals;*

*dielectric layers formed on the reflection layers; and*

*inorganic particle layers in each of which inorganic particles are linearly disposed,*

*wherein the inorganic particle layers are formed at positions corresponding to positions of the strip-shaped thin films, on at least one side surface part of the strip-shaped thin films on the dielectric layers,*

*wherein the polarizing element has a wire grid structure having a longitudinal direction which is a same direction same in which the inorganic particles are linearly disposed,*

*wherein the substrate includes any one of glass, sapphire, and quartz, and*

*wherein the substrate has a concave-convex member formed thereon, which has a pitch of 0.5 μm or less, a line width of 0.25 μm or less, a depth of 1 nm or more.*

*14. A polarizing element comprising:*

*a substrate transparent to visible light;*

*reflection layers including strip-shaped thin films, which include a metal and which extend in one direction, provided on the substrate at predetermined intervals;*

*dielectric layers formed on the reflection layers;*

*inorganic particle layers in each of which inorganic particles are linearly disposed; and*

*a polarizing element protective layer transparent to light in a service bandwidth formed as an outermost surface using $SiO_2$,*

*wherein the inorganic particle layers are formed at positions corresponding to positions of the strip-shaped thin films, on both side surface parts of top parts of the strip-shaped thin films on the dielectric layers, and*

*wherein the polarizing element has a wire grid structure having a longitudinal direction which is a same direction in which the inorganic particles are linearly disposed.*

*15. A polarizing element comprising:*

*a substrate transparent to visible light;*

*reflection layers including strip-shaped thin films, which include a metal and which extend in one direction, provided on the substrate at predetermined intervals;*

*dielectric layers formed on the reflection layers; and*

*inorganic particle layers in each of which inorganic particles are linearly disposed,*

*wherein the inorganic particle layers are formed at positions corresponding to positions of the strip-shaped thin films, on both side surface parts of top parts of the strip-shaped thin films on the dielectric layers,*

*wherein the polarizing element has a wire grid structure having a longitudinal direction which is a same direction in which the inorganic particles are linearly disposed,*

*wherein the substrate includes any one of glass, sapphire, and quartz, and*

*wherein the substrate has a concave-convex member formed thereon, which has a pitch of 0.5 μm or less, a line width of 0.25 μm or less, a depth of 1 nm or more.*

*16. A wire grid polarizing element comprising:*

*a substrate transparent to visible light; and*

*reflection layers including strip-shaped thin films, which include a metal and which extend in one direction, provided on the substrate at predetermined intervals,*

*a dielectric layer provided on the reflection layers, and*

*an inorganic particle layer being disposed linearly,*

*wherein the inorganic particle layer is formed on both side surfaces of top parts of the dielectric layer, and the inorganic particle layer is disposed in a same direction in which the reflection layers extend.*

*17. The wire grid polarizing element according to claim 16, further comprising antireflection layers being provided between the substrate and the reflection layers.*

*18. The wire grid polarizing element according to claim 16, wherein the wire grid polarizing element further includes convex portions, wherein the pitch of the convex portions is less than or equal to 0.5 μm, and the line width of the convex portions is less than or equal to 0.25 μm, and the height of the convex portions is not less than 1 nanometer.*

*19. A liquid crystal projector comprising:*

*a liquid crystal panel;*

*an incident polarizing plate;*

*an emission polarizing plate;*

*wherein the emission polarizing plate comprising:*

*a substrate transparent to visible light;*

*reflection layers including strip-shaped thin films, which include a metal and which extend in one direction, disposed provided on the substrate at predetermined intervals;*

*a dielectric layer provided on the reflection layers, and*

*an inorganic particle layer being disposed linearly,*

*wherein the inorganic particle layer is formed on the dielectric layer, and the inorganic particle layer is disposed in a same direction in which the reflection layers extend, and*

*wherein the inorganic particle layer of the emission polarizing plate is disposed to face the liquid crystal panel.*

*20. The liquid crystal projector according to claim 19, wherein the incident polarizing plate includes the inorganic particle layer that is disposed to face the liquid crystal panel.*

*21. The liquid crystal projector according to claim 19, wherein the liquid crystal projector is a transmission projector.*

*22. A liquid crystal display comprising:*

*a liquid crystal panel;*

*a polarizing plate;*

*wherein the polarizing plate comprising:*

*a substrate;*

*a plurality of reflection layers disposed at a predetermined interval, wherein the reflection layers extend in a first direction and include a metal material;*

*a dielectric layer includes a dielectric layer material selected from the group consisting of SiO2, Al2O3, and MgF2; and*

*an inorganic particle layer includes a plurality of inorganic particles having an anisotropic shape including a first inorganic particle length in the first direction that is greater than a second inorganic particle length in a second direction along the first surface perpendicular to the first direction, wherein the substrate has a concave-convex member formed thereon, which has a pitch of 0.5 μm or less, a line width of 0.25 μm or less, a depth of 1 nm or more.*

*23. A liquid crystal display comprising:*

*a liquid crystal panel;*

*a polarizing plate;*

*wherein the polarizing plate comprising:*

*a substrate;*

*a plurality of reflection layers disposed at a predetermined interval, wherein the reflection layers extend in a first direction and include a metal material;*

*a dielectric layer includes a dielectric layer material selected from the group consisting of SiO2, Al2O3, and MgF2; and*

*an inorganic particle layer includes a plurality of inorganic particles having an anisotropic shape including first inorganic particle length that is greater than a thickness of the inorganic particle layer,*

*wherein the substrate has a concave-convex member formed thereon, which has a pitch of 0.5 μm or less, a line width of 0.25 μm or less, a depth of 1 nm or more.*

*24. A polarizing plate comprising:*

*a substrate;*

*a plurality of reflection layers disposed at a predetermined interval, wherein the reflection layers extend in a first direction and include a metal material;*

*a dielectric layer includes a dielectric layer material selected from the group consisting of SiO2, Al2O3, and MgF2; and*

*an inorganic particle layer includes a plurality of inorganic particles having an anisotropic shape including a first inorganic particle length in the first direction that is greater than a second inorganic particle length in a second direction along the first surface perpendicular to the first direction,*

*wherein the substrate has a concave-convex member formed thereon, which has a pitch of 0.5 μm or less, a line width of 0.25 μm or less, a depth of 1 nm or more.*

*25. A polarizing plate comprising:*

*a substrate;*

*a plurality of reflection layers disposed at a predetermined interval, wherein the reflection layers extend in a first direction and include a metal material;*

*a dielectric layer includes a dielectric layer material selected from the group consisting of SiO2, Al2O3, and MgF2; and*

*an inorganic particle layer includes a plurality of inorganic particles having an anisotropic shape including a first inorganic particle length that is greater than a thickness of the inorganic particle layer,*

*wherein the substrate has a concave-convex member formed thereon, which has a pitch of 0.5 μm or less, a line width of 0.25 μm or less, a depth of 1 nm or more.*

*26. A polarizing plate comprising:*

*a substrate;*

*an antireflection layer;*

*a first dielectric layer includes a dielectric layer material selected from the group consisting of SiO2, Al2O3, and MgF2;*

*a plurality of reflection layers disposed at a predetermined interval, wherein the reflection layers extend in a first direction and include a metal material;*

*a second dielectric layer includes a dielectric layer material selected from the group consisting of SiO2, Al2O3, and MgF2; and*

*an inorganic particle layer includes a plurality of inorganic particles having an anisotropic shape including a first inorganic particle length that is greater than a thickness of the inorganic particle layer,*

*wherein the substrate has a concave-convex member formed thereon, which has a pitch of 0.5 μm or less, a line width of 0.25 μm or less, a depth of 1 nm or more, and*

*wherein at least one of the dielectric layers are provided between the reflection layer and the antireflection layer.*

* * * * *